United States Patent
Huang et al.

(12)

(10) Patent No.: US 10,974,583 B2
(45) Date of Patent: Apr. 13, 2021

(54) POWER TRANSMISSION SYSTEM AND VEHICLE HAVING SAME

(71) Applicant: BYD COMPANY LIMITED, Guangdong (CN)

(72) Inventors: Wei Huang, Shenzhen (CN); Youbin Xu, Shenzhen (CN); Zhen Zhai, Shenzhen (CN); Heping Ling, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 191 days.

(21) Appl. No.: 16/346,514

(22) PCT Filed: Oct. 30, 2017

(86) PCT No.: PCT/CN2017/108367
§ 371 (c)(1),
(2) Date: Apr. 30, 2019

(87) PCT Pub. No.: WO2018/077273
PCT Pub. Date: May 3, 2018

(65) Prior Publication Data
US 2019/0291567 A1  Sep. 26, 2019

(30) Foreign Application Priority Data
Oct. 31, 2016 (CN) .......................... 201610933134.8

(51) Int. Cl.
*B60K 6/48* (2007.10)
*B60K 6/36* (2007.10)
(Continued)

(52) U.S. Cl.
CPC .................. *B60K 6/48* (2013.01); *B60K 6/24* (2013.01); *B60K 6/26* (2013.01); *B60K 6/36* (2013.01);
(Continued)

(58) Field of Classification Search
CPC .. F16H 3/006; B60K 6/48; B60K 6/24; B60K 6/26; B60K 6/36; B60K 6/42
See application file for complete search history.

(56) References Cited

U.S. PATENT DOCUMENTS 8,801,567 B2 * 8/2014 Demirovic ............. B60K 6/387
477/5
9,358,873 B2 * 6/2016 Moore .................... F16H 3/089
(Continued)

FOREIGN PATENT DOCUMENTS

CN        1637327 A      7/2005
CN      102259583 A     11/2011
(Continued)

OTHER PUBLICATIONS

English Translation of International Search Report from PCT/CN2017/108367 dated Jan. 26, 2018 (2 pages).

*Primary Examiner* — Brian L Swenson
(74) *Attorney, Agent, or Firm* — Calfee Halter & Griswold LLP

(57) ABSTRACT

A power transmission system includes: a power source; a first motor generator unit; a system power output portion; a first and a second mode conversion devices. The power source and the first motor generator unit is connected to or disconnected from the system power output portion through the first mode conversion device. The power source can be connected to or disconnected from the first mode conversion device through the second mode conversion device. The second mode conversion device includes a conversion device input shaft, a first conversion device intermediate shaft and a conversion device output shaft, and the conversion device output shaft is connected to the first motor generator unit; and power from the power source is suitable for being decelerated sequentially through the conversion device input shaft, the first conversion device intermediate
(Continued)

shaft and the conversion device output shaft and then output to the first mode conversion device.

20 Claims, 57 Drawing Sheets

(51) Int. Cl.
  *F16H 3/00* (2006.01)
  *F16H 3/085* (2006.01)
  *B60K 6/24* (2007.10)
  *B60K 6/42* (2007.10)
  *B60K 6/26* (2007.10)

(52) U.S. Cl.
  CPC .............. *B60K 6/42* (2013.01); *F16H 3/006* (2013.01); *F16H 3/085* (2013.01); *B60Y 2200/92* (2013.01); *Y02T 10/62* (2013.01)

(56) References Cited

U.S. PATENT DOCUMENTS

| | | | |
|---|---|---|---|
| 10,583,732 B2* | 3/2020 | Iwano | B60K 6/48 |
| 2002/0040818 A1* | 4/2002 | Maruyama | B60W 10/08 180/65.25 |
| 2009/0112419 A1* | 4/2009 | Heap | B60K 6/445 701/55 |
| 2018/0029462 A1* | 2/2018 | Huh | B60K 6/547 |
| 2019/0291568 A1* | 9/2019 | Lian | B60K 6/42 |
| 2020/0247239 A1* | 8/2020 | Stoltz | B60K 6/26 |

FOREIGN PATENT DOCUMENTS

| | | |
|---|---|---|
| CN | 104608612 A | 5/2015 |
| CN | 104773063 A | 7/2015 |

* cited by examiner

POWER TRANSMISSION SYSTEM AND VEHICLE HAVING SAME

CROSS-REFERENCE TO RELATED APPLICATIONS

This application is the U.S. national phase entry of PCT Application No. PCT/CN2017/108367, filed Oct. 30, 2017, which is based on and claims priority to Chinese Patent Application No. 201610933134.8, filed on Oct. 31, 2016, which are incorporated herein by reference in their entireties.

FIELD

The present invention relates to the field of vehicle technologies, and in particular, to a power transmission system for a vehicle and a vehicle having the power transmission system.

BACKGROUND

With continuous consumption of energy sources, development and use of new energy vehicle models have gradually become a trend. A hybrid power automobile as one of new energy vehicle models is driven through an engine and/or a motor, has a plurality of modes, and may improve transmission efficiency and fuel economy.

However, in related technologies understood by the inventor, some hybrid power automobiles have a small quantity of driving modes and relatively low driving transmission efficiency, and therefore cannot satisfy a requirement of adaptability of vehicles to various road conditions. Particularly, after a hybrid power automobile is fed (when a power level of a battery is insufficient), the power performance and the passing-through capability of the entire vehicle are insufficient. Moreover, to implement a stationary power generation working condition, a transmission mechanism needs to be additionally added. As a result, the integration level is low, and the power generation efficiency is low.

SUMMARY

An objective of the present invention is to at least resolve one of the technical problems in the related art to some extent. In view of this, the present invention provides a power transmission system for a vehicle. The power transmission system has a large quantity of driving modes, and can effectively adjust power output to wheels, thereby enabling the vehicle to adapt to various road conditions.

The present invention further provides a vehicle.

The power transmission system for a vehicle according to the present invention includes: a power source; a first motor generator unit; a system power output portion; a first mode conversion device, where at least one of the power source and the first motor generator unit is power-coupled to or power-decoupled from the system power output portion through the first mode conversion device; and a second mode conversion device, where the power source can be power-coupled to or power-decoupled from the first mode conversion device through the second mode conversion device, the second mode conversion device includes a conversion device input shaft, a first conversion device intermediate shaft and a conversion device output shaft, and the conversion device output shaft is power-coupled to the first motor generator unit; and power from the power source is suitable for being decelerated sequentially through the conversion device input shaft, the first conversion device intermediate shaft and the conversion device output shaft and then output to the first mode conversion device.

Based on the power transmission system for a vehicle according to the present invention, by disposing the second mode conversion device, driving modes of the vehicle can be enriched, and economy and power performance of the vehicle can be improved. Moreover, the vehicle can adapt to different road conditions, the passing-through performance and the de-trapping capability of the vehicle can be notably improved, and driving experience of a driver can be improved. Moreover, the second mode conversion device not only can adjust the rotational speed and the torque of the conversion device output portion, but also can implement a function of stationary power generation. It is ensured that when the first motor generator performs driving and feedback, power is transmitted directly, and transmission efficiency is high, and it is also ensured that switching of stationary power generation modes is simple and reliable. Design of such a power transmission system enables control of the driving modes independent of each other, and the structure is compact and is easily implemented.

The vehicle according to the present invention includes the foregoing power transmission system for a vehicle.

DETAILED DESCRIPTION

The following describes embodiments of the present invention in detail. Examples of the embodiments are shown in the accompanying drawings. The following embodiments described with reference to the accompanying drawings are exemplary, and are intended to describe the present invention and cannot be construed as a limitation to the present invention.

A plurality of systems, for example, a power transmission system 1000 can be arranged on a hybrid power vehicle. The power transmission system 1000 may be configured to drive front wheels or rear wheels of the vehicle. Detailed description is made below through an example in which the power transmission system 1000 drives the front wheels of the vehicle. Certainly, the power transmission system 1000 may further drive the rear wheels of the vehicle to rotate in combination with another driving system, so that the vehicle is a four-wheel drive vehicle, and the another system may be an electric driving system 700.

A power transmission system 1000 according to an embodiment of the present invention is described in detail below with reference to accompanying drawings.

Figure 1:
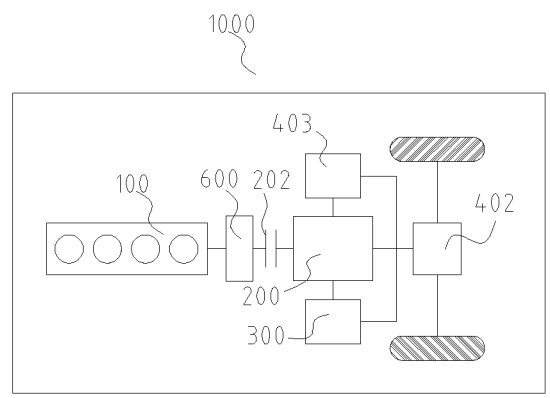
FIG. 1 to FIG. 3 are schematic diagrams of a power transmission system according to an embodiment of the present invention.
Figure 2:
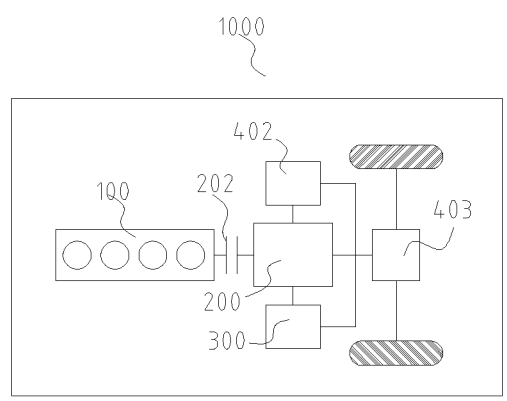
Figure 3:
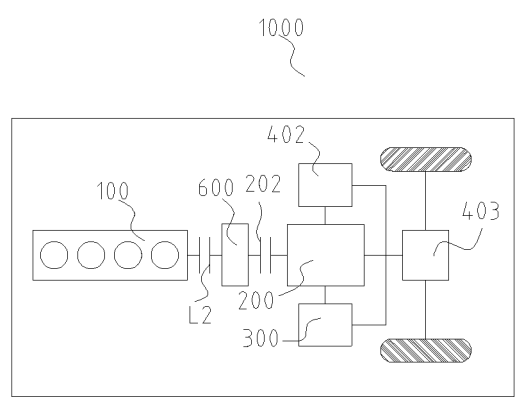

As shown in FIG. 1 to FIG. 3, the power transmission system 1000 may include: a power source 100, a speed change unit 200, a first motor generator unit 300, a system power output portion 401, a first mode conversion device 402, and a second mode conversion device 403. Certainly, the power transmission system 1000 may further include other mechanical components, for example, a second motor generator 600, a first clutch device 202 and a second clutch device L2.

The power source 100 may be an engine, and the speed change unit 200 is suitable for being selectively coupled to the power source 100. As shown in FIG. 1 to FIG. 3, the power source 100 may be axially connected to the speed change unit 200, where the first clutch device 202 may be disposed between the power source 100 and the speed change unit 200, and the first clutch device 202 may control a state of connection or disconnection between the power source 100 and the speed change unit 200. It may be understood that, the power source 100 may alternatively output power to the system power output portion 401 through the speed change unit 200.

The speed change unit 200 may be a transmission. Certainly, the present invention is not limited thereto. The speed change unit 200 may be further of another structure, for example, a gear speed reduction transmission structure.

Detailed description is made below through an example in which the speed change unit 200 is a transmission. The speed change unit 200 may have a plurality of arrangement forms, and a change in each of an input shaft, an output shaft, and a gear may form a new speed change unit 200. Detailed description is made below through the speed change unit 200 in the power transmission system 1000 shown in FIG. 4 an example.

Figure 4:
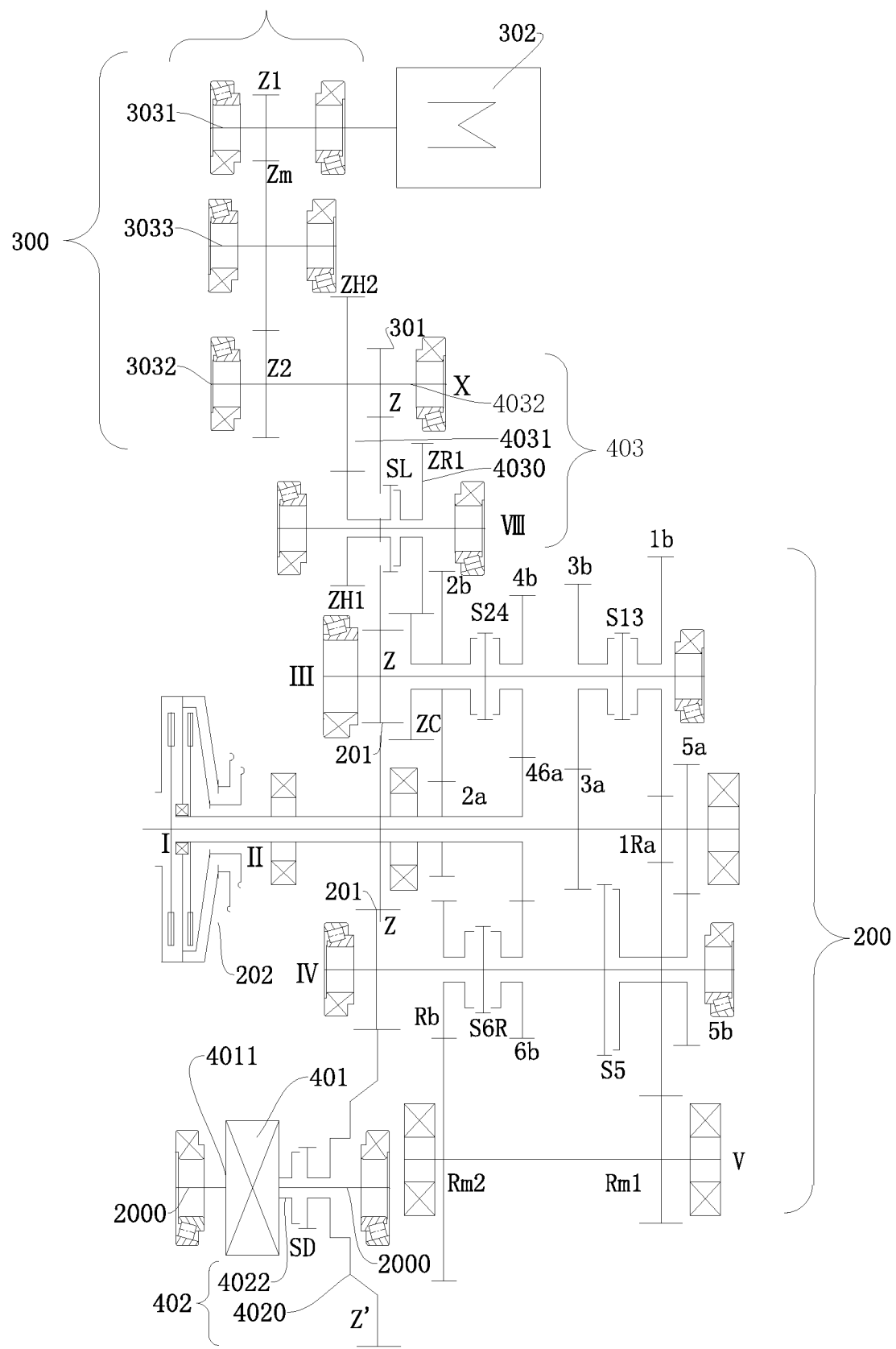
FIG. 4 to FIG. 21 are schematic structural diagrams of a power transmission system according to an embodiment of the present invention.

As shown in FIG. 4, the speed change unit 200 may include: a speed change power input portion, a speed change power output portion and a speed change unit output portion 201, the speed change power input portion may be selectively connected to the power source 100, and when the speed change power input portion is connected to the power source 100, the speed change unit 200 may transmit power generated by the power source 100. The first clutch device 202 may include an input end and an output end, the input end is connected to the power source 100, the output end is connected to the speed change power input portion, and when the input end is connected to the output end, the power source 100 is connected to the speed change power input portion to transfer power.

The speed change power output portion is constructed to be suitable for outputting power from the speed change power input portion to the speed change unit output portion 201 through synchronization of a speed change unit synchronizer, the speed change unit output portion 201 is power-coupled to the first mode conversion device 402, and the speed change power output portion is power-coupled to the second mode conversion device 403.

Specifically, as shown in FIG. 4, the speed change power input portion may include at least one input shaft, each input shaft may be selectively connected to the power source 100, and at least one driving gear is disposed on each input shaft.

The speed change power output portion includes: at least one output shaft, and each output shaft is suitable for being selectively power-coupled to a corresponding input shaft. For example, at least one driven gear is disposed on each output shaft, and the driven gear is meshed with a corresponding driving gear. In this way, the power from the power source 100 may be output to the speed change unit output portion 201, where one output shaft may be selectively power-coupled to the second mode conversion device 403.

The speed change unit output portion 201 is at least one main reducer driving gear Z, and the at least one main reducer driving gear Z is fixed on the at least one output shaft in a one-to-one correspondence. To be specific, the speed change unit output portion 201 may be an output gear on the output shaft, the output gear may be fixed on the corresponding output shaft, and the output gear is meshed with a main reducer driven gear to perform power transfer.

There may be a plurality of input shafts, and the plurality of input shafts is sequentially coaxially nested. When the power source 100 transfers power to an input shaft, the power source 100 may be selectively connected to one of the plurality of input shafts. The plurality of input shafts is coaxially nested, so that the speed change unit 200 may be arranged compactly, the axial length is small, and the radial size is small, thereby improving structure compactness of the speed change unit 200.

For example, as shown in FIG. 4, the speed change unit 200 may be a six-gear speed change unit, the speed change power input portion may include: a first input shaft I and a second input shaft II, the second input shaft II is sleeved on the first input shaft I, the first clutch device 202 may be a double clutch, the double clutch has an input end, a first output end and a second output end, and the input end may be selectively connected to at least one of the first output end and the second output end. To be specific, the input end may be connected to the first output end, or the input end may be connected to the second output end, or the input end may be connected to both the first output end and the second output end. The first output end is connected to the first input shaft I, and the second output end is connected to the second input shaft II.

Each of the first input shaft I and the second input shaft II is fixedly provided with at least one driving gear. Specifically, as shown in FIG. 4, a first-gear driving gear 1Ra, a third-gear driving gear 3a and a fifth-gear driving gear 5a are disposed on the first input shaft I, and a second-gear driving gear 2a and a fourth-sixth-gear driving gear 46a are disposed on the second input shaft II. The second input shaft II is sleeved on the first input shaft I. In this way, the axial length of the power transmission system 1000 may be effectively shortened, thereby reducing space of the vehicle occupied by the power transmission system 1000. The foregoing fourth-sixth-gear driving gear 46a means that the gear may be used as both a fourth-gear driving gear and a sixth-gear driving gear. In this way, the axial length of the second input shaft II may be shortened, thereby better reducing the volume of the power transmission system 1000.

According to distances from the engine, an arrangement order of a plurality of gearshift driving gears is the second-gear driving gear 2a, the fourth-sixth-gear driving gear 46a, the third-gear driving gear 3a, the first-gear driving gear 1Ra and the fifth-gear driving gear 5a. Locations of the plurality of gearshift driving gears are properly arranged, so that locations of a plurality of gearshift driven gears and a plurality of output shafts may be arranged properly. Therefore, the power transmission system 1000 may have a simple structure and a small volume.

The output shafts include: a first output shaft III and a second output shaft IV, at least one driven gear is freely sleeved on each of the first output shaft III and the second output shaft IV, a first-gear driven gear 1b, a second-gear driven gear 2b, a third-gear driven gear 3b and a fourth-gear driven gear 4b are freely sleeved on the first output shaft III, and a fifth-gear driven gear 5b and a sixth-gear driven gear 6b are freely sleeved on the second output shaft IV. The first-gear driving gear 1Ra is meshed with the first-gear driven gear 1b, the second-gear driving gear 2a is meshed with the second-gear driven gear 2b, the third-gear driving gear 3a is meshed with the third-gear driven gear 3b, the fourth-sixth-gear driving gear 46a is meshed with the fourth-gear driven gear 4b, the fifth-gear driving gear 5a is meshed with the fifth-gear driven gear 5b, and the fourth-sixth-gear driving gear 46a is meshed with the sixth-gear driven gear 6b. One of the foregoing output shafts may be the first output shaft III.

A first-third-gear synchronizer S13 is disposed between the first-gear driven gear 1b and the third-gear driven gear 3b, and the first-third-gear synchronizer S13 may be configured to synchronize the first-gear driven gear 1b with the first output shaft III, and may be configured to synchronize the third-gear driven gear 3b with the first output shaft III.

A second-fourth-gear synchronizer S24 is disposed between the second-gear driven gear 2b and the fourth-gear driven gear 4b, and the second-fourth-gear synchronizer S24 may be configured to synchronize the second-gear driven gear 2b with the first output shaft III, and may be configured to synchronize the fourth-gear driven gear 4b with the first output shaft III.

One side of the fifth-gear driven gear 5b is provided with a fifth-gear synchronizer S5, and the fifth-gear synchronizer S5 may be configured to synchronize the fifth-gear driven gear 5b with the second output shaft IV. One side of the sixth-gear driven gear 6b is provided with a sixth-gear synchronizer S6R, and the sixth-gear synchronizer S6R may be configured to synchronize the sixth-gear driven gear 6b with the second output shaft IV.

A reverse-gear driven gear Rb is freely sleeved on one of the plurality of output shafts, and a reverse-gear synchronizer configured to connect to the reverse-gear driven gear Rb is further disposed on the corresponding one output shaft. As shown in FIG. 4, a reverse-gear driven gear Rb is disposed on the second output shaft IV, and a reverse-gear synchronizer on the second output shaft IV may be configured to synchronize the reverse-gear driven gear Rb with the second output shaft IV.

Further, the power transmission system 1000 may further include: a transfer intermediate shaft V The first reverse-gear intermediate gear Rm1 and the second reverse-gear intermediate gear Rm2 may be fixedly disposed on the transfer intermediate shaft V, the first reverse-gear intermediate gear Rm1 is meshed with one of the gearshift driving gears (that is, driving gear), and the second reverse-gear intermediate gear Rm2 is meshed with the reverse-gear driven gear Rb. The one of the gearshift driving gears may be the first-gear driving gear 1Ra, power transferred to the first-gear driving gear 1Ra may be transferred to the transfer intermediate shaft V through the first reverse-gear intermediate gear Rm1, the transfer intermediate shaft V may transfer power to the reverse-gear driven gear Rb through the second reverse-gear intermediate gear Rm2, the reverse-gear driven gear Rb may transfer power to the second output shaft IV through the reverse-gear synchronizer, the second output shaft IV may transfer power to a main reducer driven gear Z' through the output gear of the second output shaft IV, and the main reducer driven gear Z' may transfer power to wheels on two sides through the system power output portion 401 to drive the vehicle to move. To be specific, each of the first output gear and the second output gear may be a main reducer driving gear Z, and the main reducer driving gear Z is meshed with the main reducer driven gear Z'.

Because the reverse-gear driven gear Rb is sleeved on the second output shaft IV, the reverse-gear driven gear Rb may share the reverse-gear synchronizer with another neighboring gearshift driven gear. In this way, a quantity of synchronizers arranged on the second output shaft IV may be reduced, thereby shortening the axial length of the second output shaft IV, and reducing costs of the power transmission system 1000. For example, the another neighboring gearshift driven gear may be the sixth-gear driven gear 6b. In other words, the reverse-gear synchronizer may form the sixth-gear synchronizer S6R. The reverse-gear synchronizer may be disposed between the sixth-gear driven gear 6b and the reverse-gear driven gear Rb.

Certainly, the present invention is not limited thereto. Detailed description is made below through a speed change unit 200 shown in FIG. 20 as an example.

Figure 20:
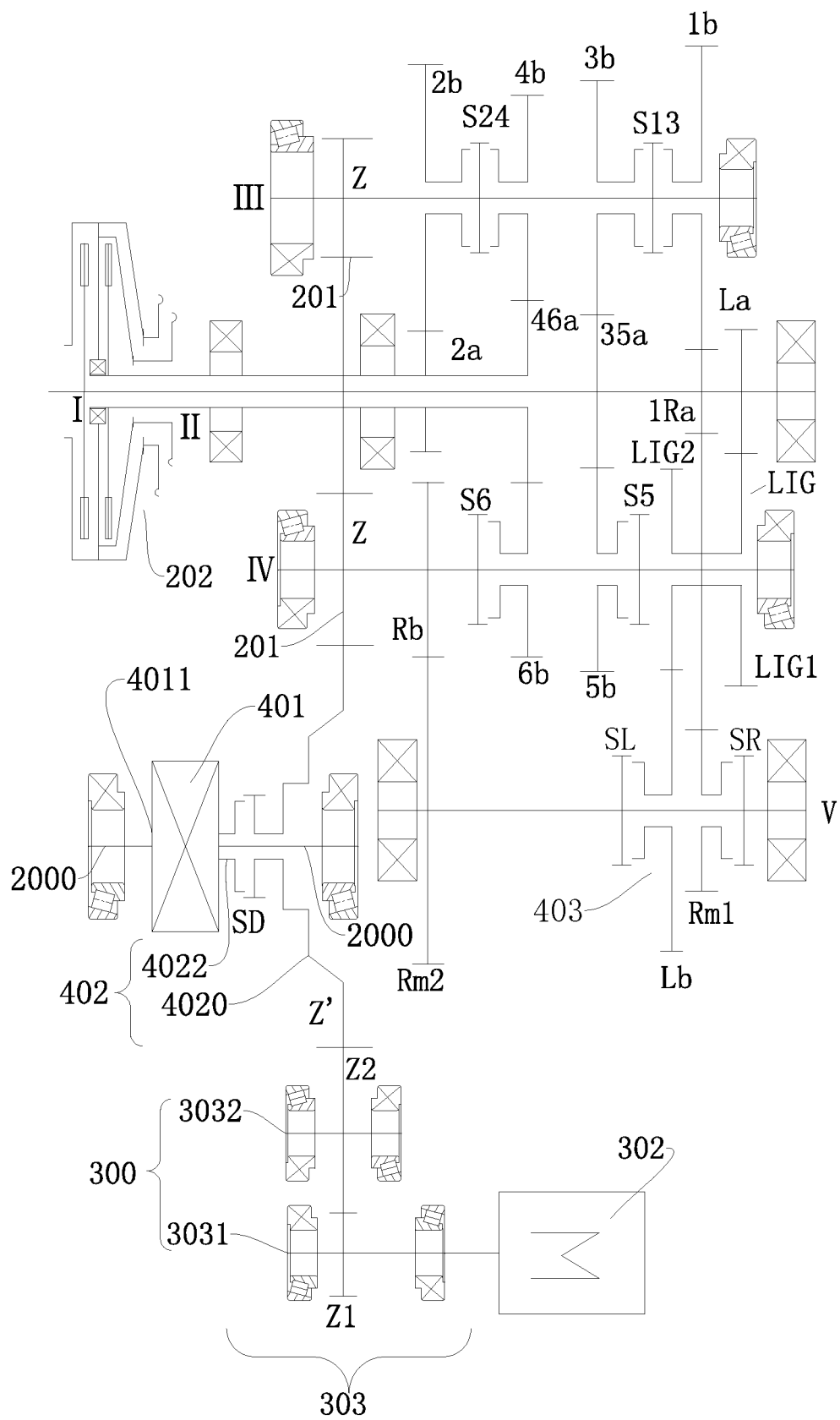

A main difference of the speed change unit 200 shown in FIG. 20 relative to the speed change unit 200 shown in FIG. 4 lies in that, the third-fifth-gear driving gear 35a is disposed on the first input shaft I, so as to replace the third-gear driving gear 3a and the fifth-gear driving gear 5a. In this way, a quantity of gears arranged on the first input shaft I may be further reduced, so that the speed change unit 200 is more compact in structure and more proper in design.

Figure 21:
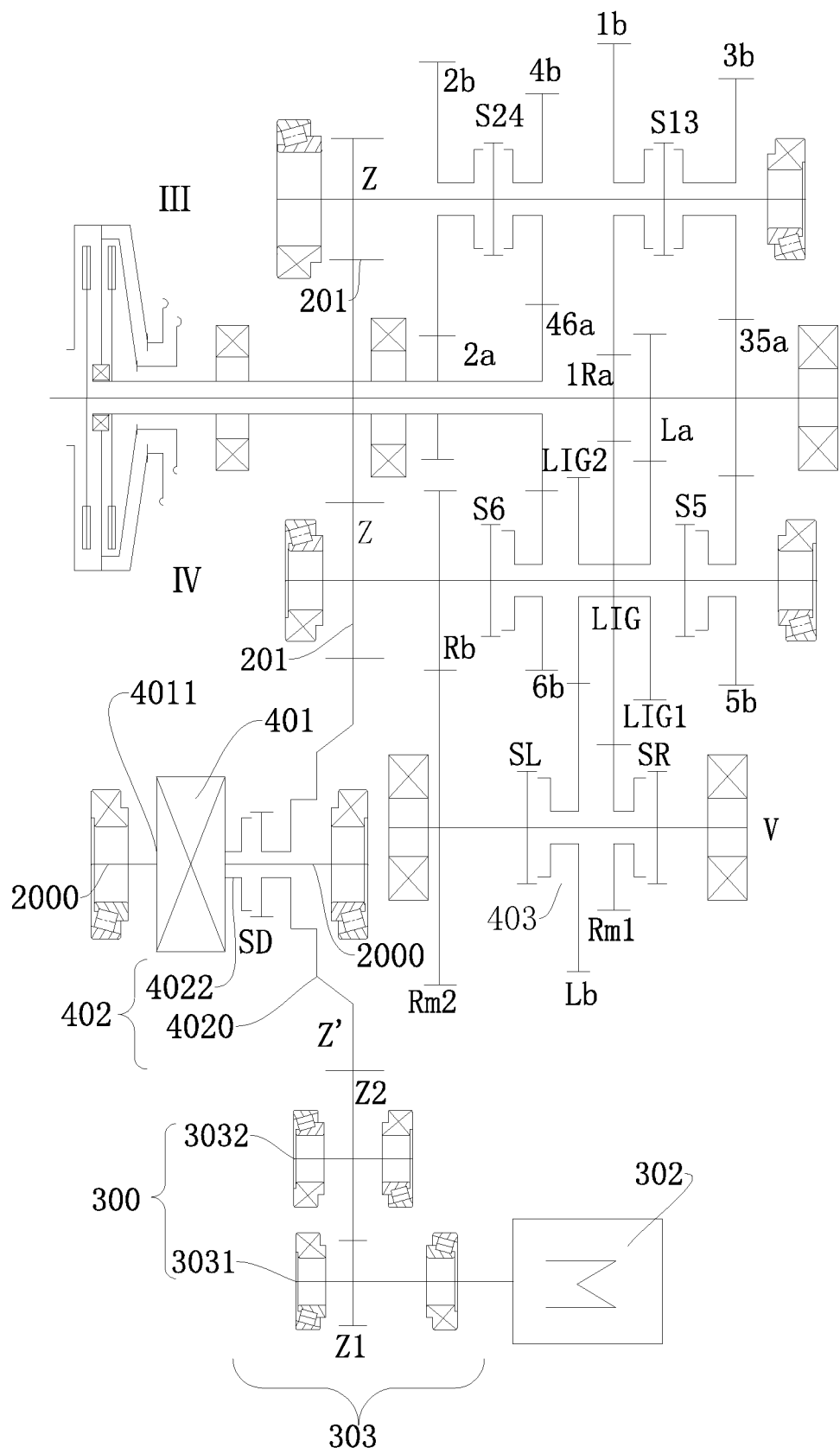

Moreover, the first reverse-gear intermediate gear Rm1 may be selectively power-coupled to the transfer intermediate shaft V For example, as shown in FIG. 20 and FIG. 21, a synchronizer SR may be fixedly disposed on the transfer intermediate shaft V, and the synchronizer SR may be configured to selectively synchronize the first reverse-gear intermediate gear Rm1 with the transfer intermediate shaft V.

At least one of the speed change unit 200 and the first motor generator unit 300 is power-coupled to or power-decoupled from the system power output portion 401 through the first mode conversion device 402. It may be understood that, the speed change unit 200 may output power to the system power output portion 401 through the first mode conversion device 402, that is, power output by the power source 1000 is output to the first mode conversion device 402 through one output gear of the speed change unit 200, and then output to the system power output portion 401 through the first mode conversion device 402, the first motor generator unit 300 may output power to the system power output portion 401 through the first mode conversion device 402, and both the speed change unit 200 and the first motor generator unit 300 may output power to the system power output portion 401 through the first mode conversion device 402. In this way, a transfer path from the first motor generator unit 300 to the system power output portion 401 is relatively short, so that the first motor generator unit 300 is high in transmission efficiency and small in energy loss.

Moreover, the speed change unit 200 may be power-coupled to or power-decoupled from the first mode conversion device 402 through the second mode conversion device 403, the speed change unit 200 may be power-coupled to the first mode conversion device 402 through the second mode conversion device 403, so that the power from the power source 100 is decelerated sequentially through the speed change unit 200 and the second mode conversion device 403 and then output to the first mode conversion device 402. To be specific, the second mode conversion device 403 may control a power transfer state between the speed change unit 200 and the first mode conversion device 402. In this way, the power of the power source 100 may be decelerated through the speed change unit 200 and then decelerated through the second mode conversion device 403, and then output to the first mode conversion device 402. In this case, the power transmission system 1000 enters an ultra-low speed gear mode, and the second mode conversion device 403 enters an L gear mode, so that output power output manners of the power source 100 may be enriched. In this way, driving modes of the vehicle may be enriched, so that a quantity of the driving modes of the vehicle is relatively large, and driving pleasure of the driver may be improved. Additionally, the second mode conversion device 403 may further play a role of speed reduction and torque increase, and may improve the passing-through performance of the vehicle.

In this way, the first mode conversion device 402 and the second mode conversion device 403 increase a quantity of gears of the entire vehicle, the maximum output torque of the entire vehicle may be amplified by N times, and the power performance and the passing-through capability (for example, the maximum gradeability or the de-trapping capability) are improved. Particularly, for a conventional hybrid power vehicle model, because a battery pack, a motor, and an electric control system are added, the mass of the entire vehicle is large. Only power output of an engine may be relied on after feeding. In this case, the passing-through capability and the power performance deteriorate greatly. However, use of the second mode conversion device 403 of this embodiment of the present invention may effectively improve the power performance and the passing-through capability, and rich driving modes of the vehicle are provided, so that the vehicle adapts to more different working conditions.

The first mode conversion device 402 may facilitate intervention of the first motor generator unit 300 when the power source 100 is working, and the power source 100 and the first motor generator unit 300 connected in parallel may make, through direct torque coupling, advantages of strong power performance of the parallel-connected structure, a simple structure and easy space arrangement of the entire vehicle more outstanding.

Under a pure electric working condition, the first motor generator unit 300 has quite high transmission efficiency, and the first mode conversion device 402 is disposed to separate the speed change unit 200, wheels, and the first motor generator 302, so that any two of the three parties may bypass a third party to work. For example, the speed change unit 200 transfers power to the wheels through the first mode conversion device 402, and in this case, the vehicle is under a pure fuel working condition. For another example, the speed change unit 200 transfers power to the first motor generator 302 through the first mode conversion device 402, and in this case, the vehicle is under a stationary power generation working condition. For still another example, the first motor generator 302 transfers power to the wheels through the first mode conversion device 402, and in this case, the vehicle is under a pure electric working condition. Additionally, such a way may further avoid a problem that a pure electric working condition needs to be implemented through a complex gear change during a speed change and a transmission chain in a usually hybrid power transmission system, and is particularly applicable to a plug-in hybrid power vehicle. Certainly, the three parties may alternatively work at the same time.

On control logic, the power transmission system 1000 provided in the present invention does not change the basic architecture and the gear change logic of the double clutch speed change, and intervention of the first motor generator unit 300 is only represented in torque superposition at the output end. Therefore, the control logic of the power source 100 and the speed change unit 200 is independent of the control logic of the first motor generator unit 300, the power output of the engine and the power output of the first motor generator 302 are relatively independent, and each output control logic of the power source is simple and easy to implement. Moreover, such a way facilitates saving of development time and costs of a manufacturer, and avoidance of a relatively high fault rate of the system. Even if the engine and the speed change unit 200 have a system fault, the power output of the first motor generator unit 300 under the pure electric working condition is not affected.

Further, the speed change unit 200 only needs to implement a speed change and a torque change in the power of the engine. In this way, the speed change unit 200 does not need an additional design change, so as to facilitate miniaturization of the speed change unit 200, thereby reducing the development costs of the entire vehicle and shortening the development period.

When at least one of the speed change unit 200 and the first motor generator unit 300 is disconnected from the system power output portion 401 through the first mode conversion device 402, the power output by the power source 100 is suitable for driving the first motor generator unit 300 sequentially through the speed change unit 200 and the first mode conversion device 402 to perform power generation. In this way, neither the power source 100 nor the first motor generator unit 300 outputs power to the system power output portion 401, and the power of the power source 100 may be used to drive the first motor generator unit 300 to perform power generation, thereby reducing energy waste of the vehicle, improving driving efficiency of the vehicle, and prolonging travelling mileage of the vehicle.

As shown in FIG. 4 to FIG. 21, the first mode conversion device 402 includes a first conversion device input portion 4020 and a first conversion device output portion 4022, the first conversion device input portion 4020 is selectively connected to the first conversion device output portion 4022, the first conversion device input portion 4020 is power-coupled to the speed change unit 200, the first conversion device input portion 4020 is power-coupled to the first motor generator unit 300, and the first conversion device output portion 4022 is fixedly disposed on the system power output portion 401. In this way, the first mode conversion device 402 may control switching on/off between the system power output portion 401, the power source 100, and the first motor generator unit 300 by controlling a state of connection or disconnection between the first conversion device input portion 4020 and the first conversion device output portion 4022, and the control manner is simple and convenient, and may help the power of the power source 100 drive the first motor generator unit 300 to perform power generation, so that vehicle transmission is reliable, and mode switching efficiency is high.

The system power output portion 401 may be a differential, but is not limited thereto. Description is made below through an example in which the system power output portion 401 is a differential.

As shown in FIG. 4, the first conversion device input portion 4020 is freely sleeved on a half shaft 2000 of the vehicle, and the first conversion device output portion 4022 is sleeved on the half shaft of the vehicle 2000. Specifically, the first conversion device output portion 4022 may be fixedly connected to the input end of the differential. In this way, the first conversion device output portion 4022 may be further freely sleeved on the half shaft 2000 of the vehicle. By properly arranging locations of the first conversion device input portion 4020 and the first conversion device output portion 4022, the power transmission system 1000 may have proper structure arrangement and proper space arrangement.

As shown in FIG. 4, the first mode conversion device 402 may further include a first conversion device connector SD, and the first conversion device connector SD is configured to selectively synchronize the first conversion device input portion 4020 with the first conversion device output portion 4022. The location of the first conversion device connector SD is not limited, and the first conversion device connector SD may be disposed on the first conversion device input portion 4020. In this way, the first conversion device connector SD may be configured to selectively connect to the first conversion device output portion 4022 to connect the first conversion device input portion 4020 and the first conversion device output portion 4022.

Alternatively, the first conversion device connector SD may be disposed on the first conversion device output portion 4022. In this way, the first conversion device connector SD may be configured to selectively connect to the first conversion device input portion 4020 to connect the first conversion device input portion 4020 and the first conversion device output portion 4022.

Because the first conversion device input portion 4020 is the input end of the first mode conversion device 402, the speed change unit 200 may be power-coupled to or power-decoupled from the first conversion device input portion 4020 through the second mode conversion device 403.

As shown in FIG. 4, the first motor generator unit 300 includes a first motor generator unit coupling portion 301, and each of the speed change unit output portion 201 and the first motor generator unit coupling portion 301 may be power-coupled to the first conversion device input portion 4020. In this way, the power of the power source 100 may be decelerated through the speed change unit 200 and then transferred to the first conversion device input portion 4020 through the speed change unit output portion 201, and the power of the first motor generator 302 may be transferred to the first conversion device input portion 4020 through the first motor generator unit coupling portion 301.

Each of the speed change unit output portion 201 and the first motor generator unit coupling portion 301 may be a main reducer driving gear Z, the first conversion device input portion 4020 may be a main reducer driven gear Z', and the main reducer driven gear Z' is meshed with the main reducer driving gear Z. In this way, the main reducer driven gear Z' is directly meshed with the main reducer driving gear Z, so that the power transmission system 1000 has high transmission efficiency, transmission is reliable, and energy loss may be reduced.

The speed change unit 200 may be power-coupled to or power-decoupled from the first motor generator unit 300 through the second mode conversion device 403, and the first motor generator unit 300 is power-coupled to the first mode conversion device 402. For example, the first motor generator unit coupling portion 301 is connected to the first conversion device input portion 4020. To be specific, power transfer between the power source 100 and the first motor generator unit 300 may be changed by controlling a connection or disconnection state of the second mode conversion device 403, and a manner of power transfer between the first motor generator unit 300 and the first mode conversion device 402 is direct transfer. To be specific, power of the first motor generator unit 300 may be directly transferred to the first mode conversion device 402, and power of the first mode conversion device 402 may be directly transferred to the first motor generator unit 300.

Specifically, as shown in FIG. 4, the first motor generator unit 300 may include a first motor generator 302 and a first motor generator unit coupling portion 301, the first motor generator unit coupling portion 301 is power-coupled to the first mode conversion device 402, and the first motor generator 302 is power-coupled to the first motor generator unit coupling portion 301. In this way, the first motor generator 302 may directly output power to the first conversion device input portion 4020 through the first motor generator unit coupling portion 301.

The first motor generator unit coupling portion 301 may be power-coupled to or power-decoupled from the speed change unit 200 through the second mode conversion device 403, and when the first motor generator unit coupling portion 301 is power-coupled to the speed change unit 200 through the second mode conversion device 403, the power from the power source 100 is decelerated sequentially through the speed change unit 200, the second mode conversion device 403, and the first motor generator unit coupling portion 301 and then output to the first mode conversion device 402. The speed change unit 200, the second mode conversion device 403 may decelerate the power of the power source 100 twice, thereby playing a role of speed reduction and torque increase, and improving the passing-through capability of the vehicle.

The second mode conversion device 403 is configured to be selectively power-coupled to the speed change unit 200 and the first motor generator 302. Specifically, the second mode conversion device 403 is configured to be selectively power-coupled to the speed change unit 200 and the first motor generator unit coupling portion 301, where one of driven gears on one output shaft in the speed change unit 200 may be power-coupled to the first motor generator unit coupling portion 301 through the second mode conversion device 403, and where the one of the driven gears may be the second-gear driven gear 2b. The speed change unit 200 is power-coupled to the first motor generator 302 through the second mode conversion device 403, so that the power from the power source 100 is suitable for driving the first motor generator 302 through the speed change unit 200 and the second mode conversion device 403 to perform power generation. In this way, a part of the power of the power source 100 may be used by the first motor generator to perform power generation, and when the first conversion device input portion 4020 and the first conversion device output portion 4022 in the first mode conversion device 402 are connected, another part of the power may be used to drive the wheels to rotate. In this way, the power transfer manner between the power source 100 and the first motor generator 302 is simple and reliable, and in a transmission process, the second mode conversion device 403 may play a role of speed reduction and torque increase, so that the output power is suitable, and the passing-through capability of the vehicle may be improved.

The first motor generator unit coupling portion 301 may be power-coupled to or power-decoupled from the first conversion device input portion 4020 through the second mode conversion device 403.

According to a first preferred embodiment of the present invention, as shown in FIG. 4, the second mode conversion device 403 may include a second conversion device input portion 4030, a conversion portion 4031, and a second conversion device output portion 4032. The second conversion device output portion 4032 is power-coupled to the first motor generator unit coupling portion 301, and the power from the power source 100 is suitable for being decelerated sequentially through the speed change unit 200, the second conversion device input portion 4030, the conversion portion 4031, and the second conversion device output portion 4032 and then output to the first motor generator unit coupling portion 301. In this way, when being transferred between the second conversion device input portion 4030, the conversion portion 4031, and the second conversion device output portion 4032, the power of the power source 100 may be decelerated once, and then output through the first motor generator unit coupling portion 301.

Moreover, the second conversion device output portion 4032 is power-coupled to the first motor generator 302, and the power from the power source 100 is suitable for driving the first motor generator 302 sequentially through the speed change unit 200, the second conversion device input portion 4030, the conversion portion 4031, and the second conversion device output portion 4032 to perform power generation. In this way, a quantity of driving forms in which the power source 100 drives the first motor generator 302 to perform power generation may be increased, thereby enriching driving modes of the vehicle.

As shown in FIG. 4, the second conversion device input portion 4030 is power-coupled to the speed change power output portion, the second conversion device input portion 4030 may be selectively power-coupled to the conversion portion 4031, and the conversion portion 4031 is power-coupled to the second conversion device output portion 4032. It may be understood that, by controlling the state of connection or disconnection between the second conversion device input portion 4030 and the conversion portion 4031, the state of power transfer between the speed change unit 200 and the second mode conversion device 403 may be controlled.

Further, as shown in FIG. 4, the second mode conversion device 403 may further include a second conversion device connector SL, and the second conversion device input portion 4030 is selectively power-coupled to the conversion portion 4031 through the second conversion device connector SL. The second conversion device connector SL may be a synchronizer. Specifically, the second conversion device connector SL may be a gear synchronizer.

Optionally, as shown in FIG. 4, the second mode conversion device 403 may include: a conversion device input shaft VIII, a conversion device output shaft X, and a first conversion gear ZH1 and a second conversion gear ZH2 meshed with each other, the first conversion input gear ZR1 is freely sleeved on the conversion device input shaft VIII, the first conversion input gear ZR1 is the second conversion device input portion 4030, and the first conversion input gear ZR1 and the speed change power output portion perform transmission, where the speed change power output portion may be the first output shaft. Specifically, the first conversion input gear ZR1 may be linked to the second-gear driven gear 2b on the first output shaft.

The conversion device output shaft X is the second conversion device output portion 4032, the first conversion gear ZH1 is freely sleeved on the conversion device input shaft VIII, the second conversion gear ZH2 is fixed on the conversion device output shaft X, and the first conversion gear ZH1 and the second conversion gear ZH2 meshed with each other are the conversion portion 4031. It may be understood that, when the first conversion input gear ZR1 is connected to the first conversion gear ZH1, the power of the power source 100 may be output to the conversion device output shaft X through the speed change power output portion of the speed change unit 200, the first conversion input gear ZR1, the first conversion gear ZH1 and the second conversion gear ZH2, and the power is output by the conversion device output shaft X to the first mode conversion device 402 through the first motor generator unit coupling portion 301.

Specifically, as shown in FIG. 4, the second conversion device connector SL is disposed on one of the first conversion input gear ZR1 and the first conversion gear ZH1, and the first conversion input gear ZR1 is selectively connected to the first conversion gear ZH1 through the second conversion device connector SL.

Figure 5:
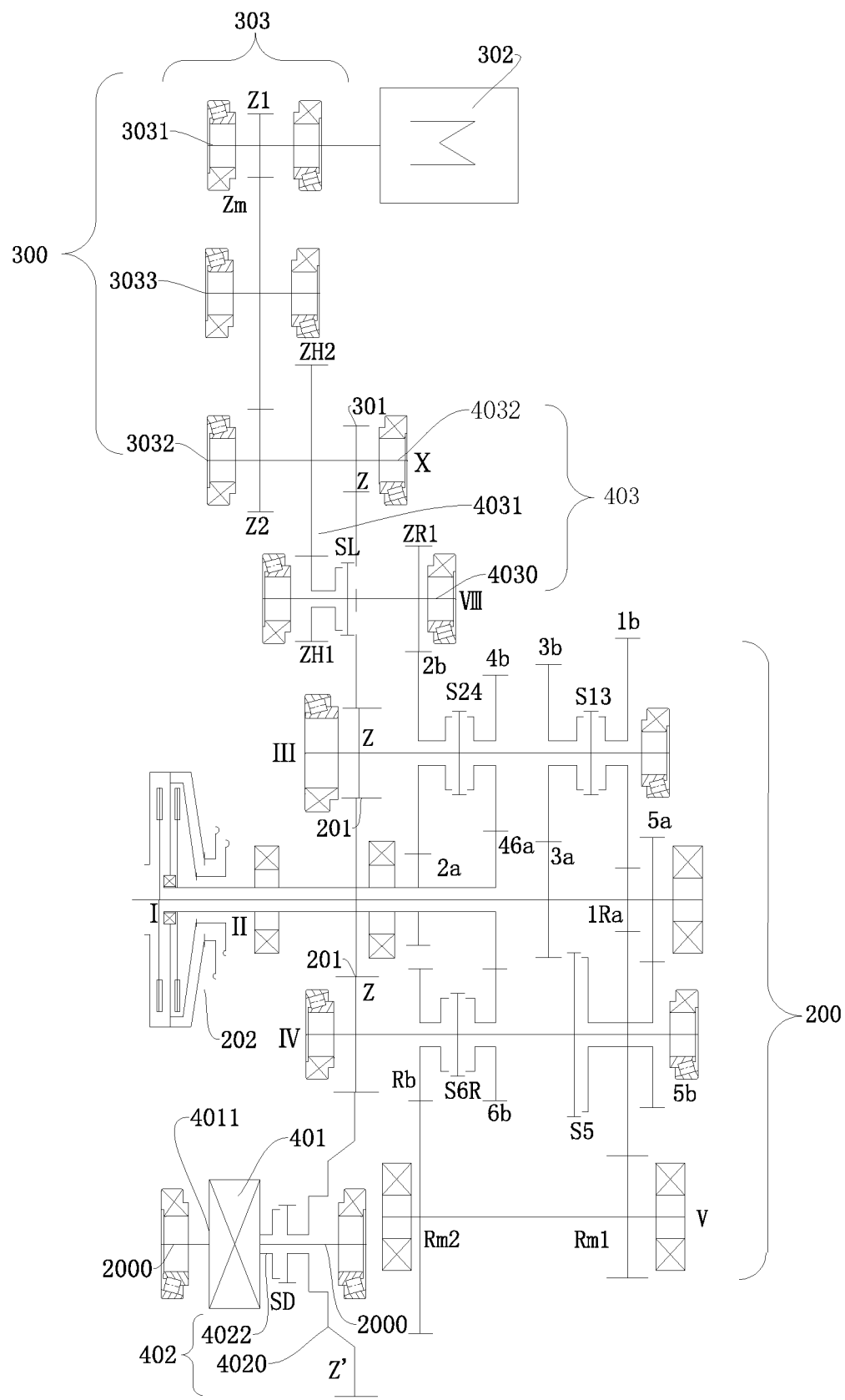

Additionally, optionally, as shown in FIG. 5, the second mode conversion device 403 may include: a conversion device input shaft VIII, a conversion device output shaft X, and a first conversion gear ZH1 and a second conversion gear ZH2 meshed with each other, the conversion device input shaft VIII is the second conversion device input portion 4030, the conversion device output shaft X is the second conversion device output portion 4032, the second conversion gear ZH2 is fixed on the conversion device output shaft X, and the first conversion gear ZH1 and the second conversion gear ZH2 meshed with each other are the conversion portion 4031. In this way, the speed change power output portion directly transfers power to the conversion device input shaft VIII, and the conversion device input shaft VIII may be selectively power-coupled to the first conversion gear ZH1.

Specifically, as shown in FIG. 5, the second conversion device connector SL is disposed on one of the conversion device input shaft VIII and the first conversion gear ZH1, and the conversion device input shaft VIII is selectively connected to the first conversion gear ZH1 through the second conversion device connector SL.

The first conversion input gear ZR1 is fixedly disposed on the conversion device input shaft VIII, and the first conversion input gear ZR1 may be selectively power-coupled to the power source 100. Specifically, the first conversion input gear ZR1 is linked to the second-gear driven gear 2b in the speed change unit 200. The first motor generator unit coupling portion 301 is fixed on the conversion device output shaft X.

As shown in FIG. 4 and FIG. 5, the first motor generator unit 300 may further include a speed reduction chain 303, and the first motor generator 302 is power-coupled to the first motor generator unit coupling portion 301 through the speed reduction chain 303. The speed reduction chain may play a role of speed reduction. As shown in FIG. 4, the speed reduction chain may include a first shaft 3031, a second shaft 3032 and a third shaft 3033, where a gear 1 Z1, a gear 2 Z2 and a gear 3 Z3 are respectively fixed on the first shaft 3031, the second shaft 3032 and the third shaft 3033, the first motor generator 302 is fixedly connected to the first shaft, the gear 3 Z3 is meshed between the gear 1 Z1 and the gear 2 Z2, and the second shaft is the foregoing conversion device output shaft X.

According to a second preferred embodiment of the present invention, a main difference between the speed change unit 200 shown in FIG. 6 to FIG. 12 and the speed change unit 300 shown in FIG. 4 and FIG. 5 lies in that: the speed change power output portion includes: the transfer intermediate shaft V, the transfer intermediate shaft V is suitable for transmitting power from one of the input shafts to a corresponding output shaft, and the transfer intermediate shaft V may be selectively power-coupled to the second mode conversion device 403. Therefore, it may be understood that, the power of the first motor generator 302 may pass through the second mode conversion device 403 and then is output to the first mode conversion device 402 through the transfer intermediate shaft V and one of the output shafts. The foregoing one of the input shafts may be the first input shaft, and the transfer intermediate shaft V and the first input shaft may be power-coupled to each other. For example, the transfer intermediate shaft V may be power-coupled to the first-gear driving gear 1Ra on the first input shaft.

Moreover, the transfer intermediate shaft V can be power-coupled to or power-decoupled from the first conversion device input portion 4020 through the second mode conversion device 403. To be specific, the power transferred to the transfer intermediate shaft V may pass through the second mode conversion device 403 and then is transferred to the first conversion device input portion 4020. In this way, speed reduction and torque increase during power transfer may be implemented, and the passing-through capability of the vehicle may be improved. In this way, the power of the power source 100 may be decelerated sequentially through the input shaft, the transfer intermediate shaft V, and the second mode conversion device 403 and then output to the first mode conversion device 402.

Further, the transfer intermediate shaft V can be power-coupled to or power-decoupled from the first motor generator unit 300 through the second mode conversion device 403, and the first motor generator unit 300 is power-coupled to the first mode conversion device 402. In this way, the first motor generator unit 300 may independently output power to the first mode conversion device 402, and the first motor generator unit 300 may alternatively be coupled to the power of the power source 100 at the second mode conversion device 403 and then output the power to the first mode conversion device 402. Therefore, a quantity of driving modes of the power transmission system 1000 is relatively large, and the power performance and the economy of the vehicle are relatively good.

When at least one of the output shaft and the first motor generator unit 300 is disconnected from the system power output portion 401 through the first mode conversion device 402, the power output by the power source 100 is suitable for driving the first motor generator 302 sequentially through the input shaft, the output shaft, and the first mode conversion device 402 to perform power generation.

Specifically, as shown in FIG. 6 to FIG. 11, the first motor generator unit 300 includes a first motor generator 302 and a first motor generator unit coupling portion 301, the first motor generator unit coupling portion 301 is power-coupled to the first mode conversion device 402, the first motor generator 302 is power-coupled to the first motor generator unit coupling portion 301, the first motor generator unit coupling portion 301 can be power-coupled to or power-decoupled from the transfer intermediate shaft V through the second mode conversion device 403, and the first motor generator unit coupling portion 301 is power-coupled to the transfer intermediate shaft V through the second mode conversion device 403, so that the power from the power source 100 is decelerated sequentially through the input shaft, the transfer intermediate shaft V, the second mode conversion device 403, and the first motor generator unit coupling portion 301 and then output to the first mode conversion device 402. In this way, the power output by the power source 100 may be decelerated twice and then output to the first mode conversion device 402, thereby playing a role of speed reduction and torque increase, and improving the passing-through capability of the vehicle.

The second mode conversion device 403 is configured to be selectively power-coupled to the transfer intermediate shaft V and the first motor generator 302, and after the transfer intermediate shaft V is power-coupled to the first motor generator 302 through the second mode conversion device 403, the power from the power source 100 is suitable for driving the first motor generator 302 through the input shaft, the transfer intermediate shaft V, and the second mode conversion device 403 to perform power generation. In this way, the power of the power source 100 may be used to drive the first motor generator 302 to perform power generation, thereby avoiding energy waste of the vehicle, improving the economy of the vehicle, and prolonging the travelling mileage of the vehicle.

The second conversion device output portion 4032 is power-coupled to the first motor generator unit coupling portion 301, the transfer intermediate shaft V may be selectively power-coupled to the second conversion device output portion 4032, and the power from the power source 100 is suitable for being decelerated sequentially through the input shaft, the transfer intermediate shaft V, the second conversion device input portion 4030, the conversion portion 4031, and the second conversion device output portion 4032 and then output to the first motor generator unit coupling portion 301.

When at least one of the output shaft and the first motor generator unit 300 is disconnected from the system power output portion 401 through the first mode conversion device 402, the power output by the power source 100 is suitable for driving the first motor generator unit 300 sequentially through the input shaft, the output shaft, and the first mode conversion device 402 to perform power generation. In this way, the power generation driving modes of the first motor generator 302 of the vehicle may be enriched, and the power performance and the economy of the vehicle may be improved.

Figure 6:
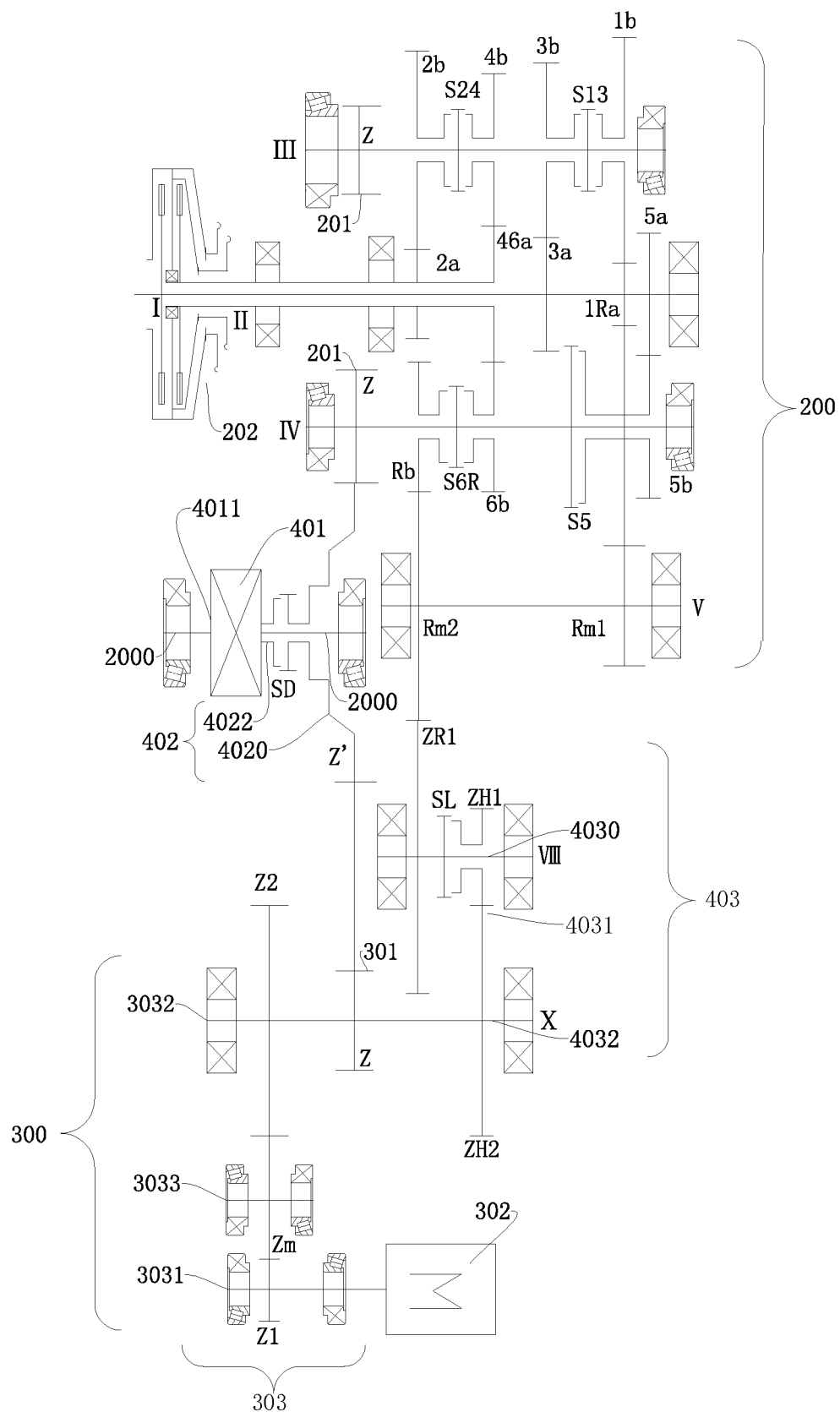

As shown in FIG. 6, the second mode conversion device 403 may include a second conversion device input portion 4030, a conversion portion 4031, and a second conversion device output portion 4032. The second conversion device output portion 4032 is power-coupled to the first motor generator unit coupling portion 301, the transfer intermediate shaft V may be selectively power-coupled to the second conversion device output portion 4032, and the power from the power source 100 is suitable for being decelerated sequentially through the input shaft in the speed change unit 200, the transfer intermediate shaft V, the second conversion device input portion 4030, the conversion portion 4031, and the second conversion device output portion 4032 and then output to the first motor generator unit coupling portion 301. In this way, when being transferred between the second conversion device input portion 4030, the conversion portion 4031, and the second conversion device output portion 4032, the power of the power source 100 may be decelerated once, and then output through the first motor generator unit coupling portion 301.

Moreover, the second conversion device output portion 4032 is power-coupled to the first motor generator 302, and the power from the power source 100 is suitable for driving the first motor generator 302 sequentially through the input shaft in the speed change unit 200, the transfer intermediate shaft V, the second conversion device input portion 4030, the conversion portion 4031, and the second conversion device output portion 4032 to perform power generation. In this way, a quantity of driving forms in which the power source 100 drives the first motor generator 302 to perform power generation may be increased, thereby enriching driving modes of the vehicle.

According to a first specific embodiment of the present invention, as shown in FIG. 6, FIG. 7, FIG. 10 and FIG. 11, the second conversion device input portion 4030 may be selectively power-coupled to the transfer intermediate shaft V, the second conversion device input portion 4030 may be selectively power-coupled to the conversion portion 4031, and the conversion portion 4031 is power-coupled to the second conversion device output portion 4032. When the second conversion device input portion 4030 is power-coupled to the conversion portion 4031, the power transferred to the transfer intermediate shaft V may be output to the second conversion device output portion 4032 through the second conversion device input portion 4030 and the conversion portion 4031.

The second mode conversion device 403 may further include a second conversion device connector SL, and the second conversion device input portion 4030 is selectively power-coupled to the conversion portion 4031 through the second conversion device connector SL.

Figure 10:
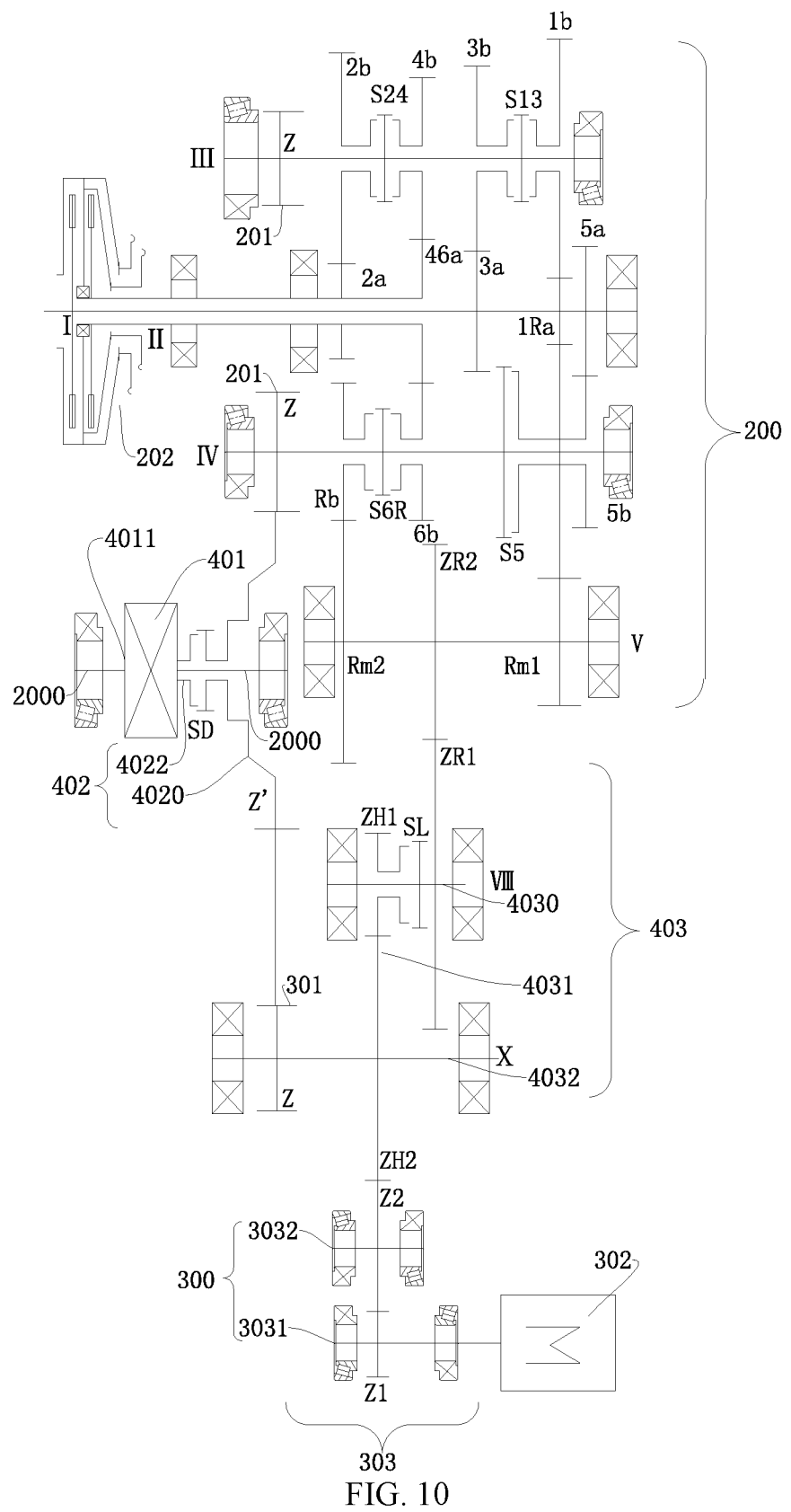

Optionally, as shown in FIG. 6 and FIG. 10, the second mode conversion device 403 may include: a conversion device input shaft VIII, a conversion device output shaft X, and a first conversion gear ZH1 and a second conversion gear ZH2 meshed with each other, the conversion device input shaft VIII is the second conversion device input portion 4030, the conversion device output shaft X is the second conversion device output portion 4032, the first conversion gear ZH1 is freely sleeved on the conversion device input shaft VIII, the second conversion gear ZH2 is fixed on the conversion device output shaft X, and the first conversion gear ZH1 and the second conversion gear ZH2 meshed with each other are the conversion portion 4031. In this way, the speed change power output portion directly transfers power to the conversion device input shaft VIII, and the conversion device input shaft VIII may be selectively power-coupled to the first conversion gear ZH1.

Specifically, as shown in FIG. 6, the second conversion device connector SL is disposed on one of the conversion device input shaft VIII and the first conversion gear ZH1, and the conversion device input shaft VIII is selectively connected to the first conversion gear ZH1 through the second conversion device connector SL.

Moreover, as shown in FIG. 6 and FIG. 10, the first conversion input gear ZR1 is fixedly disposed on the conversion device input shaft VIII, and the first conversion input gear ZR1 is power-coupled to the transfer intermediate shaft V.

As shown in FIG. 6 and FIG. 10, a second conversion input gear ZR2 may be fixed on the transfer intermediate shaft V, and the second conversion input gear ZR2 is meshed with the first conversion input gear ZR1.

As shown in FIG. 6, the first reverse-gear intermediate gear Rm1 and the second reverse-gear intermediate gear Rm2 are fixedly disposed on the transfer intermediate shaft V, the first reverse-gear intermediate gear Rm1 is meshed with one of at least one driving gear, the second reverse-gear intermediate gear Rm2 is meshed with the reverse-gear driven gear Rb, and the second reverse-gear intermediate gear Rm2 may be the second conversion input gear. The one of the at least one driving gear may be the first-gear driving gear 1Ra.

As shown in FIG. 10, in the axial direction of the transfer intermediate shaft V, the second conversion input gear ZR2 is located between the first reverse-gear intermediate gear Rm1 and the second reverse-gear intermediate gear Rm2.

Figure 7:
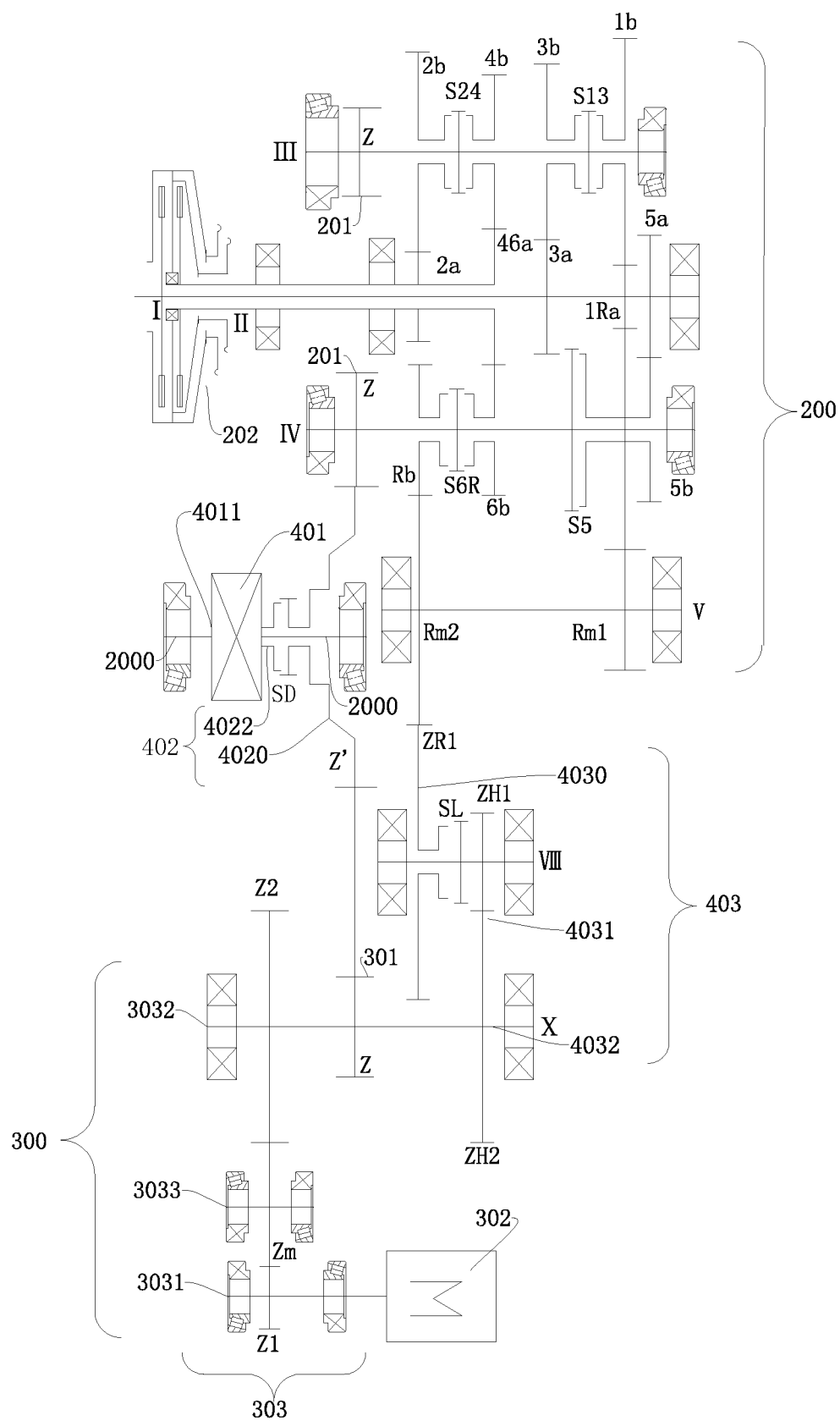
Figure 11:
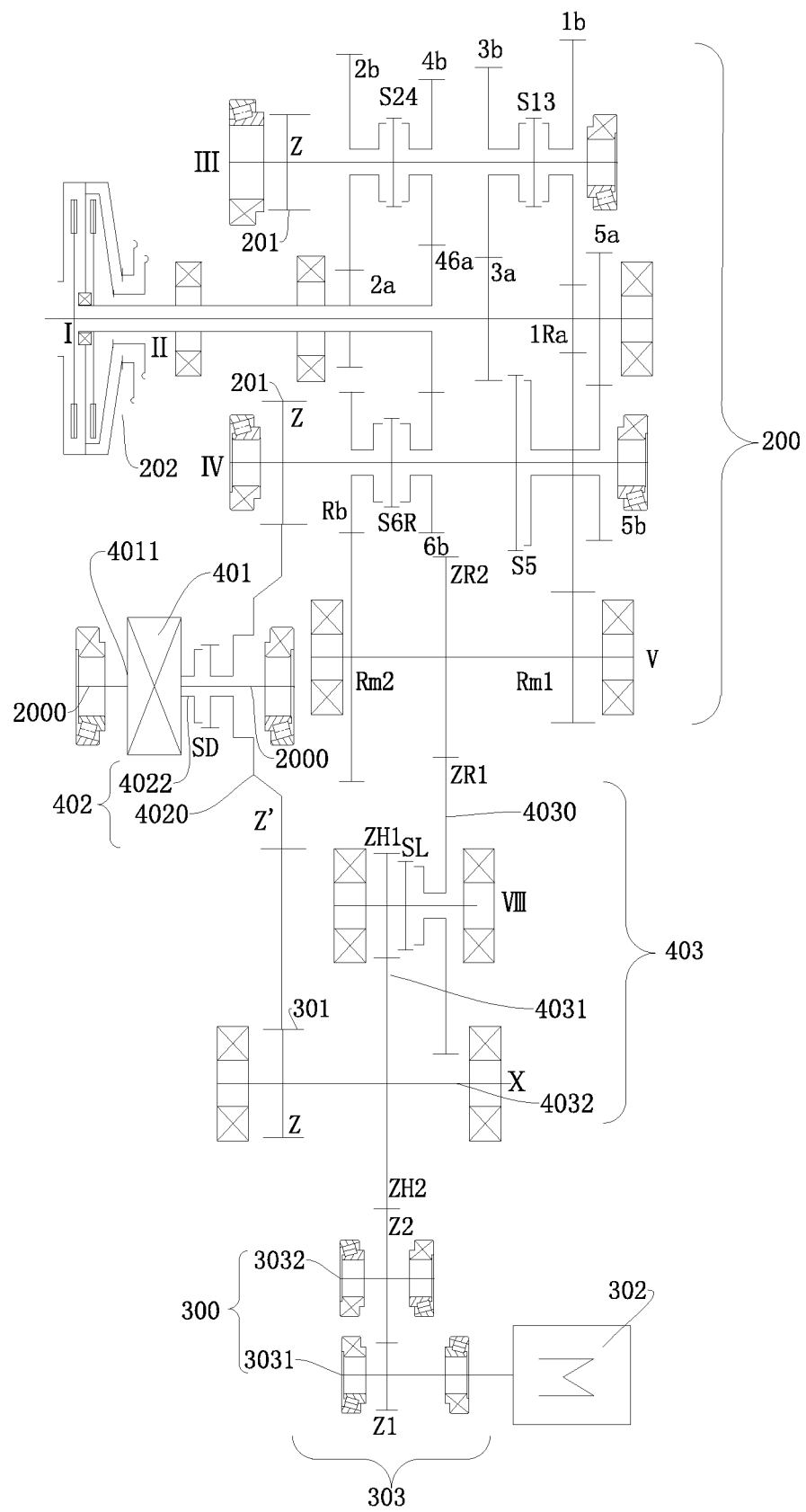

Additionally, optionally, as shown in FIG. 7 and FIG. 11, the second mode conversion device 403 may include: a conversion device input shaft VIII, a conversion device output shaft X, and a first conversion gear ZH1 and a second conversion gear ZH2 meshed with each other, the first conversion input gear ZR1 is freely sleeved on the conversion device input shaft VIII, the first conversion input gear ZR1 is the second conversion device input portion 4030, the conversion device output shaft X is the second conversion device output portion 4032, the first conversion gear ZH1 is fixed on the conversion device input shaft VIII, the second conversion gear ZH2 is fixed on the conversion device output shaft X, and the first conversion gear ZH1 and the second conversion gear ZH2 meshed with each other are the conversion portion 4031.

As shown in FIG. 7 and FIG. 11, the second conversion device connector SL is disposed on one of the first conversion input gear ZR1 and the conversion device input shaft VIII, and the first conversion input gear ZR1 is selectively connected to the conversion device input shaft VIII through the second conversion device connector SL. The second conversion device connector SL may be a synchronizer.

As shown in FIG. 11, a second conversion input gear ZR2 may be fixed on the transfer intermediate shaft V, and the second conversion input gear ZR2 is meshed with the first conversion input gear ZR1.

As shown in FIG. 7, the second reverse-gear intermediate gear Rm2 on the transfer intermediate shaft V is the second conversion input gear.

Figure 8:
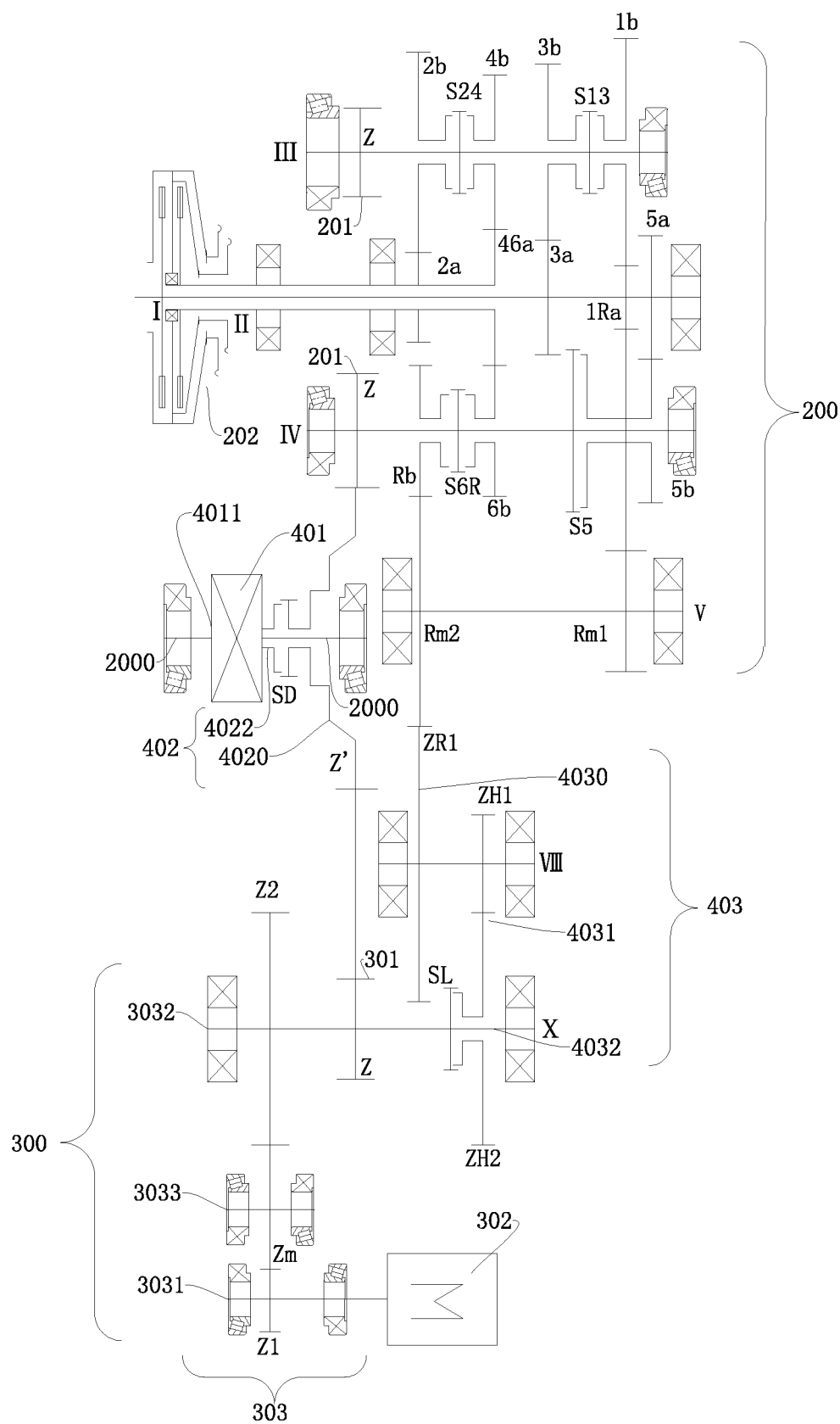

A main difference between a second specific embodiment of the present invention and the foregoing first specific embodiment lies in that, as shown in FIG. 8, the second conversion device input portion 4030 is power-coupled to the transfer intermediate shaft V, the second conversion device input portion 4030 is power-coupled to the conversion portion 4031, and the conversion portion 4031 may be selectively power-coupled to the second conversion device output portion 4032.

The second mode conversion device 403 may further include a second conversion device connector SL, and the conversion portion 4031 is selectively power-coupled to the second conversion device output portion 4032 through the second conversion device connector SL. To be specific, the second conversion device connector SL is disposed between the conversion portion 4031 and the second conversion device output portion 4032 to selectively connect or disconnect. The second conversion device connector SL may be a synchronizer.

As shown in FIG. 8, the second mode conversion device 403 may include: a conversion device input shaft VIII, a conversion device output shaft X, and a first conversion gear ZH1 and a second conversion gear ZH2 meshed with each other, the first conversion input gear ZR1 is fixed on the conversion device input shaft VIII, the first conversion input gear ZR1 is the second conversion device input portion 4030, the conversion device output shaft X is the second conversion device output portion 4032, the first conversion gear ZH1 is fixed on the conversion device input shaft VIII, the second conversion gear ZH2 is freely sleeved on the conversion device output shaft X, and the first conversion gear ZH1 and the second conversion gear ZH2 meshed with each other are the conversion portion 4031.

As shown in FIG. 8, the second conversion device connector SL is disposed on one of the conversion device output shaft X and the second conversion gear ZH2, and the conversion device output shaft X is selectively connected to the second conversion gear ZH2 through the second conversion device connector SL.

As shown in FIG. 8, a second conversion input gear ZR2 is fixed on the transfer intermediate shaft V, and the second conversion input gear ZR2 is meshed with the first conversion input gear ZR1. Specifically, the second reverse-gear intermediate gear Rm2 on the transfer intermediate shaft V is the second conversion input gear.

Although the location of the second conversion device connector SL and an object that the second conversion device connector SL is connected to or disconnected from change, the function of the second mode conversion device 403 does not change compared with the foregoing second mode conversion device shown in FIG. 6, FIG. 7, FIG. 10 and FIG. 11.

Figure 9:
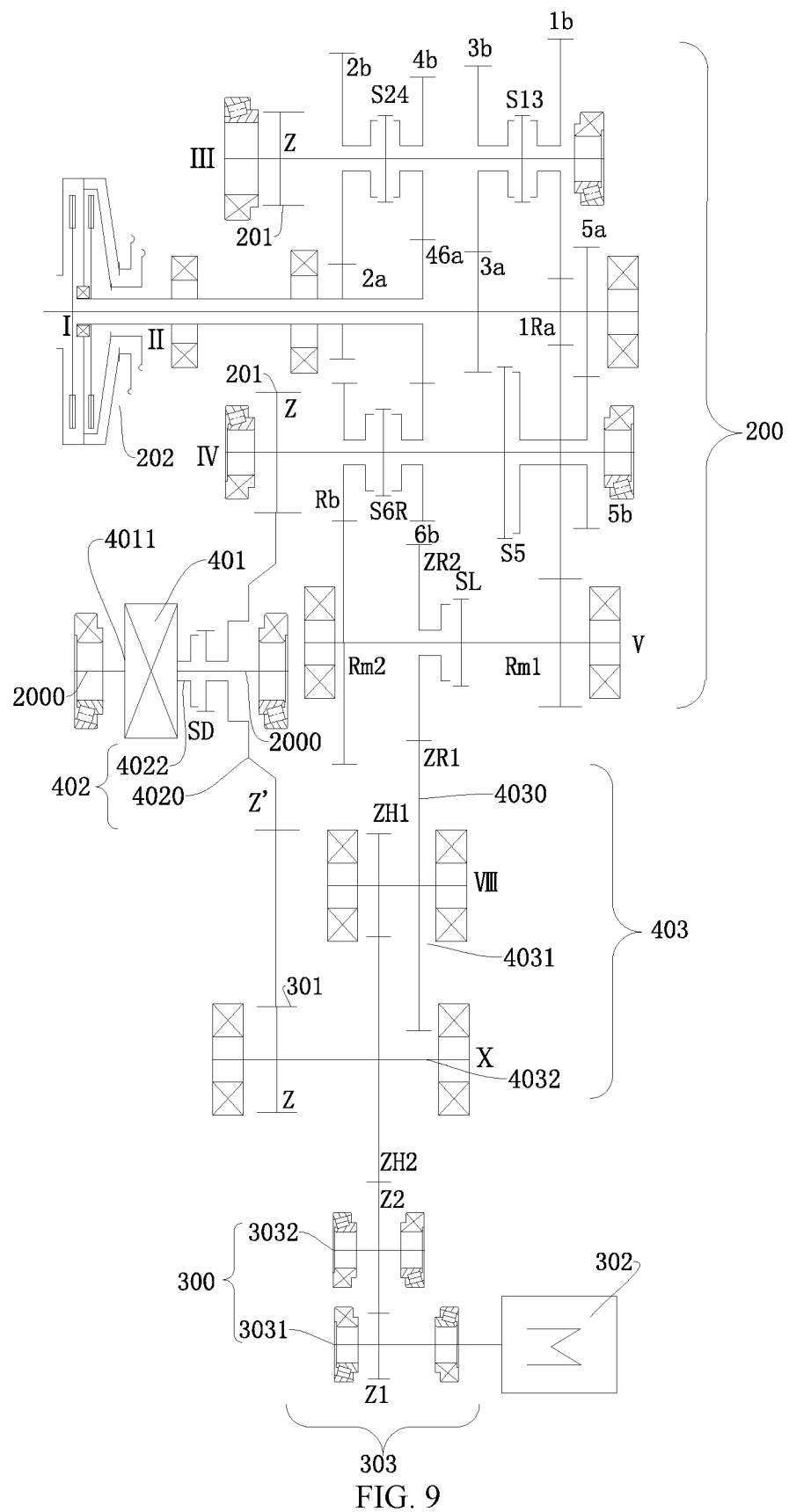

According to a third specific embodiment of the present invention, as shown in FIG. 9, the second conversion device input portion 4030 may be selectively power-coupled to the transfer intermediate shaft V, the second conversion device input portion 4030 is power-coupled to the conversion portion 4031, and the conversion portion 4031 is power-coupled to the second conversion device output portion 4032.

As shown in FIG. 9, the second mode conversion device 403 may further include a second conversion device connector SL, and the second conversion device input portion 4030 is selectively power-coupled to the transfer intermediate shaft V through the second conversion device connector SL. When the second conversion device input portion 4030 is power-coupled to the transfer intermediate shaft V through the second conversion device connector SL, power may be transferred between the transfer intermediate shaft V and the second mode conversion device 403.

Specifically, as shown in FIG. 9, the second mode conversion device 403 may include: a conversion device input shaft VIII, a conversion device output shaft X, and a first conversion gear ZH1 and a second conversion gear ZH2 meshed with each other, the first conversion input gear ZR1 is fixed on the conversion device input shaft VIII, the first conversion input gear ZR1 is the second conversion device input portion 4030, the conversion device output shaft X is the second conversion device output portion 4032, the first conversion gear ZH1 is fixed on the conversion device input shaft VIII, the second conversion gear ZH2 is freely sleeved on the conversion device output shaft X, and the first conversion gear ZH1 and the second conversion gear ZH2 meshed with each other are the conversion portion 4031.

A second conversion input gear ZR2 may be freely sleeved on the transfer intermediate shaft V, and the second conversion input gear ZR2 is meshed with the first conversion input gear ZR1. The transfer intermediate shaft V may be selectively power-coupled to the second conversion input gear ZR2.

Further, as shown in FIG. 9, the second conversion device connector SL may be disposed on one of the transfer intermediate shaft V and the second conversion input gear ZR2, and the transfer intermediate shaft V is selectively connected to the second conversion input gear ZR2 through the second conversion device connector SL. The second conversion device connector SL may be a synchronizer. Preferably, the second conversion device connector SL may be fixed on the transfer intermediate shaft V.

According to a third preferred embodiment of the present invention, as shown in FIG. 12 to FIG. 18, the second mode conversion device 403 may include a conversion device input shaft VIII, a first conversion device intermediate shaft XI-1 and a conversion device output shaft X, and the conversion device output shaft X is power-coupled to the first motor generator unit coupling portion 301. When the conversion device input shaft VIII, the first conversion device intermediate shaft XI-1 and the conversion device output shaft X are power-coupled to each other, the power from the power source 100 is suitable for being decelerated sequentially through the speed change unit 200, the conversion device input shaft VIII, the first conversion device intermediate shaft XI-1 and the conversion device output shaft X and then output to the first motor generator unit coupling portion 301, and the first motor generator unit coupling portion 301 is power-coupled to the first mode conversion device 402.

When at least one of the power source 100 and the first motor generator unit 300 is disconnected from the system power output portion 401 through the first mode conversion device 402, that is to say, after at least one of the power source 100 and the first motor generator unit 300 cannot output power to the system power output portion 401 through the first mode conversion device 402, the power output by the power source 100 is suitable for driving the first motor generator unit 300 through the first mode conversion device 402 to perform power generation. In this way, the power generation efficiency of the first motor generator unit 300 is high.

Specifically, when the conversion device input shaft VIII, the first conversion device intermediate shaft XI-1 and the conversion device output shaft X are power-coupled to each other, the power from the power source 100 is suitable for driving the first motor generator 302 sequentially through the speed change unit 200, the conversion device input shaft VIII, the first conversion device intermediate shaft XI-1 and the conversion device output shaft X to perform power generation. In this way, the transmission path on which the power source 100 drives the first motor generator unit 300 to perform power generation is relatively short, the transmission efficiency is high, and the power generation efficiency is high.

There is a plurality of connection arrangement relationships between the conversion device input shaft VIII, the first conversion device intermediate shaft XI-1 and the conversion device output shaft X, and the connection arrangement relationships are described one by one below with reference to accompanying drawings.

Figure 12:
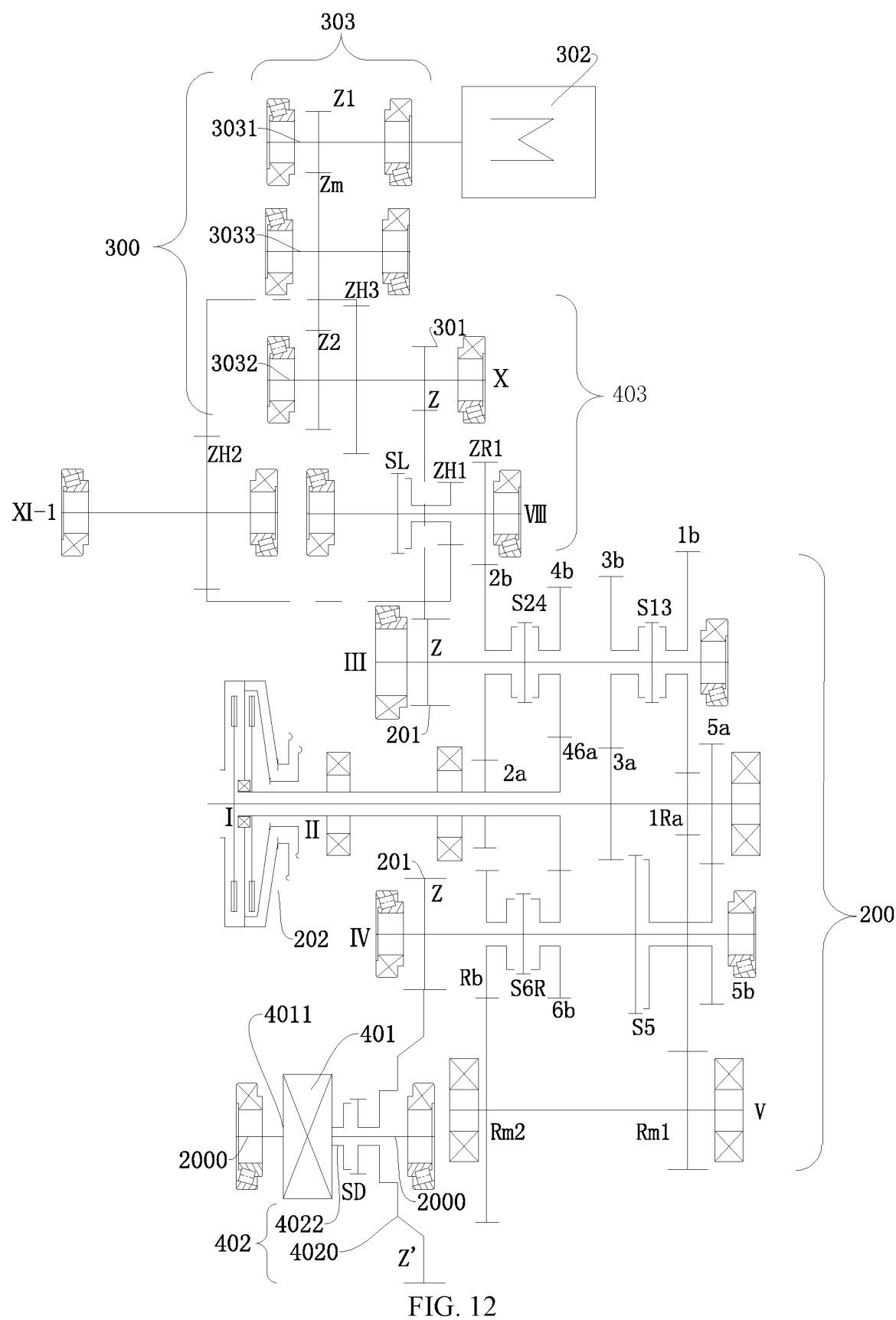

As shown in FIG. 12, the conversion device input shaft VIII may be selectively power-coupled to the power source 100. For example, the conversion device input shaft VIII is power-coupled to the speed change power output portion, the conversion device input shaft VIII may be selectively power-coupled to the first conversion device intermediate shaft XI-1, and the first conversion device intermediate shaft XI-1 is power-coupled to the conversion device output shaft X.

Specifically, as shown in FIG. 12, the first conversion input gear ZR1 is fixedly disposed on the conversion device input shaft VIII, the first conversion gear ZH1 is freely sleeved on the conversion device input shaft VIII, the second conversion gear ZH2 is fixedly disposed on the first conversion device intermediate shaft XI-1, the third conversion gear ZH3 is fixedly disposed on the conversion device output shaft X, the first conversion gear ZH1 is meshed with the second conversion gear ZH2, and the third conversion gear ZH3 is meshed with the second conversion gear ZH2. The first conversion input gear ZR1 is power-coupled to the speed change power output portion, for example, the second-gear driven gear 2b on the second output shaft.

The first conversion gear ZH1 is selectively power-coupled to the conversion device input shaft VIII. The second mode conversion device 403 may further include a second conversion device connector SL, the second conversion device connector SL is disposed on one of the conversion device input shaft VIII and the first conversion gear ZH1, and the conversion device input shaft VIII is selectively power-coupled to the first conversion gear ZH1 through the second conversion device connector SL. In this way, the second conversion device connector SL may control switching on/off of power transfer of the second mode conversion device 403.

Figure 13:
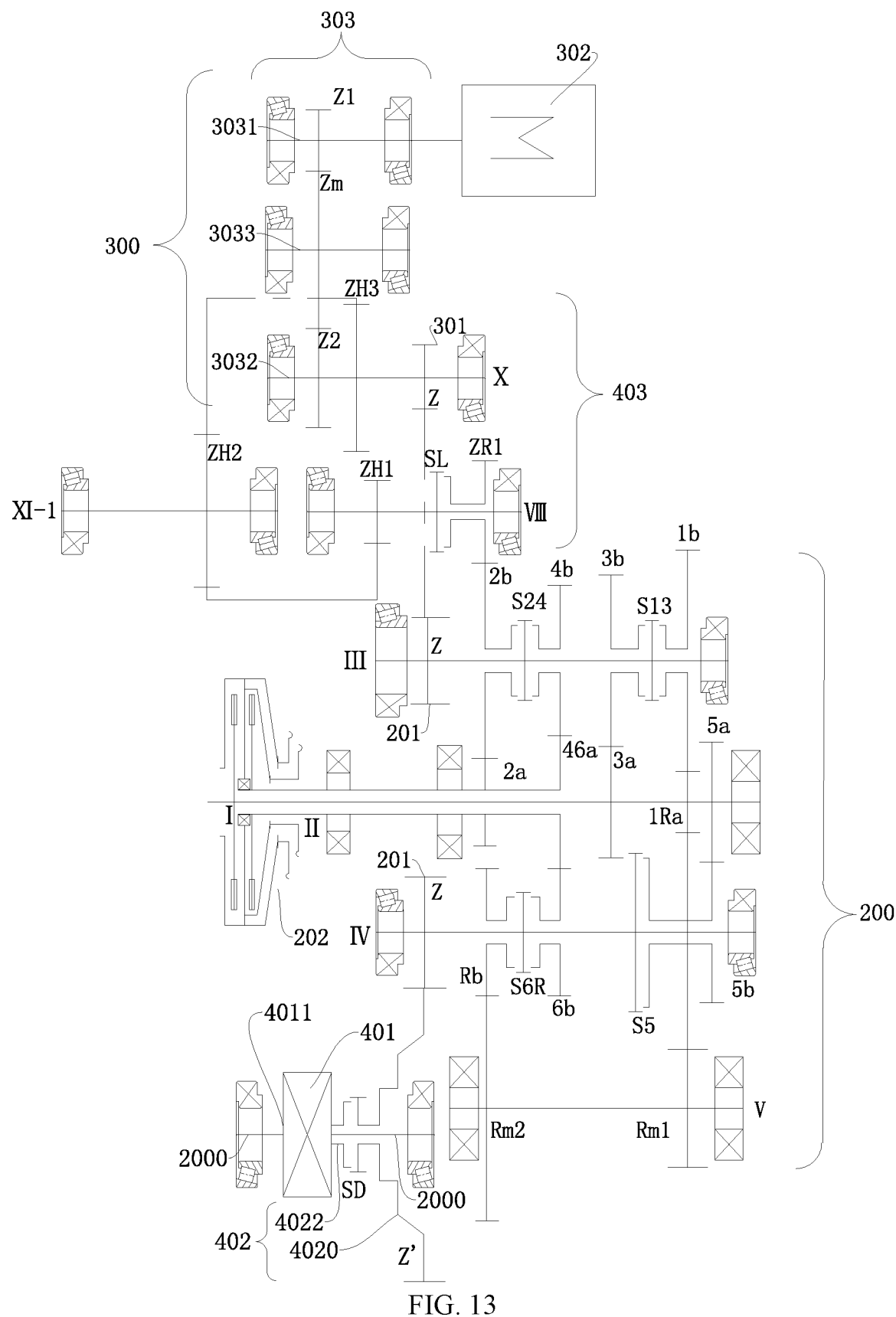

As shown in FIG. 13, the conversion device input shaft VIII may be selectively power-coupled to the power source 100. For example, the conversion device input shaft VIII is selectively power-coupled to the speed change power output portion, the conversion device input shaft VIII is power-coupled to the first conversion device intermediate shaft XI-1, and the first conversion device intermediate shaft XI-1 is power-coupled to the conversion device output shaft X.

Specifically, as shown in FIG. 13, the first conversion input gear ZR1 is freely sleeved on the conversion device input shaft VIII, the first conversion gear ZH1 is fixedly disposed on the conversion device input shaft VIII, the second conversion gear ZH2 is fixedly disposed on the first conversion device intermediate shaft XI-1, the third conversion gear ZH3 is fixedly disposed on the conversion device output shaft X, the first conversion gear ZH1 is meshed with the second conversion gear ZH2, and the third conversion gear ZH3 is meshed with the second conversion gear ZH2. The first conversion input gear ZR1 is power-coupled to the speed change power output portion, for example, the second-gear driven gear 2$b$ on the second output shaft.

The second mode conversion device 403 may further include a second conversion device connector SL, the second conversion device connector SL is disposed on one of the conversion device input shaft VIII and the first conversion input gear ZR1, and the conversion device input shaft VIII is selectively power-coupled to the first conversion input gear ZR1 through the second conversion device connector SL. In this way, the second conversion device connector SL may control switching on/off of power transfer of the second mode conversion device 403.

Figure 14:
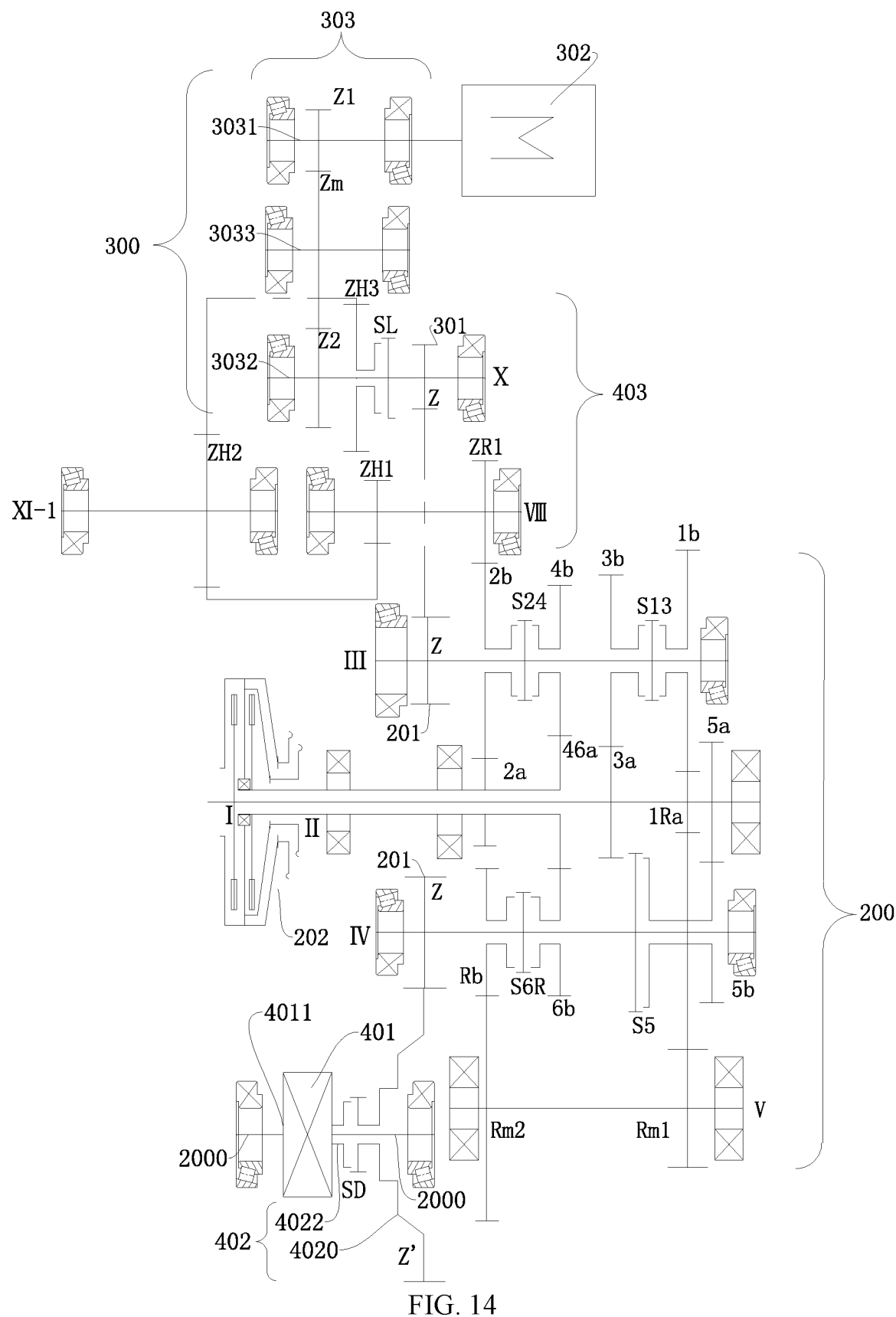

As shown in FIG. 14, the conversion device input shaft VIII may be selectively power-coupled to the power source 100. For example, the conversion device input shaft VIII is selectively power-coupled to the speed change power output portion, the conversion device input shaft VIII is power-coupled to the first conversion device intermediate shaft XI-1, and the first conversion device intermediate shaft XI-1 may be selectively power-coupled to the conversion device output shaft X.

Specifically, the first conversion input gear ZR1 and the first conversion gear ZH1 are fixedly disposed on the conversion device input shaft VIII, the second conversion gear ZH2 is fixedly disposed on the first conversion device intermediate shaft XI-1, the third conversion gear ZH3 is freely sleeved on the conversion device output shaft X, the first conversion gear ZH1 is meshed with the second conversion gear ZH2, and the third conversion gear ZH3 is meshed with the second conversion gear ZH2. The first conversion input gear ZR1 is power-coupled to the speed change power output portion, for example, the second-gear driven gear 2$b$ on the second output shaft.

The second mode conversion device 403 may further include a second conversion device connector SL, the second conversion device connector SL is disposed on one of the conversion device output shaft X and the third conversion gear ZH3, and the conversion device output shaft X is selectively power-coupled to the third conversion gear ZH3 through the second conversion device connector SL. In this way, the second conversion device connector SL may control switching on/off of power transfer of the second mode conversion device 403.

As shown in FIG. 15 to FIG. 19, the second mode conversion device 403 may further include a second conversion device intermediate shaft XI-2, and the conversion device output shaft X is power-coupled to the first motor generator unit coupling portion 301. In this way, when the conversion device input shaft VIII, the first conversion device intermediate shaft XI-1, the conversion device output shaft X, and the second conversion device intermediate shaft XI-2 are power-coupled to each other, the power from the power source 100 is suitable for being decelerated sequentially through the conversion device input shaft VIII, the first conversion device intermediate shaft XI-1, the second conversion device intermediate shaft XI-2 and the conversion device output shaft X and then output to the first motor generator unit coupling portion 301.

Moreover, when the conversion device input shaft VIII, the first conversion device intermediate shaft XI-1, the conversion device output shaft X, and the second conversion device intermediate shaft XI-2 are power-coupled to each other, the power from the power source 100 is suitable for driving the first motor generator 302 sequentially through the conversion device input shaft VIII, the first conversion device intermediate shaft XI-1, the second conversion device intermediate shaft XI-2 and the conversion device output shaft X to perform power generation. In this way, the transmission path between the power source 100 and the first motor generator unit 300 is short, transmission is reliable, and driving efficiency is high.

Figure 16:
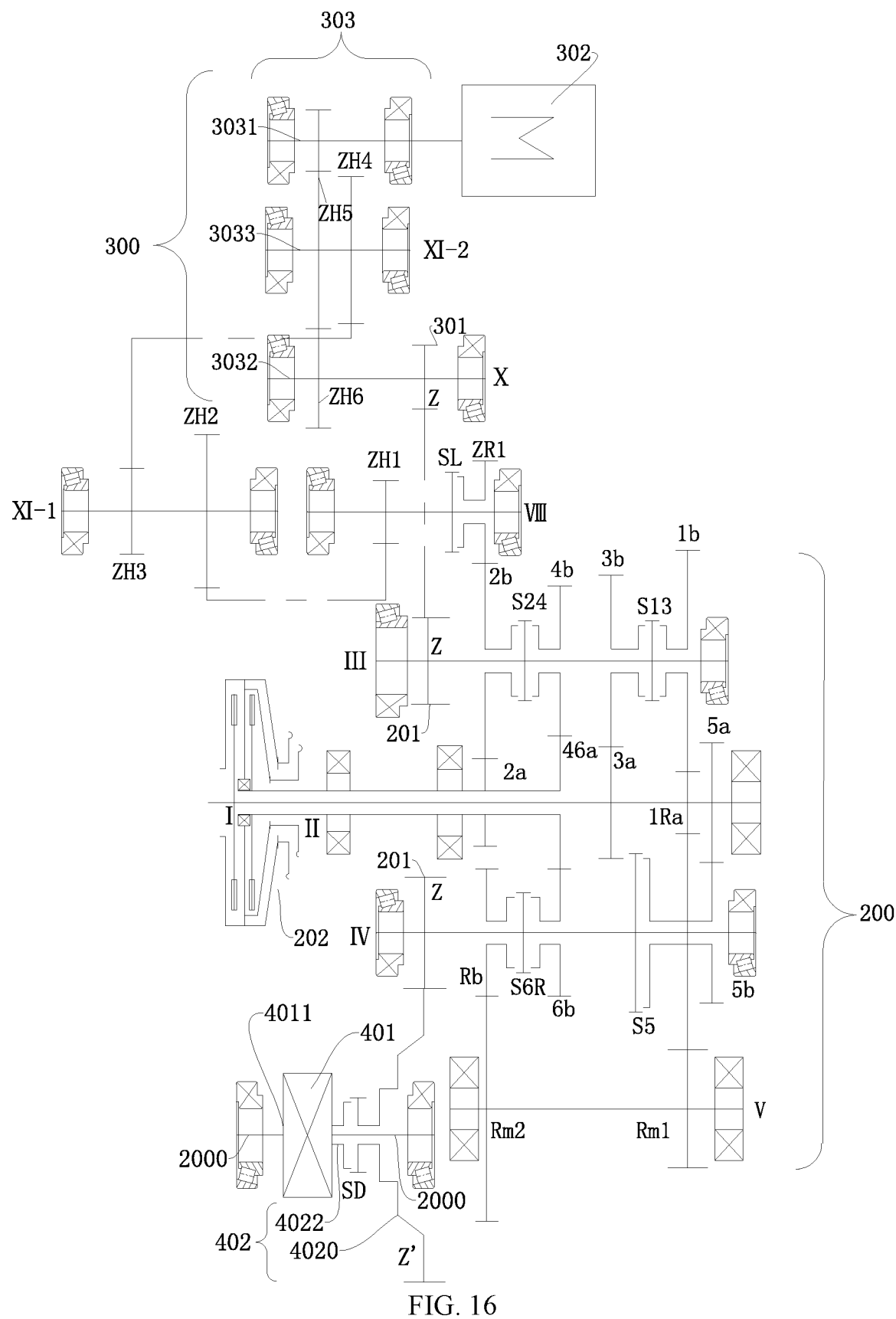

As shown in FIG. 16, the conversion device input shaft VIII may be selectively power-coupled to the power source 100. For example, the conversion device input shaft VIII is selectively power-coupled to the speed change power output portion, the conversion device input shaft VIII is power-coupled to the first conversion device intermediate shaft XI-1, the first conversion device intermediate shaft XI-1 is power-coupled to the second conversion device intermediate shaft XI-2, and the second conversion device intermediate shaft XI-2 is power-coupled to the conversion device output shaft X.

Specifically, as shown in FIG. 16, the first conversion input gear ZR1 is freely sleeved on the conversion device input shaft VIII, the first conversion gear ZH1 is fixedly disposed on the conversion device input shaft VIII, the second conversion gear ZH2 and the third conversion gear ZH3 are fixedly disposed on the first conversion device intermediate shaft XI-1, a fourth conversion gear ZH4 is fixedly disposed on the second conversion device intermediate shaft XI-2, a fifth conversion gear ZH5 is fixedly disposed on the second conversion device intermediate shaft XI-2, a sixth conversion gear ZH6 is fixedly disposed on the conversion device output shaft X, the first conversion gear ZH1 is meshed with the second conversion gear ZH2, the third conversion gear ZH3 is meshed with the fourth conversion gear ZH4, and the fifth conversion gear ZH5 is meshed with the sixth conversion gear ZH6.

The second mode conversion device 403 may further include a second conversion device connector SL, the second conversion device connector SL is disposed on one of the conversion device input shaft VIII and the first conversion input gear ZR1, and the conversion device input shaft VIII is selectively power-coupled to the first conversion input gear ZR1 through the second conversion device connector SL. In this way, the second conversion device connector SL may control switching on/off of power transfer of the second mode conversion device 403.

Figure 15:
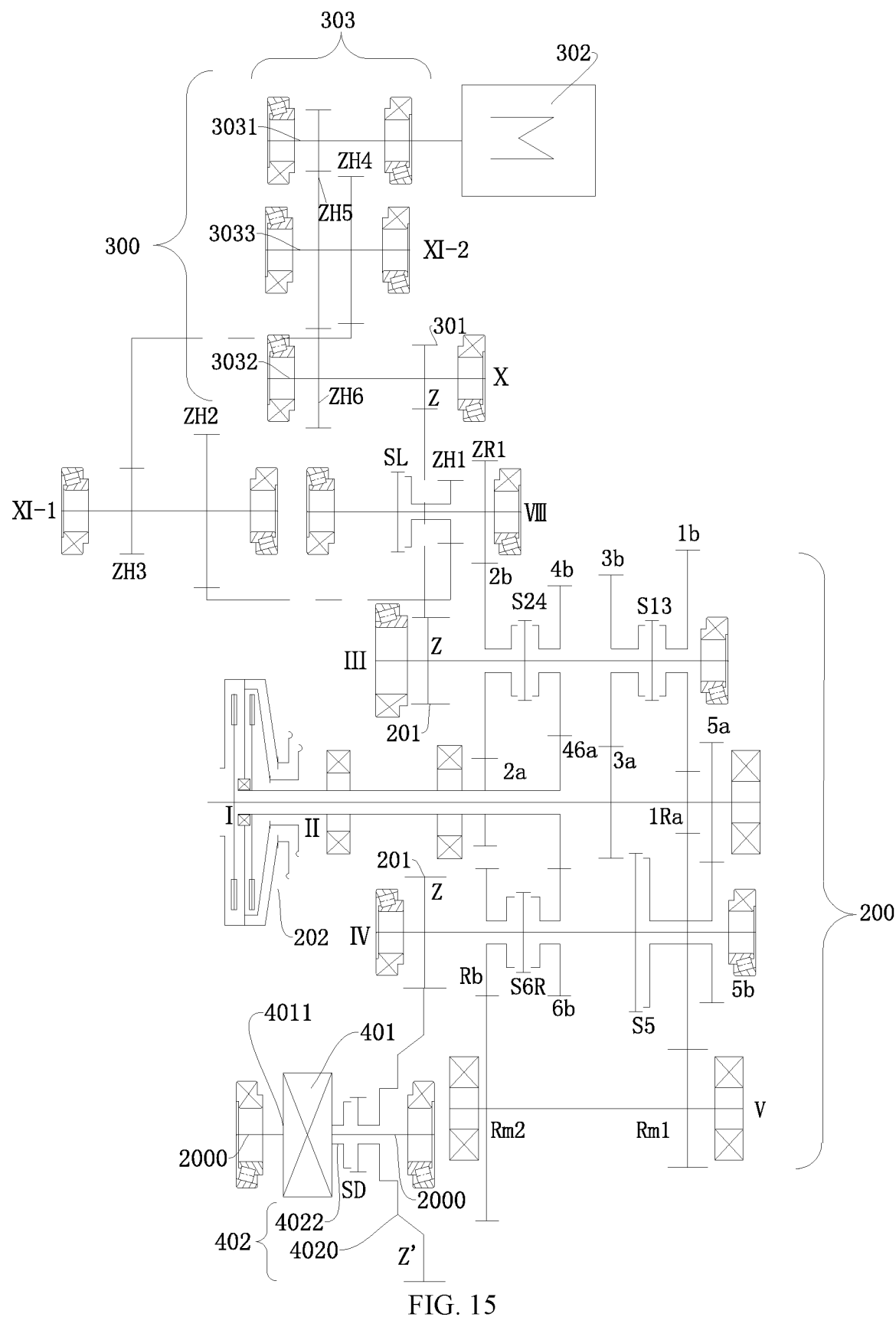

As shown in FIG. 15, the conversion device input shaft VIII may be selectively power-coupled to the power source 100. For example, the conversion device input shaft VIII is selectively power-coupled to the speed change power output portion, the conversion device input shaft VIII may be selectively power-coupled to the first conversion device intermediate shaft XI-1, the first conversion device intermediate shaft XI-1 is power-coupled to the second conversion device intermediate shaft XI-2, and the second conversion device intermediate shaft XI-2 is power-coupled to the conversion device output shaft X.

Specifically, as shown in FIG. 15, the first conversion input gear ZR1 is fixedly disposed on the conversion device input shaft VIII, the first conversion gear ZH1 is freely sleeved on the conversion device input shaft VIII, the second conversion gear ZH2 and the third conversion gear ZH3 are fixedly disposed on the first conversion device intermediate shaft XI-1, a fourth conversion gear ZH4 and a fifth conversion gear ZH5 are fixedly disposed on the second conversion device intermediate shaft XI-2, a sixth conversion gear ZH6 is fixedly disposed on the conversion device output shaft X, the first conversion gear ZH1 is meshed with the second conversion gear ZH2, the third conversion gear ZH3 is meshed with the fourth conversion gear ZH4, and the fifth conversion gear ZH5 is meshed with the sixth conversion gear ZH6.

As shown in FIG. 15, the second mode conversion device 403 may further include a second conversion device connector SL, the second conversion device connector SL is disposed on one of the conversion device input shaft VIII and the first conversion gear ZH1, and the conversion device input shaft VIII is selectively power-coupled to the first conversion gear ZH1 through the second conversion device connector SL. In this way, the second conversion device connector SL may control switching on/off of power transfer of the second mode conversion device 403.

Figure 17:
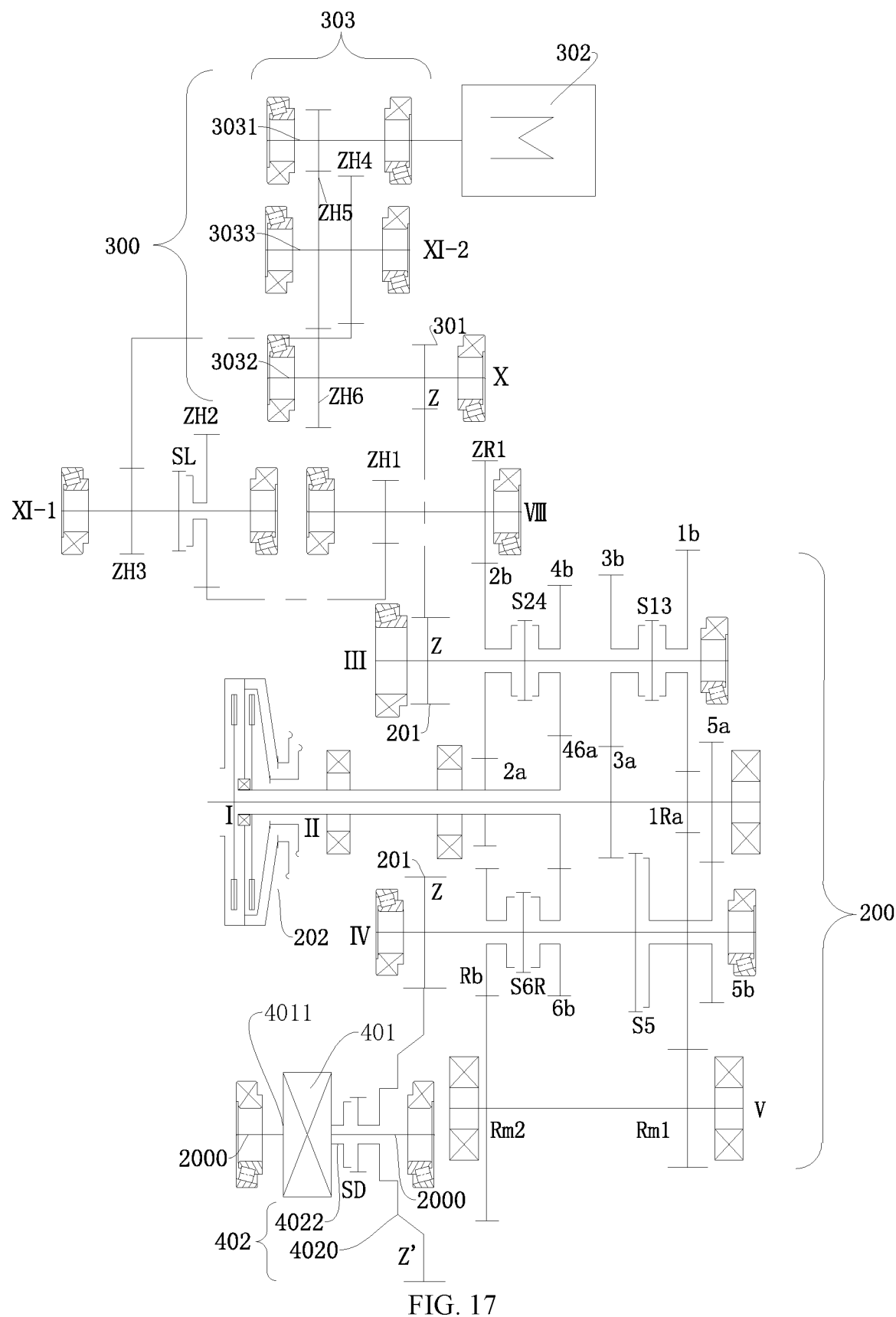

As shown in FIG. 17, the conversion device input shaft VIII may be selectively power-coupled to the power source 100. For example, the conversion device input shaft VIII is selectively power-coupled to the speed change power output portion, the conversion device input shaft VIII may be selectively power-coupled to the first conversion device intermediate shaft XI-1, the first conversion device intermediate shaft XI-1 is power-coupled to the second conversion device intermediate shaft XI-2, and the second conversion device intermediate shaft XI-2 is power-coupled to the conversion device output shaft X.

Specifically, as shown in FIG. 17, the first conversion input gear ZR1 and the first conversion gear ZH1 are fixedly disposed on the conversion device input shaft VIII, the second conversion gear ZH2 is freely sleeved on the first conversion device intermediate shaft XI-1, the third conversion gear ZH3 is fixedly disposed on the first conversion device intermediate shaft XI-1, a fourth conversion gear ZH4 and a fifth conversion gear ZH5 are fixedly disposed on the second conversion device intermediate shaft XI-2, a sixth conversion gear ZH6 is fixedly disposed on the conversion device output shaft X, the first conversion gear ZH1 is meshed with the second conversion gear ZH2, the third conversion gear ZH3 is meshed with the fourth conversion gear ZH4, and the fifth conversion gear ZH5 is meshed with the sixth conversion gear ZH6.

The second mode conversion device 403 may further include a second conversion device connector SL, the second conversion device connector SL is disposed on one of the first conversion device intermediate shaft XI-1 and the second conversion gear ZH2, and the first conversion device intermediate shaft XI-1 is selectively power-coupled to the second conversion gear ZH2 through the second conversion device connector SL. In this way, the second conversion device connector SL may control switching on/off of power transfer of the second mode conversion device 403.

Figure 18:
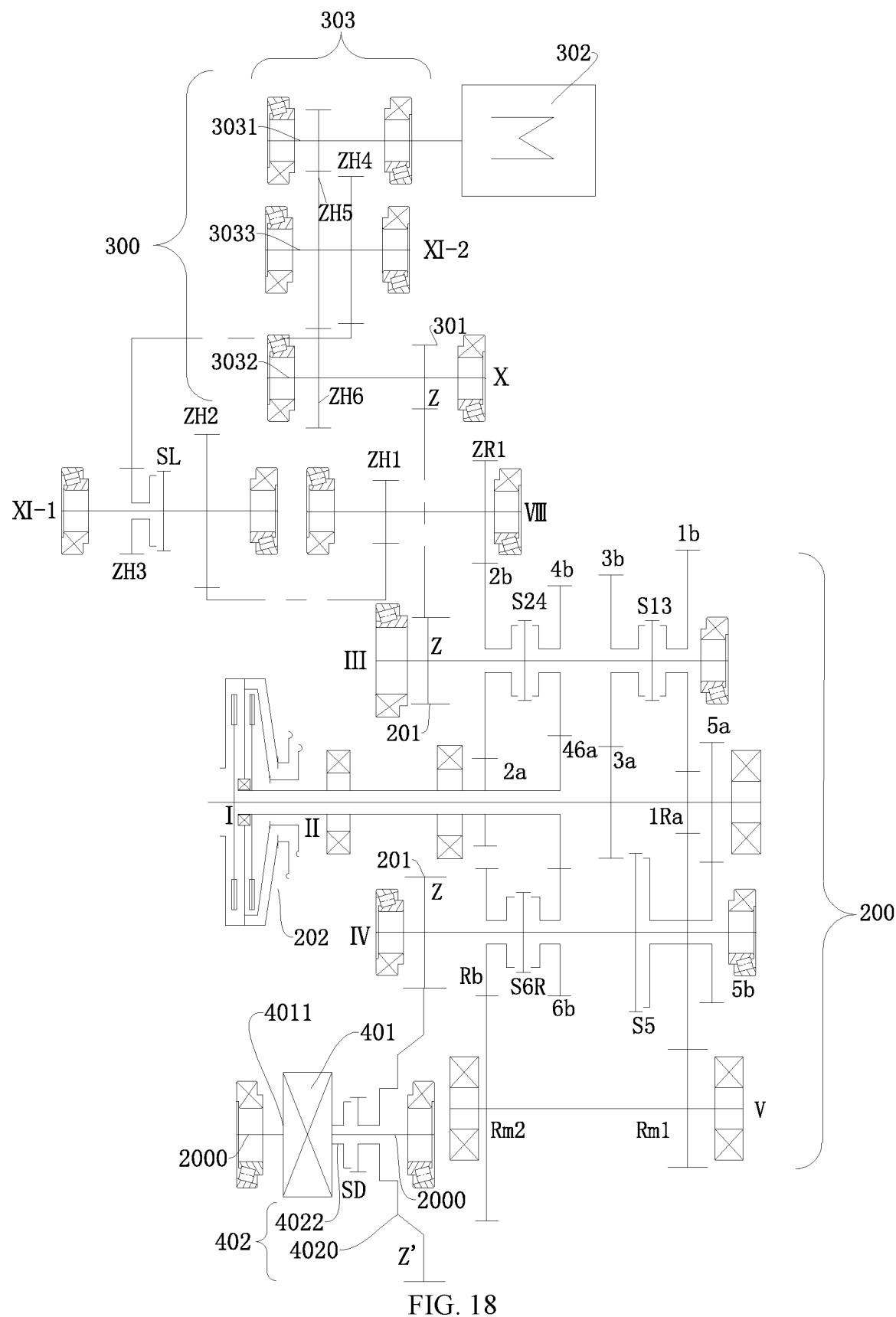

As shown in FIG. 18, the conversion device input shaft VIII may be selectively power-coupled to the power source 100. For example, the conversion device input shaft VIII is selectively power-coupled to the speed change power output portion, the conversion device input shaft VIII is power-coupled to the first conversion device intermediate shaft XI-1, the first conversion device intermediate shaft XI-1 may be selectively power-coupled to the second conversion device intermediate shaft XI-2, and the second conversion device intermediate shaft XI-2 is power-coupled to the conversion device output shaft X.

Specifically, as shown in FIG. 18, the first conversion input gear ZR1 and the first conversion gear ZH1 are fixedly disposed on the conversion device input shaft VIII, the second conversion gear ZH2 is fixedly disposed on the first conversion device intermediate shaft XI-1, the third conversion gear ZH3 is freely sleeved on the first conversion device intermediate shaft XI-1, a fourth conversion gear ZH4 and a fifth conversion gear ZH5 are fixedly disposed on the second conversion device intermediate shaft XI-2, a sixth conversion gear ZH6 is fixedly disposed on the conversion device output shaft X, the first conversion gear ZH1 is meshed with the second conversion gear ZH2, the third conversion gear ZH3 is meshed with the fourth conversion gear ZH4, and the fifth conversion gear ZH5 is meshed with the sixth conversion gear ZH6.

The second mode conversion device 403 may further include a second conversion device connector SL, the second conversion device connector SL is disposed on one of the first conversion device intermediate shaft XI-1 and the third conversion gear ZH3, and the first conversion device intermediate shaft XI-1 is selectively power-coupled to the third conversion gear ZH3 through the second conversion device connector SL. In this way, the second conversion device connector SL may control switching on/off of power transfer of the second mode conversion device 403.

Figure 19:
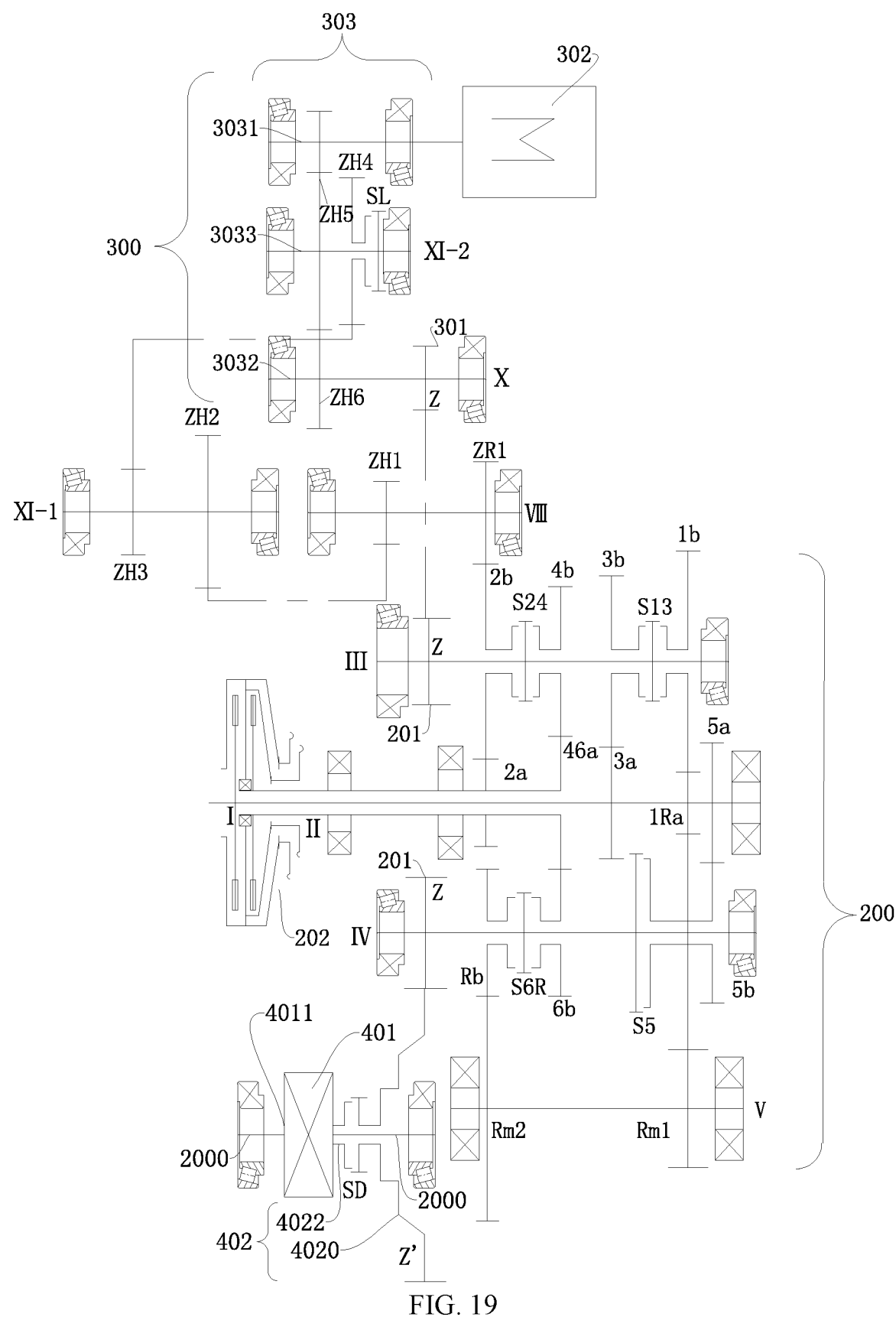

As shown in FIG. 19, the conversion device input shaft VIII may be selectively power-coupled to the power source 100. For example, the conversion device input shaft VIII is selectively power-coupled to the speed change power output portion, the conversion device input shaft VIII is power-coupled to the first conversion device intermediate shaft XI-1, the first conversion device intermediate shaft XI-1 may be selectively power-coupled to the second conversion device intermediate shaft XI-2, and the second conversion device intermediate shaft XI-2 is power-coupled to the conversion device output shaft X.

Specifically, as shown in FIG. 19, the first conversion input gear ZR1 and the first conversion gear ZH1 are fixedly disposed on the conversion device input shaft VIII, the second conversion gear ZH2 and the third conversion gear ZH3 are fixedly disposed on the first conversion device intermediate shaft XI-1, a fourth conversion gear ZH4 is freely sleeved on the second conversion device intermediate shaft XI-2, a fifth conversion gear ZH5 is fixedly disposed on the second conversion device intermediate shaft XI-2, a sixth conversion gear ZH6 is fixedly disposed on the conversion device output shaft X, the first conversion gear ZH1 is meshed with the second conversion gear ZH2, the third conversion gear ZH3 is meshed with the fourth conversion gear ZH4, and the fifth conversion gear ZH5 is meshed with the sixth conversion gear ZH6.

The second mode conversion device 403 further includes a second conversion device connector SL, the second conversion device connector SL is disposed on one of the second conversion device intermediate shaft XI-2 and the fourth conversion gear ZH4, and the second conversion device intermediate shaft XI-2 is selectively power-coupled to the fourth conversion gear ZH4 through the second conversion device connector SL. In this way, the second conversion device connector SL may control switching on/off of power transfer of the second mode conversion device 403.

According to a fourth preferred embodiment of the present invention, as shown in FIG. 20 and FIG. 21, each input shaft may be selectively connected to the power source 100, each output shaft is suitable for being selectively power-coupled to a corresponding input shaft to output the power from the power source 100 through the corresponding input shaft, the transfer intermediate shaft V is suitable for transmitting power from one of input shafts to a corresponding output shaft, and the transfer intermediate shaft V may be selectively power-coupled to the second mode conversion device 403.

The input shaft may be power-coupled to or power-decoupled from the transfer intermediate shaft V through the second mode conversion device 403. In this way, when the input shaft is power-coupled to the transfer intermediate shaft V through the second mode conversion device 403, the power from the power source 100 is decelerated sequentially through the input shaft, the second mode conversion device 403, the transfer intermediate shaft V, and the output shaft and then output to the first mode conversion device 402. In this way, the power output by the power source 100 may be decelerated through the second mode conversion device 403, then decelerated through the speed change unit 200, and transferred to the first mode conversion device 402, so that the power output by the power source 100 may be decelerated twice and then output, thereby playing a role of speed reduction and torque increase, improving the passing-through capability of the vehicle, and enriching driving modes of the vehicle.

When at least one of the output shaft and the first motor generator unit 300 is disconnected from the system power output portion 401 through the first mode conversion device 402, the power output by the power source 100 is suitable for driving the first motor generator unit 300 sequentially through the input shaft, the output shaft, and the first mode conversion device 402 to perform power generation. In this way, the power transfer path between the power source 100 and the first motor generator unit 300 is short, power transfer is reliable, and transmission efficiency is high.

Specifically, the second mode conversion device 403 may include: a low-gear driving gear La, a low-gear intermediate idle gear LIG and a low-gear driven gear Lb, where the low-gear driving gear La is fixedly disposed on one input shaft, the low-gear intermediate idle gear LIG is freely sleeved on the output shaft, the low-gear driven gear Lb is freely sleeved on the transfer intermediate shaft V, and the low-gear intermediate idle gear LIG is externally meshed with each of the low-gear driving gear La and the low-gear driven gear Lb. In other words, the low-gear intermediate idle gear LIG is meshed between the low-gear driving gear La and the low-gear driven gear Lb. In this way, the input shaft may be selectively power-coupled to the transfer intermediate shaft V, and then output power to the first mode conversion device 402 through the corresponding output shaft.

Optionally, as shown in FIG. 20 and FIG. 21, the second mode conversion device 403 may further include a second conversion device connector SL, and the transfer intermediate shaft V may be selectively connected to the low-gear driven gear Lb through the second conversion device connector SL. The second conversion device connector SL may be a synchronizer.

Specifically, the low-gear intermediate idle gear LIG may include a first low-gear intermediate idle gear tooth LIG1 and a second low-gear intermediate idle gear tooth LIG2, the first low-gear intermediate idle gear tooth LIG1 is meshed with the low-gear driving gear La, and the second low-gear intermediate idle gear tooth LIG2 is meshed with the low-gear driven gear Lb. In this way, the low-gear intermediate idle gear LIG may be constructed into a duplicate gear, so that the low-gear intermediate idle gear LIG performs transmission between the low-gear driving gear La and the low-gear driven gear Lb.

As shown in FIG. 20 and FIG. 21, at least one driving gear is disposed on each input shaft, at least one driven gear is disposed on each output shaft, the first reverse-gear intermediate gear Rm1 and the second reverse-gear intermediate gear Rm2 are fixedly disposed on the transfer intermediate shaft V, the first reverse-gear intermediate gear Rm1 is meshed with one of the at least one driving gear, and the second reverse-gear intermediate gear Rm2 is meshed with the reverse-gear driven gear Rb. In the axial direction of the transfer intermediate shaft V, the low-gear driven gear Lb is located between the first reverse-gear intermediate gear Rm1 and the second reverse-gear intermediate gear Rm2. The one of the foregoing at least one driving gear may be the first-gear driving gear 1Ra.

Optionally, as shown in FIG. 20, in the axial direction of the input shaft, the low-gear driving gear La may be located on one side of all driving gears of the input shaft. Such a way may make the structure arrangement of the speed change unit 200 proper, and may reduce structure changes of the speed change unit 200, thereby ensuring the structure reliability of the speed change unit 200.

Alternatively, optionally, as shown in FIG. 21, there may be a plurality of driving gears, and in the axial direction of the input shaft, the low-gear driving gear La is located between two neighboring driving gears. For example, as shown in FIG. 21, the low-gear driving gear La may be located between the first-gear driving gear 1Ra and the third-fifth-gear driving gear 35a. By properly arranging the location of the low-gear driving gear La, the structure arrangement of the speed change unit 200 may be made proper, and the structure compactness is good.

The speed change unit output portion 201 is power-coupled to the first mode conversion device 402, so that the power from the power source 100 is suitable for being output to the first mode conversion device 402 sequentially through the input shaft, the second mode conversion device 403, the transfer intermediate shaft V, the output shaft, and the speed change unit output portion 201.

As shown in FIG. 22 to FIG. 27, the system power output portion 401 may be a differential, the differential may include two half-shaft gears, and the two half-shaft gears and two half shafts 2000 of the vehicle are in a one-to-one correspondence. The power transmission system 1000 for the vehicle further includes: a power switching on/off device 500, and the power switching on/off device 500 is suitable for selectively connect at least one of the two half-shaft gears and a corresponding half shaft 2000 of the vehicle. It may be understood that, if a power switching on/off device 500 is disposed between a half shaft 2000 on one side and a corresponding half-shaft gear, the power switching on/off device 500 may control a state of connection or disconnection between the half shaft 2000 on the side and the half-shaft gear; or if a power switching on/off device 500 is disposed between each of half shafts 2000 on two sides and a corresponding half-shaft gear, each power switching on/off device 500 may control a state of connection or disconnection on a corresponding side. The power switching on/off device 500 may facilitate stationary power generation when the vehicle is under the parking working condition. In this way, when the vehicle is under the parking working condition, the first motor generator 302 is directly connected to the first mode conversion device 402, power output of the first motor generator 302 is direct and efficient, and braking energy feedback efficiency is high.

Figure 22:
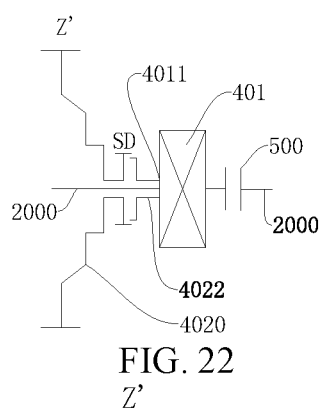
FIG. 22 to FIG. 27 are schematic structural diagrams of a differential and a power switching on/off device.
Figure 23:
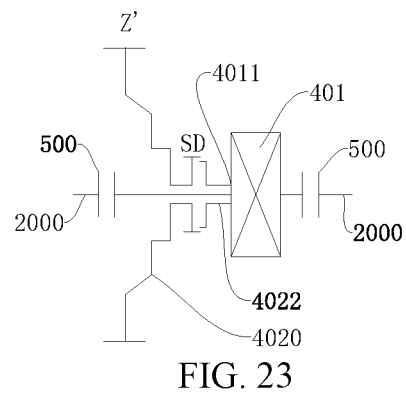

As shown in FIG. 22, a power switching on/off device 500 is disposed between a half shaft 2000 on a right side and a corresponding half-shaft gear. As shown in FIG. 23, there may be two power switching on/off devices 500, one power switching on/off device 500 may be disposed between a half shaft 2000 on a left side and a corresponding half-shaft gear, and the other power switching on/off device 500 may be disposed between a half shaft 2000 on a right side and a corresponding half-shaft gear.

Figure 24:
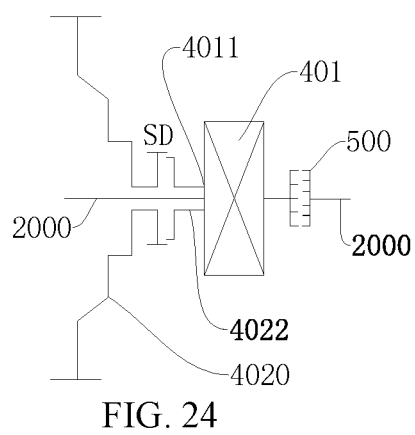
Figure 25:
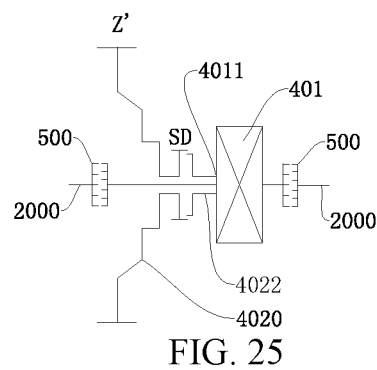

There is a plurality of types of power switching on/off devices 500. For example, as shown in FIG. 22 and FIG. 23, the power switching on/off device 500 may be a clutch. Preferably, as shown in FIG. 24 and FIG. 25, the clutch may be a jaw clutch.

Figure 26:
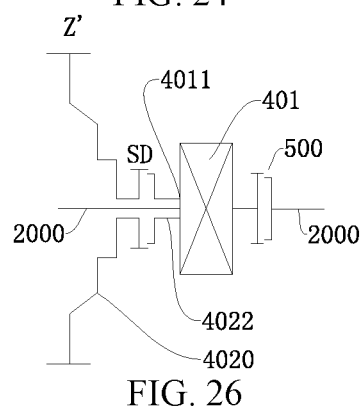
Figure 27:
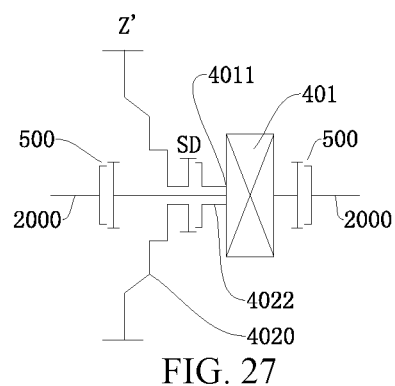

Certainly, the power switching on/off device 500 may be further of another type. For example, as shown in FIG. 26 and FIG. 27, the power switching on/off device 500 may be a synchronizer.

According to a preferred embodiment of the present invention, as shown in FIG. 1 and FIG. 3, the power transmission system 1000 may further include a second motor generator 600, the second motor generator 600 is located between the power source 100 and the speed change unit 200, one end of the second motor generator 600 is directly power-coupled to the power source 100, and another end of the second motor generator 600 is selectively power-coupled to the speed change unit 200.

As shown in FIG. 28 to FIG. 51, the second motor generator 600 may be coaxially connected to the input end of the first clutch device 202. The second motor generator 600 may be disposed between the input end of the first clutch device 202 and the engine. In this way, when being transferred to the input end, the power of the engine inevitably passes through the second motor generator 600. In this case, the second motor generator 600 may be used as a generator to perform stationary power generation.

As shown in FIG. 52 to FIG. 69, an input end outer tooth Z602 may be disposed on the input end of the first clutch device 202, and the second motor generator 600 is linked to the input end outer tooth Z602. A gear Z601 is disposed on a motor shaft of the second motor generator 600, and the gear Z601 is meshed with the input end outer tooth Z602. In this way, the power of the engine may be transferred to the second motor generator 600 through the input end and the input end outer tooth Z602. In this way, the second motor generator 600 may be used as a generator to perform stationary power generation.

According to another preferred embodiment of the present invention, the power transmission system 1000 may further include a second motor generator 600, the second motor generator 600 is located between the power source 100 and the speed change unit 200, one end of the second motor generator 600 is power-coupled to the power source 100. For example, one end of the second motor generator 600 is selectively power-coupled to the power source 100, and another end of the second motor generator 600 is selectively power-coupled to the speed change unit 200.

The second clutch device L2 may be disposed between the second motor generator 600 and the engine. The second clutch device L2 may be a single clutch, and the single clutch may control connection or disconnection between the engine and the second motor generator 600, and may control connection or disconnection between the engine and the input end of the first clutch device 202. By disposing the second clutch device L2, a stationary power generation state of the second motor generator 600 may be properly controlled, so that the power transmission system 1000 is simple in structure and reliable in driving mode conversion.

Preferably, the second clutch device L2 is disposed in a rotor of the second motor generator 600. In this way, the axial length of the power transmission system 1000 may be better shortened, thereby reducing the volume of the power transmission system 1000, and improving arrangement flexibility of the power transmission system 1000 in the vehicle. Additionally, the second motor generator 600 may be further used as a starter.

Preferably, the power source 100, the second clutch device L2 and the input end of the double clutch are coaxially arranged. In this way, the power transmission system 1000 is compact in structure and small in volume.

It should be noted that, for the power transmission systems 1000 in the foregoing three embodiments, in the axial direction, each second motor generator 600 may be located between the power source 100 and the first clutch device 202. Such a way may effectively reduce the axial length of the power transmission system 1000, may make location arrangement of the second motor generator 600 proper, and may improve structure compactness of the power transmission system 1000.

The first motor generator 302 is a main driving motor of the power transmission system 1000. Therefore, the capacity and the volume of the first motor generator 302 are relatively large. For the first motor generator 302 and the second motor generator 600, the rated power of the first motor generator 302 is greater than the rated power of the second motor generator 600. In this way, a motor generator having small volume and small rated power may be selected as the second motor generator 600, so that the power transmission system 1000 is simple in structure and small in volume. Moreover, during stationary power generation, the transmission path between the second motor generator 600 and the power source 100 is short, and power generation efficiency is high, so that a part of the power of the power source 100 may be effectively converted into electric energy. The peak power of the first motor generator 302 is similarly greater than the peak power of the second motor generator 600.

Preferably, the rated power of the first motor generator 302 is two or more times the rated power of the second motor generator 600. The peak power of the first motor generator 302 is two or more times the peak power of the second motor generator 600. For example, the rated power of the first motor generator 302 may be 60 kw, the rated power of the second motor generator 600 may be 24 kw, the peak power of the first motor generator 302 may be 120 kw, and the peak power of the second motor generator 600 may be 44 kw.

It should be noted that, the differential may be a regular open differential, for example, a bevel gear differential or a cylindrical gear differential, but is not limited thereto. Certainly, the differential may alternatively be a locking differential, for example, a mechanical locking differential or an electronic locking differential. Different differential types are selected for the power transmission system 1000 according to different vehicle models. In this way, main selection bases include vehicle costs, vehicle lightweight, vehicle cross-country performance and the like. The differential may include a shell 4011, and the shell 4011 may be the input end of the differential.

All of the power transmitted by the foregoing power transmission system 1000 is output to two wheels of the vehicle through the differential, but the power transmission system 1000 is not limited thereto. The power transmission system 1000 may further include an electric driving system 700, and the electric driving system 700 may be configured to drive two other wheels of the vehicle, thereby implementing four-wheel drive of the vehicle.

A plurality of arrangement forms of the electric driving system 700 is described below in detail.

Figure 28:
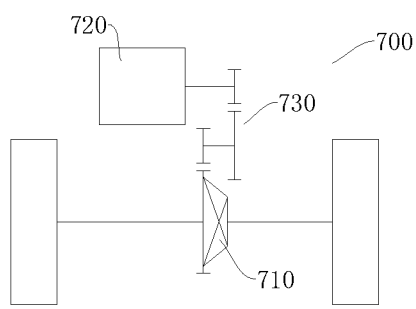
FIG. 28 to FIG. 33 are schematic structural diagrams of an electric driving system.

As shown in FIG. 28, the electric driving system 700 may include a driving system input portion and a driving system output portion, and the driving system output portion is suitable for outputting power from the driving system input portion to two other wheels, for example, rear wheels. In this way, by adding the electric driving system 700, a quantity of driving modes of the vehicle may be increased. For example, the driving modes may be further divided into a front-wheel drive mode, a rear-wheel drive mode and a four-wheel drive mode, so that the vehicle is more applicable to different road conditions, and the power performance of the vehicle may be improved.

For example, as shown in FIG. 28, the electric driving system 700 further includes an electric driving system differential 710, and the driving system output portion is suitable for outputting power from the driving system input portion to two other wheels through the electric driving system differential 710. The electric driving system differential 710 may facilitate allocation of the power transferred from the driving system output portion to two wheels on two sides, thereby stably driving the vehicle.

Specifically, the driving system input portion may be a driving motor generator 720, the driving motor generator 720 may be a rear wheel motor generator, the rear wheel motor generator may drive two rear wheels through a speed reduction mechanism, and the driving system output portion may be a gear reducer 730 (that is, the speed reduction mechanism). Therefore, when the driving motor generator 720 works, power generated by the driving motor generator 720 may be transferred to the electric driving system differential 710 after speed reduction and torque increase of the gear reducer 730 are performed, and the electric driving system differential 710 may facilitate allocation of the power transferred from the driving system output portion to two wheels on two sides, thereby stably driving the vehicle.

Figure 29:
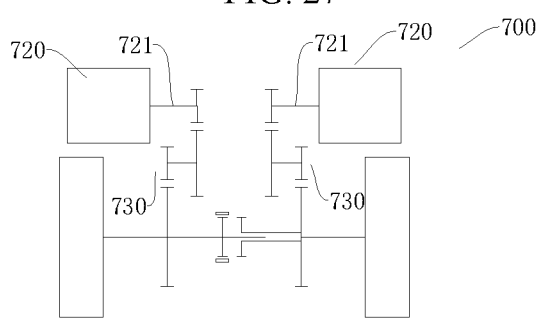

For another example, as shown in FIG. 29, the driving system input portion includes two driving motor generators 720, the driving system output portion includes two driving system output sub-portions, and each driving system output sub-portion is suitable for outputting power from a corresponding driving motor generator 720 to one corresponding wheel of two other wheels. To be specific, each wheel corresponds to one driving motor generator 720 and one driving system output sub-portion. In this way, the electric driving system differential 710 may be omitted, and the two driving motor generators 720 may adjust respective rotational speeds to implement a speed difference between two wheels, so that the power transmission system 1000 is simple and reliable in structure.

As shown in FIG. 29, the foregoing two other wheels are selectively synchronized. For example, a half shaft synchronizer may be disposed on one of half shafts 2000 to be suitable for being selectively connected to the other half shaft 2000. In this way, two wheels may rotate in a same direction at a same speed, or two wheels may move at different speeds, thereby ensuring travelling stability of the vehicle.

Figures 30, 31:
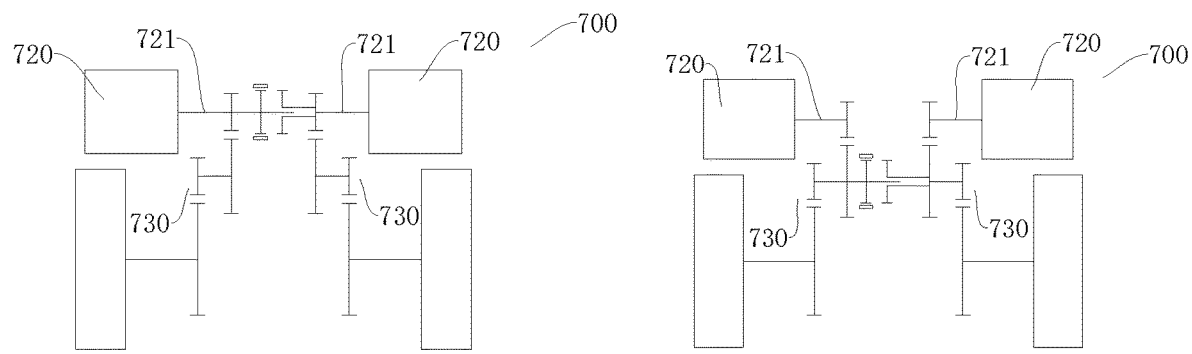

As shown in FIG. 30, the two driving motor generators 720 are selectively synchronized. For example, a synchronizer of motor output shafts 721 may be disposed on one motor output shaft 721 to be selectively connected to the other motor output shaft 721. In this way, two wheels may rotate in a same direction at a same speed, or two wheels may move at different speeds, thereby ensuring travelling stability of the vehicle.

Figure 32:
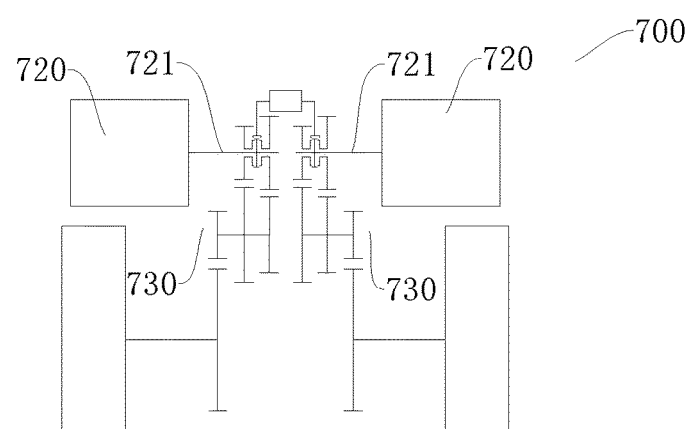

As shown in FIG. 31 and FIG. 32, the two driving system output sub-portions are selectively synchronized. To be specific, an output sub-portion synchronizer may be disposed on an output shaft of one of the two driving system output sub-portions and is configured to synchronize the one driving system output sub-portion with the other driving system output sub-portion. In this way, two wheels may rotate in a same direction at a same speed, or two wheels may move at different speeds, thereby ensuring travelling stability of the vehicle.

As shown in FIG. 28 to FIG. 31, the driving system output sub-portion may include a two-stage gear reducer, and power of the driving motor generator 720 subjected to two-stage speed reduction may be transferred to wheels to drive the wheels to rotate.

Alternatively, as shown in FIG. 32, the driving system output sub-portion may include a two-gear transmission. The driving motor generator 720 is selectively connected to one of gears. By disposing the two-gear transmission, a rotational speed of the driving motor generator 720 output to wheels may be changed, thereby enriching driving modes of the power transmission system 1000, and improving the economy and the power performance of the vehicle.

Specifically, the driving motor generator 720 may include a motor output shaft 721, and the two-stage gear reducer 730 or the two-gear transmission may include a driving system output sub-portion input shaft, and the driving system output sub-portion input shaft is fixedly and coaxially connected to the motor output shaft 721. In this way, the driving motor generator 720 may transfer power to the driving system output sub-portion input shaft through the motor output shaft 721, and then the power is transferred to wheels through the driving system output sub-portion to drive the vehicle to move.

Figure 33:
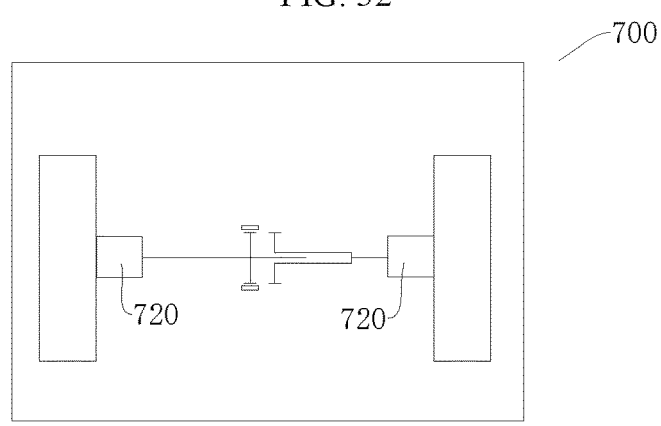
Figure 34:
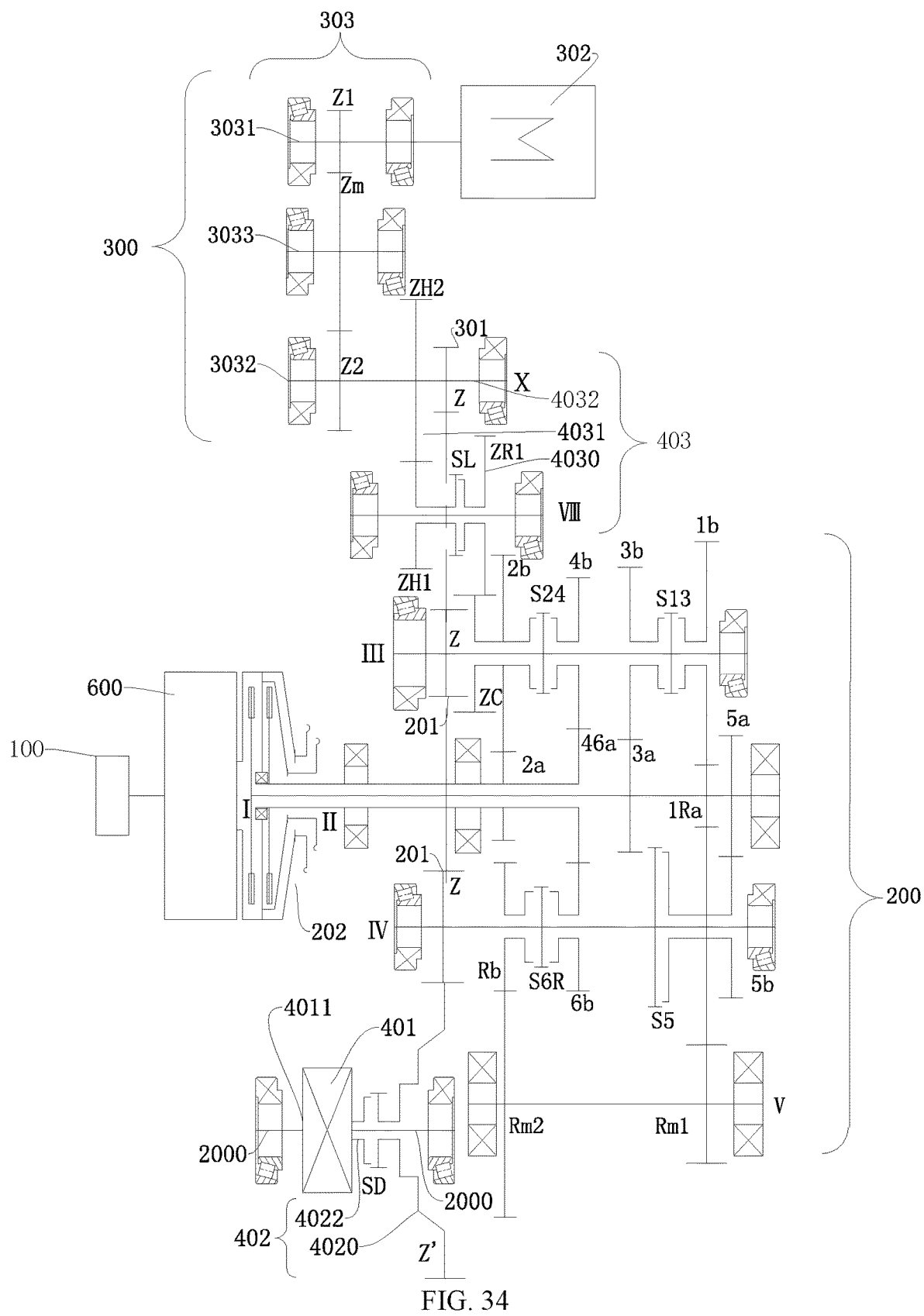
FIG. 34 to FIG. 69 are schematic structural diagrams of a power transmission system according to an embodiment of the present invention.
Figure 35:
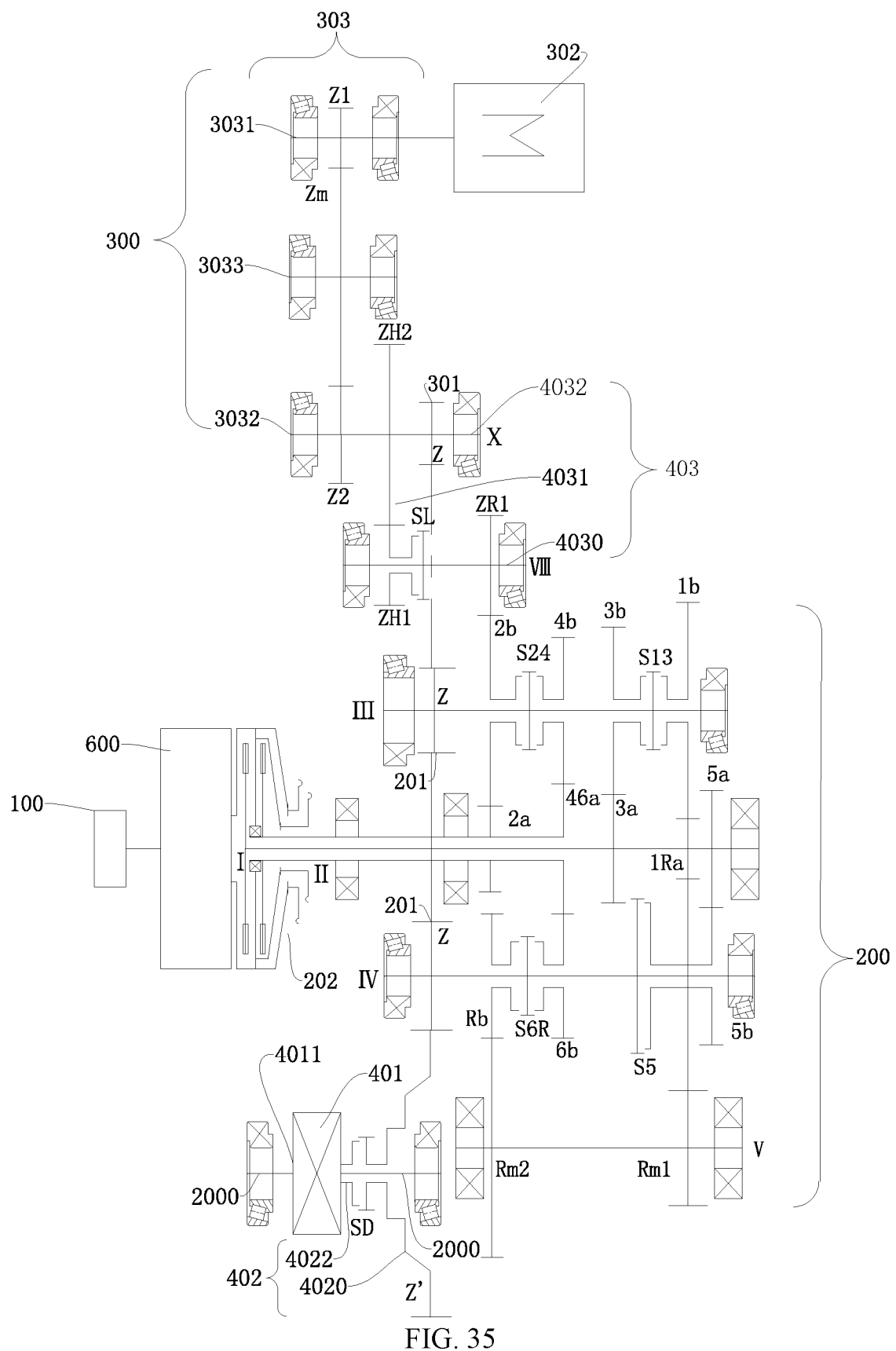
Figure 36:
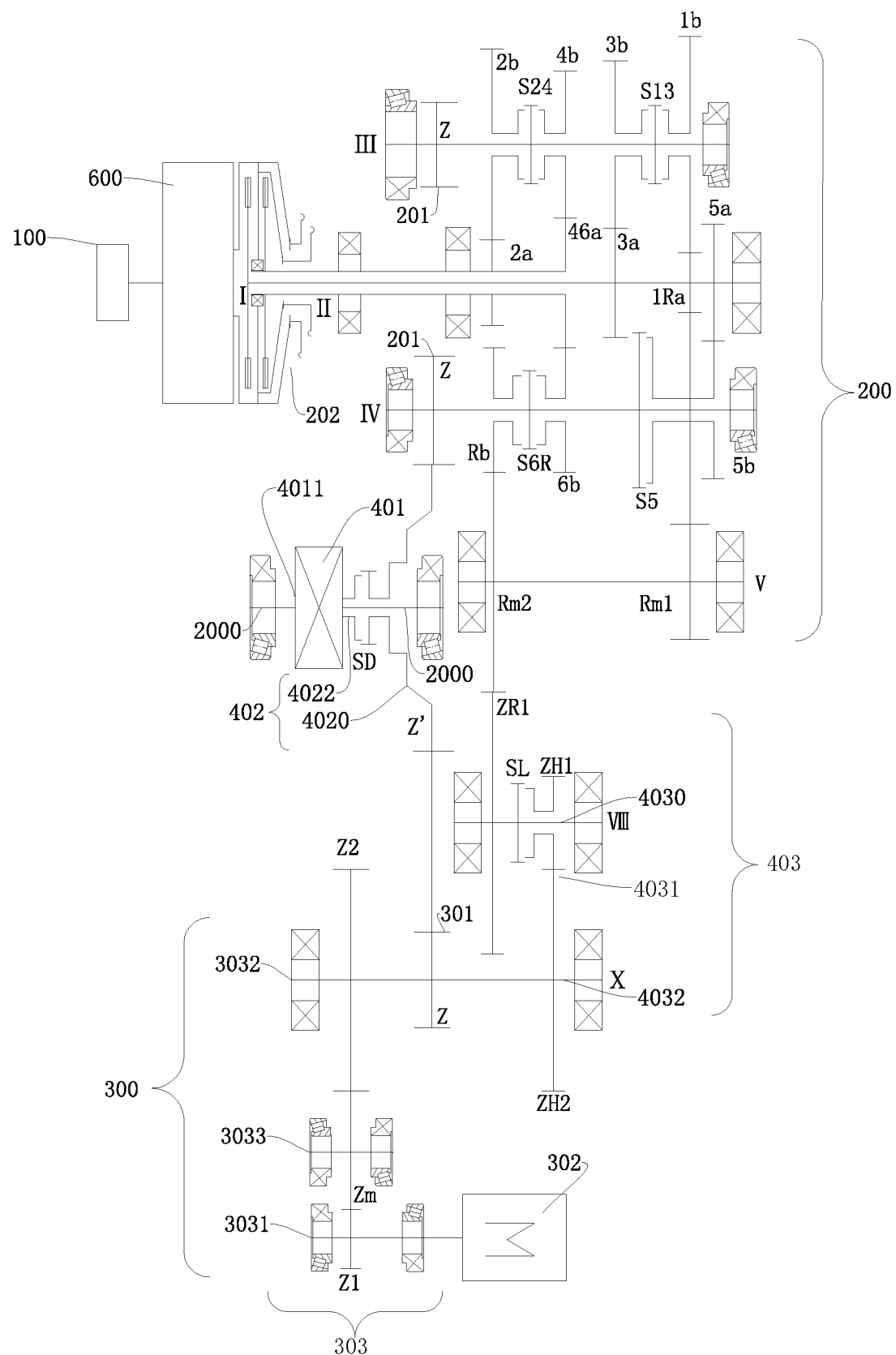
Figure 37:
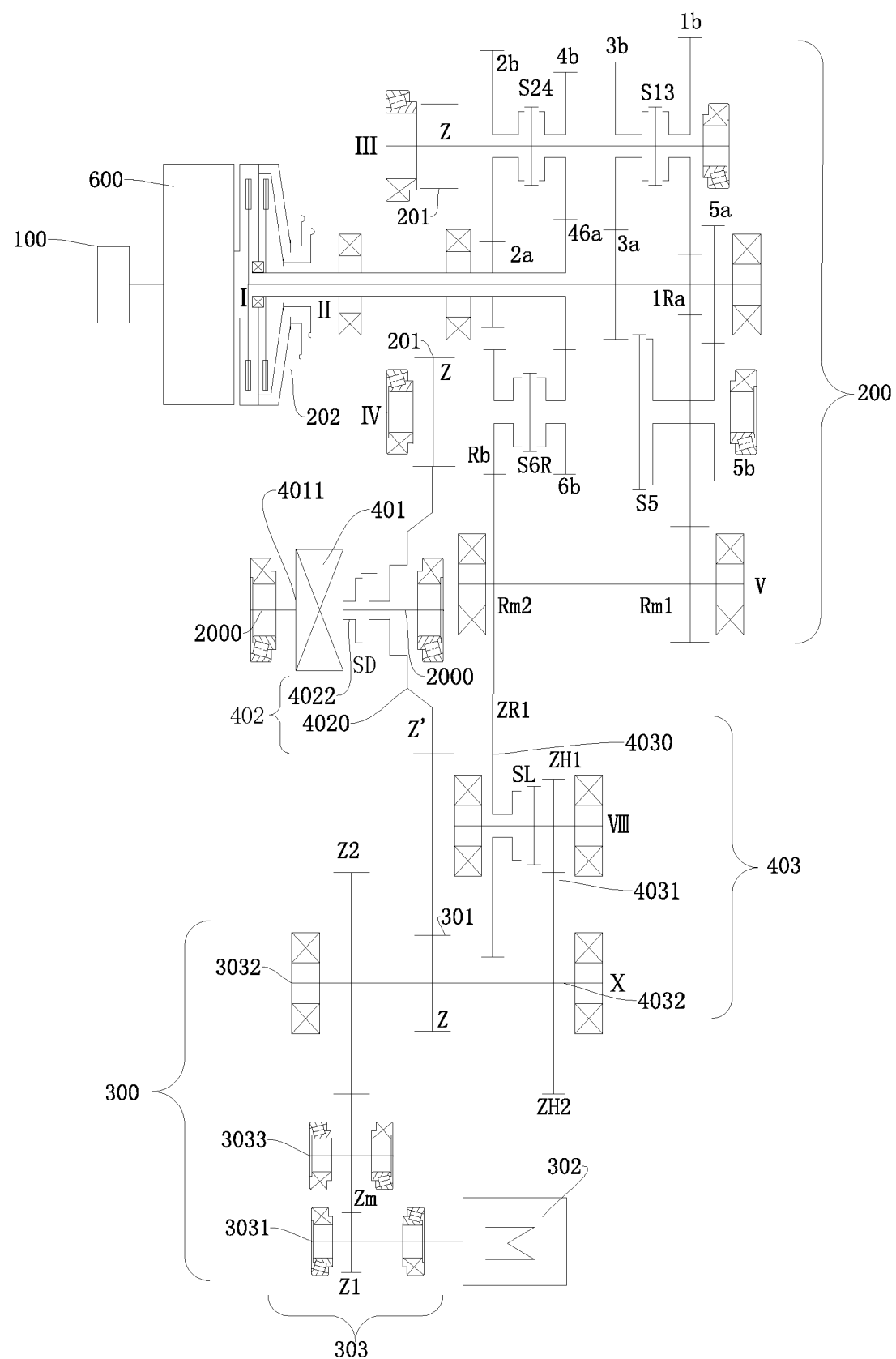
Figure 38:
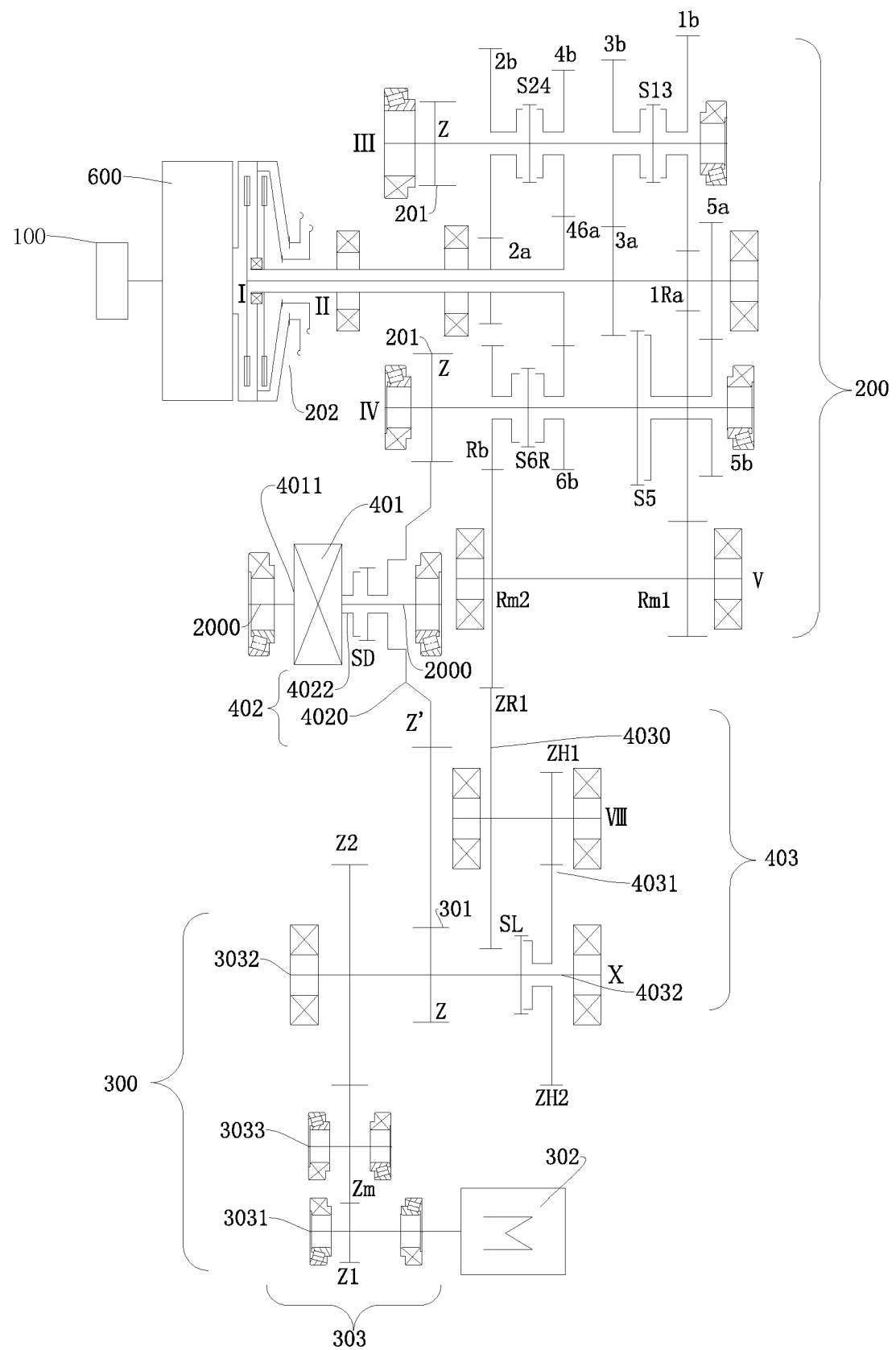
Figure 39:
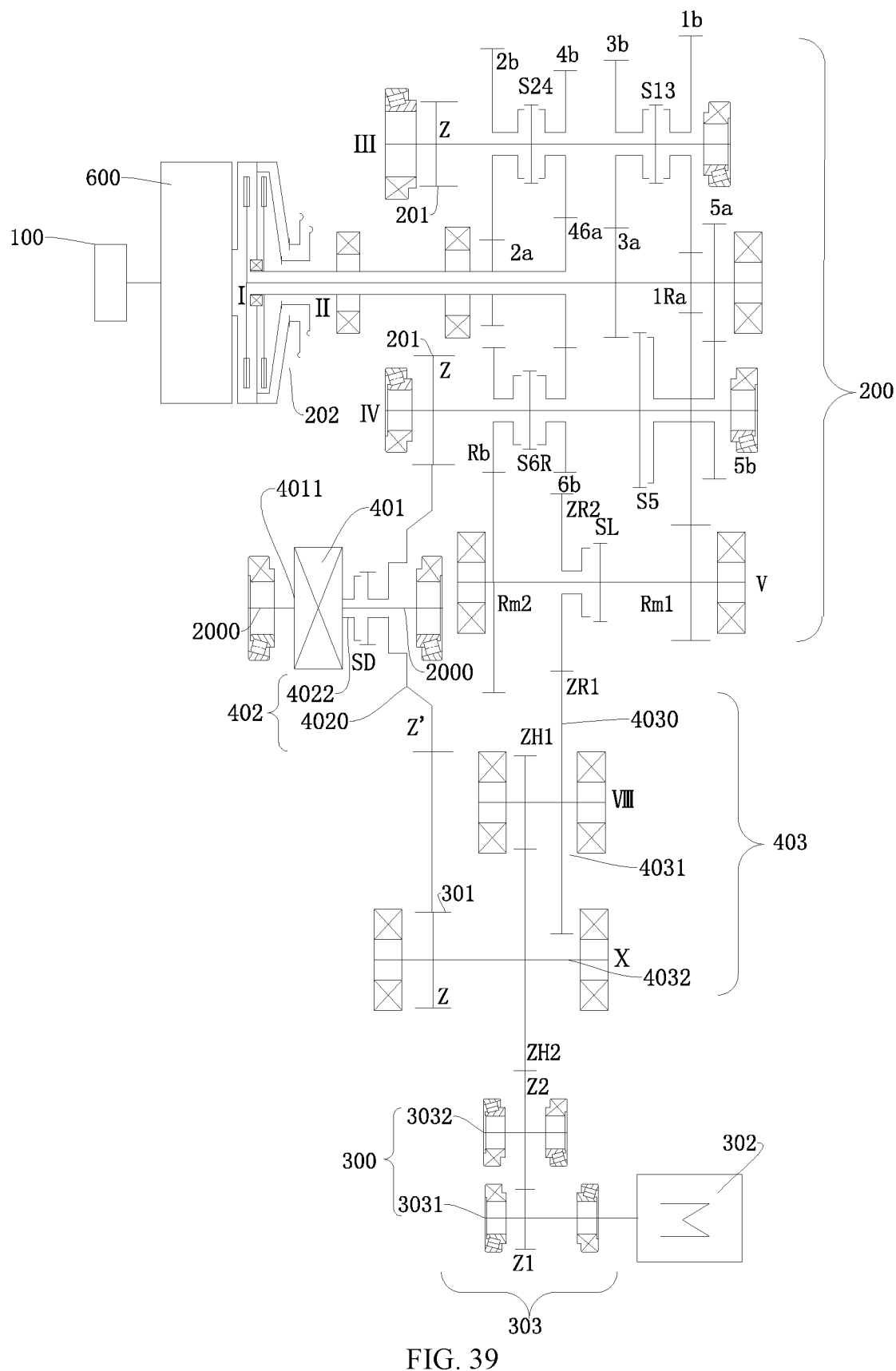
Figure 40:
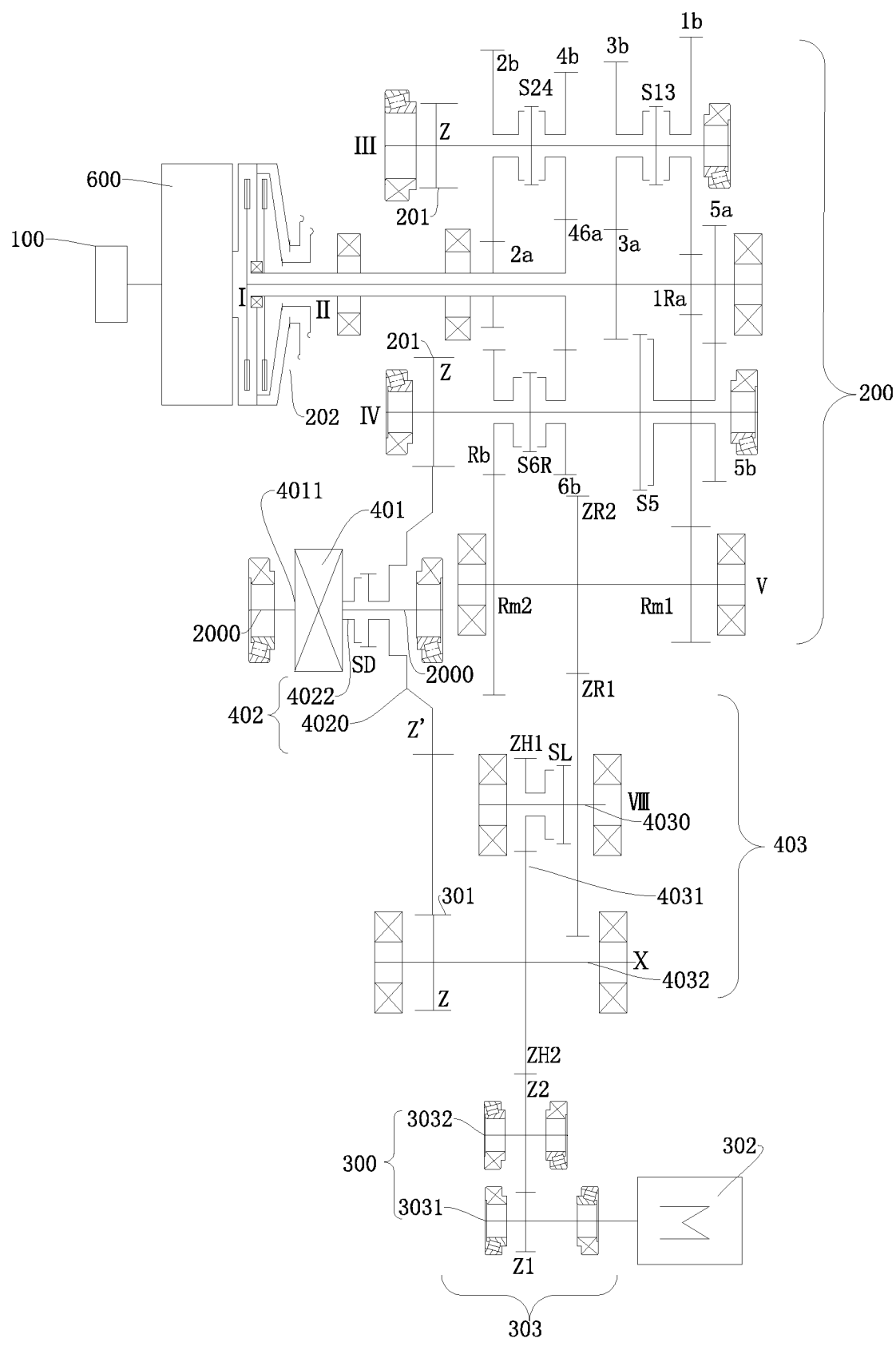
Figure 41:
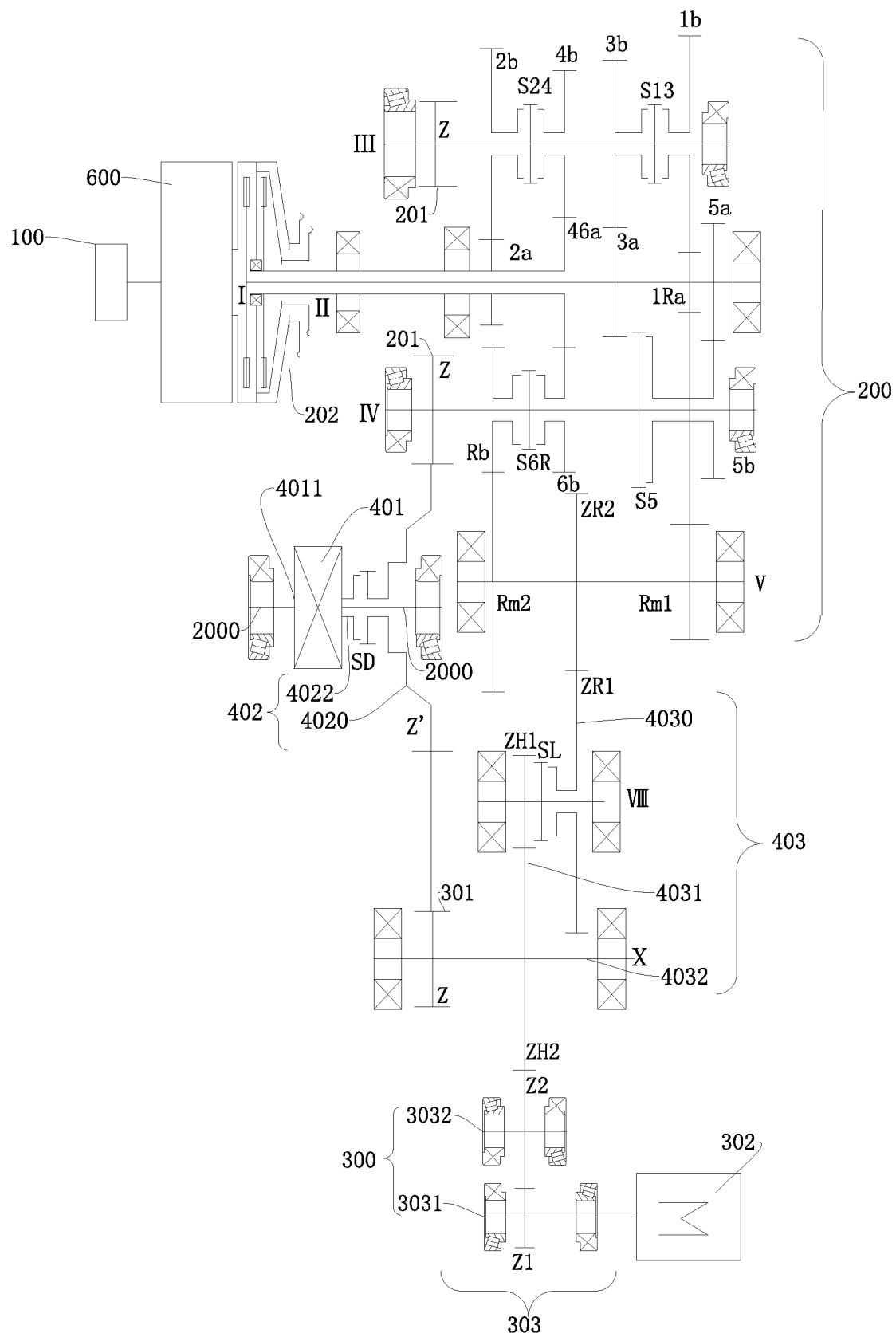
Figure 42:
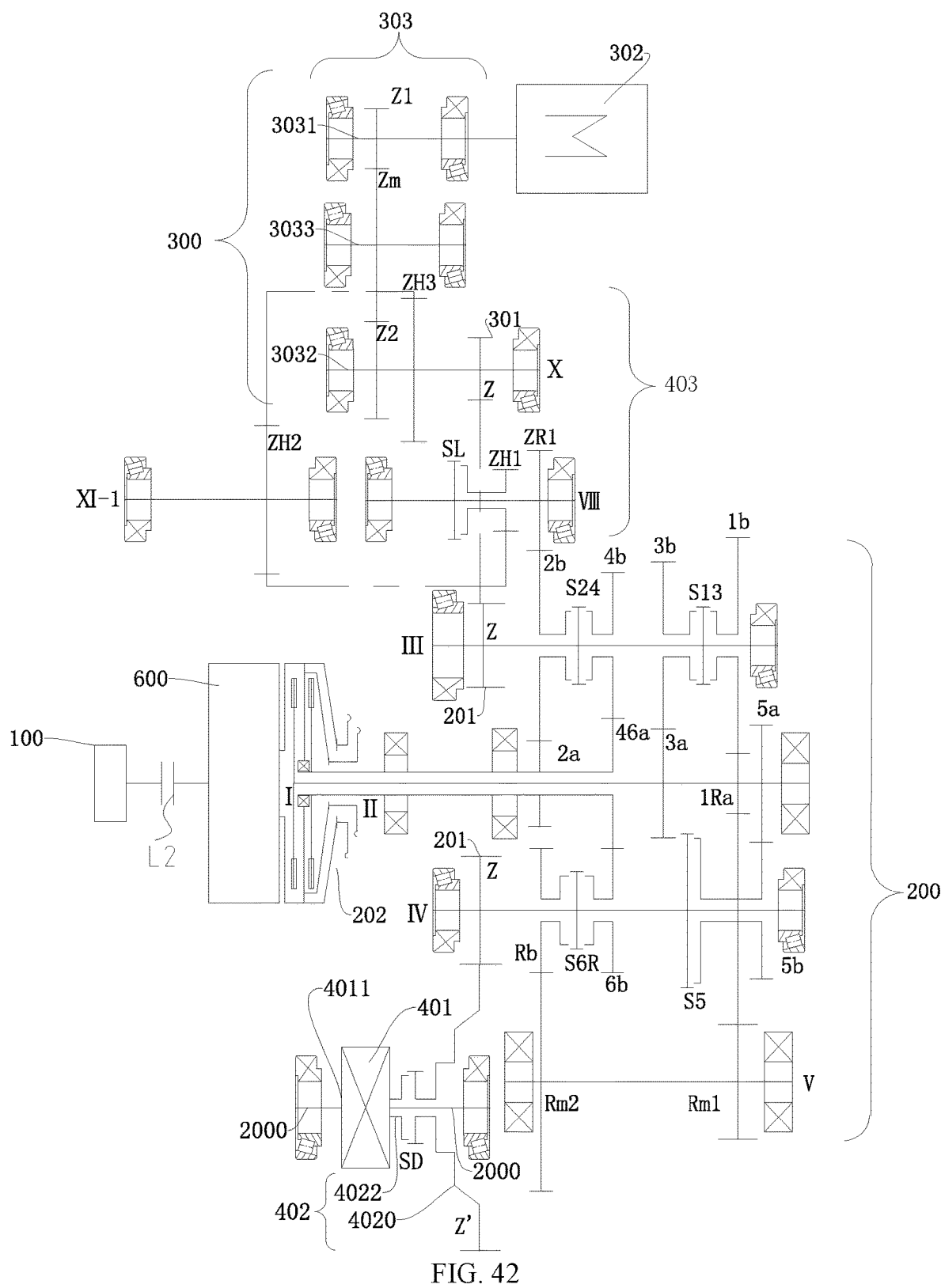
Figure 43:
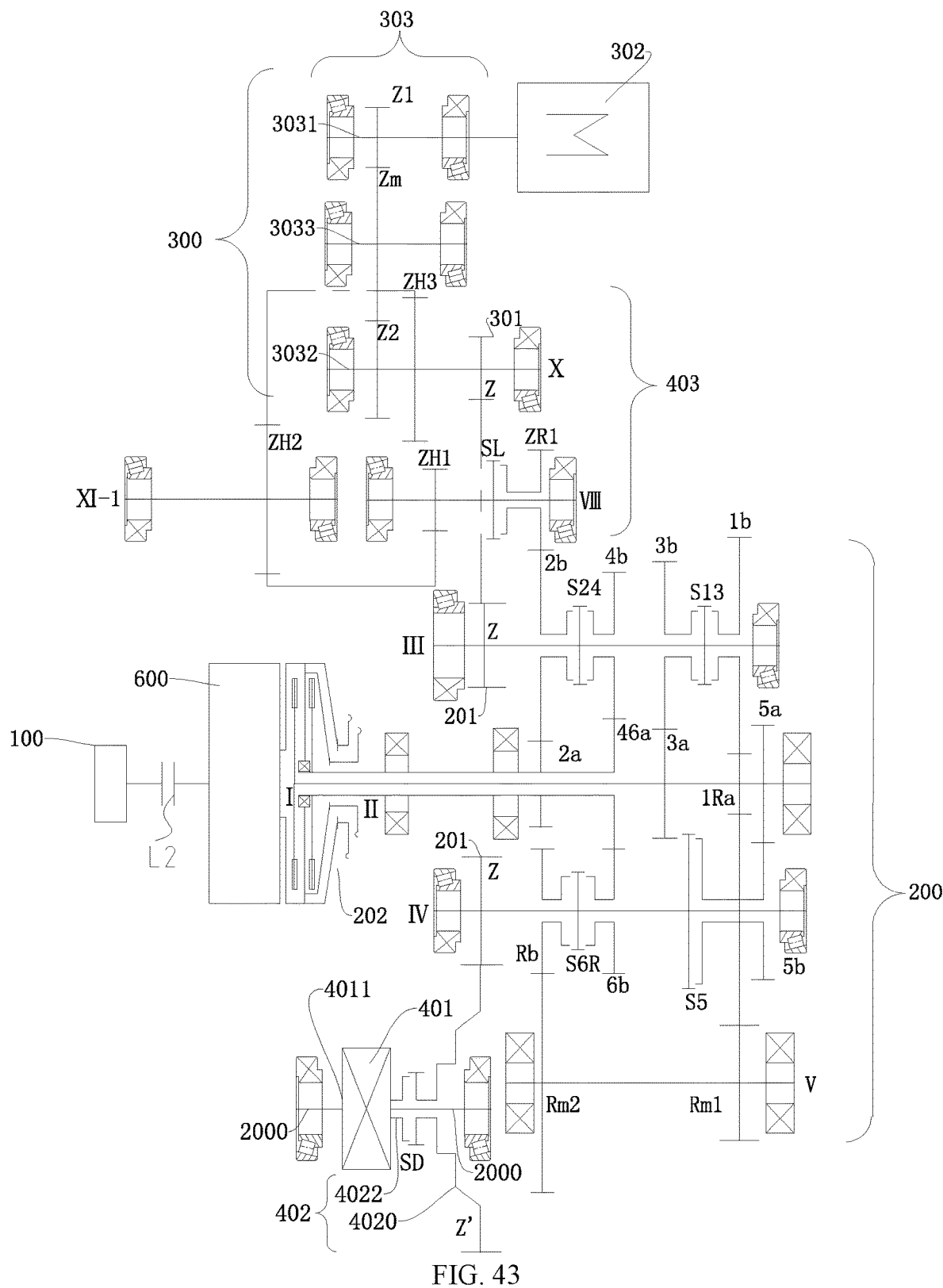
Figure 44:
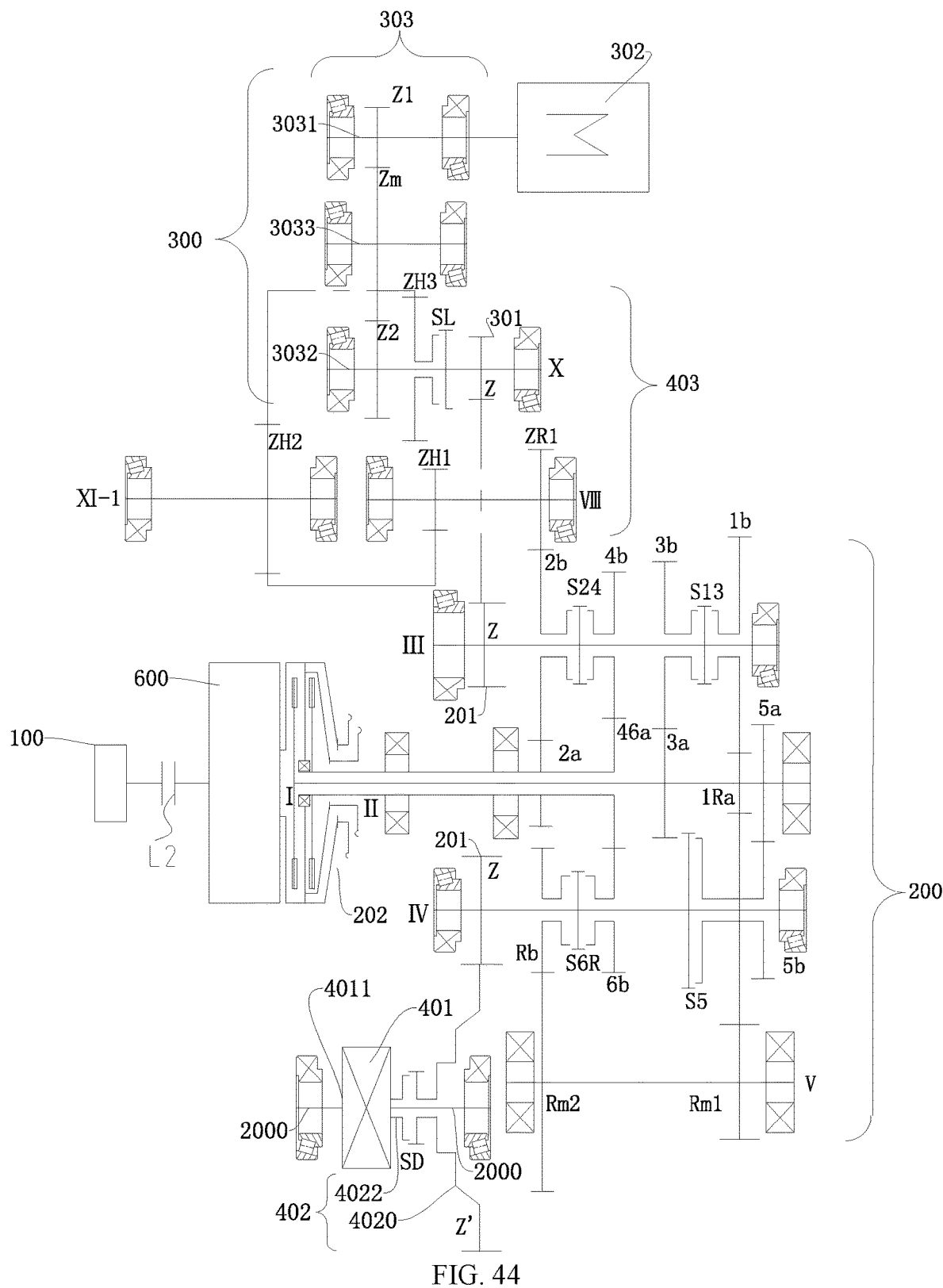
Figure 45:
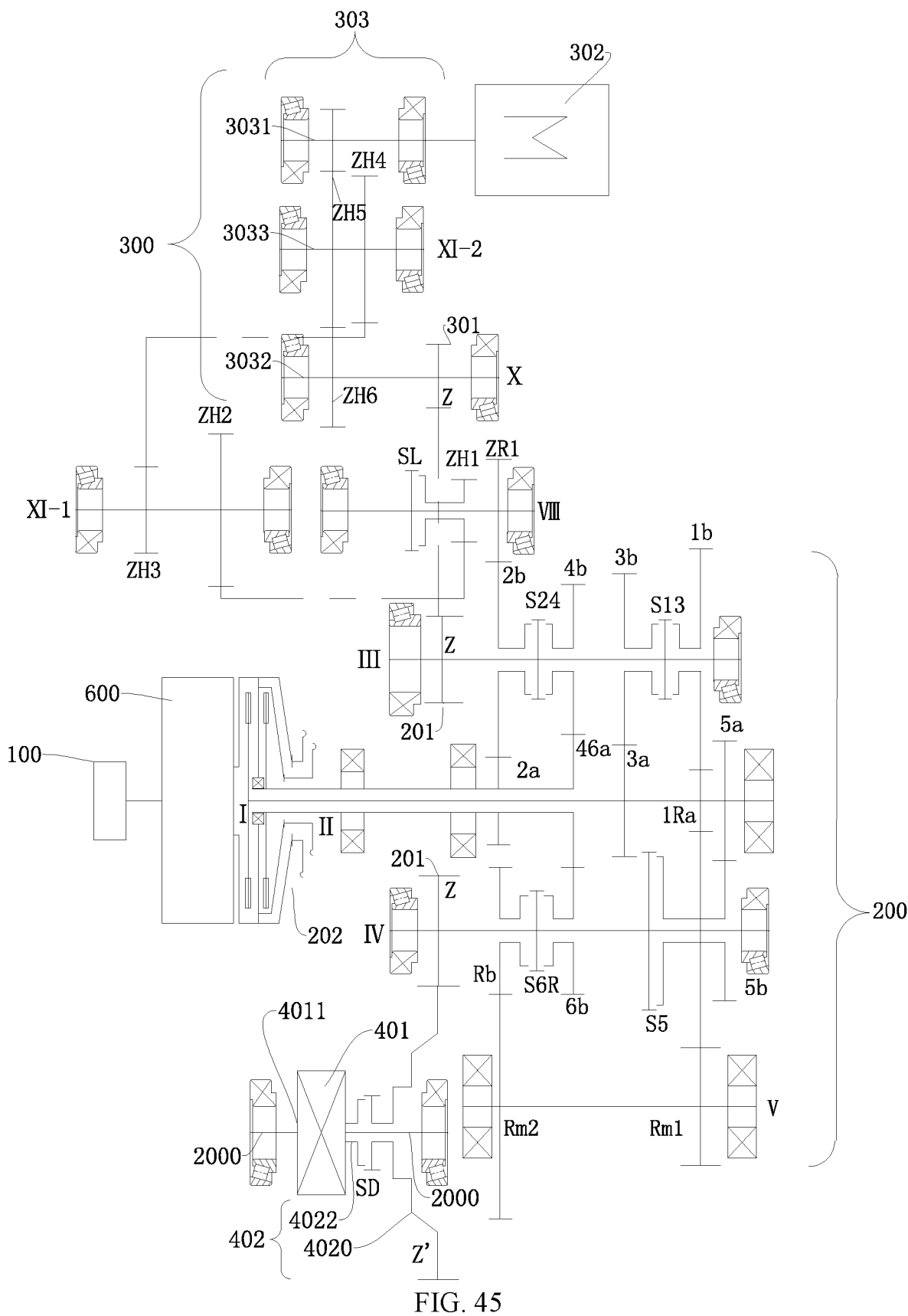
Figure 46:
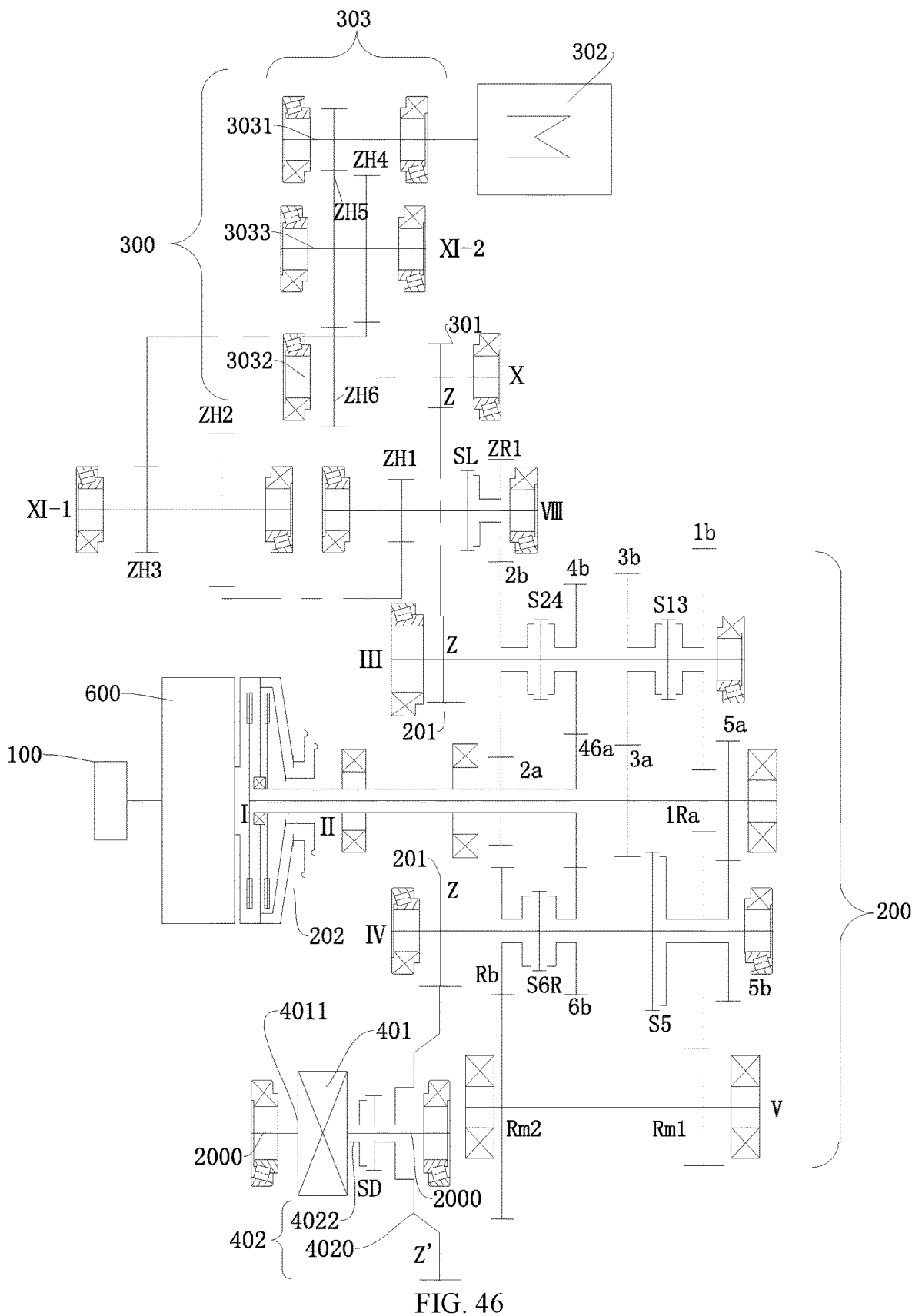
Figure 47:
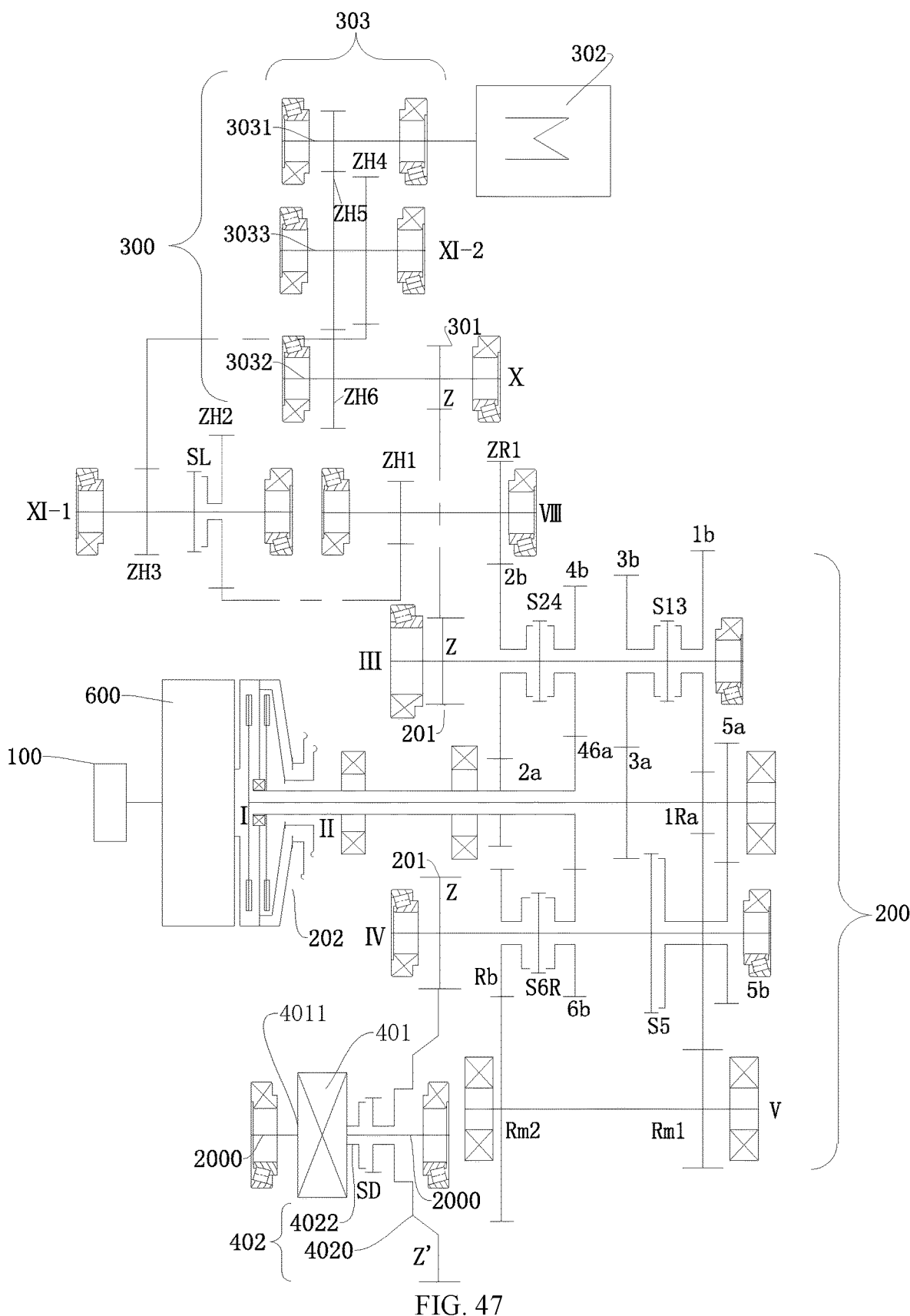
Figure 48:
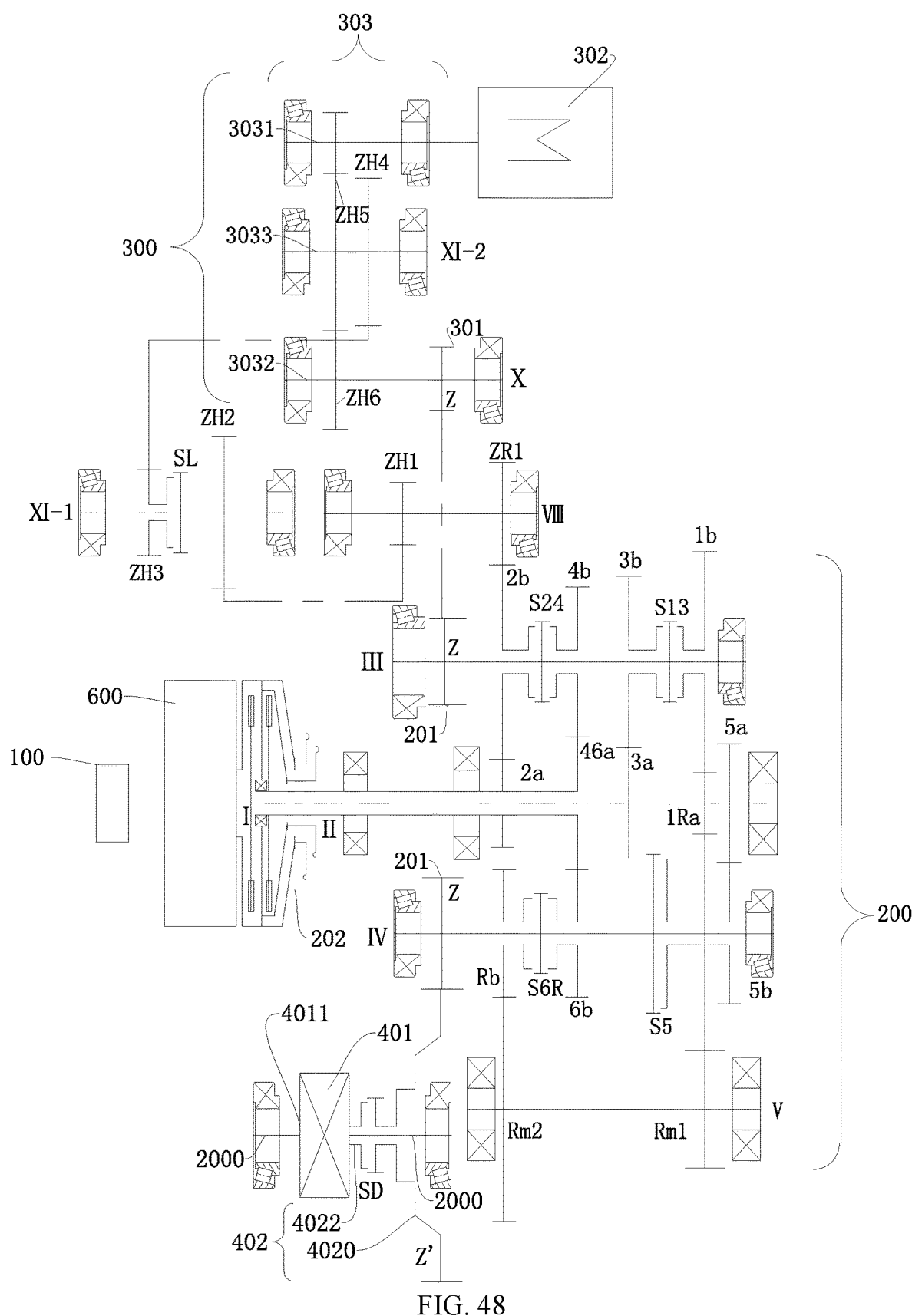
Figure 49:
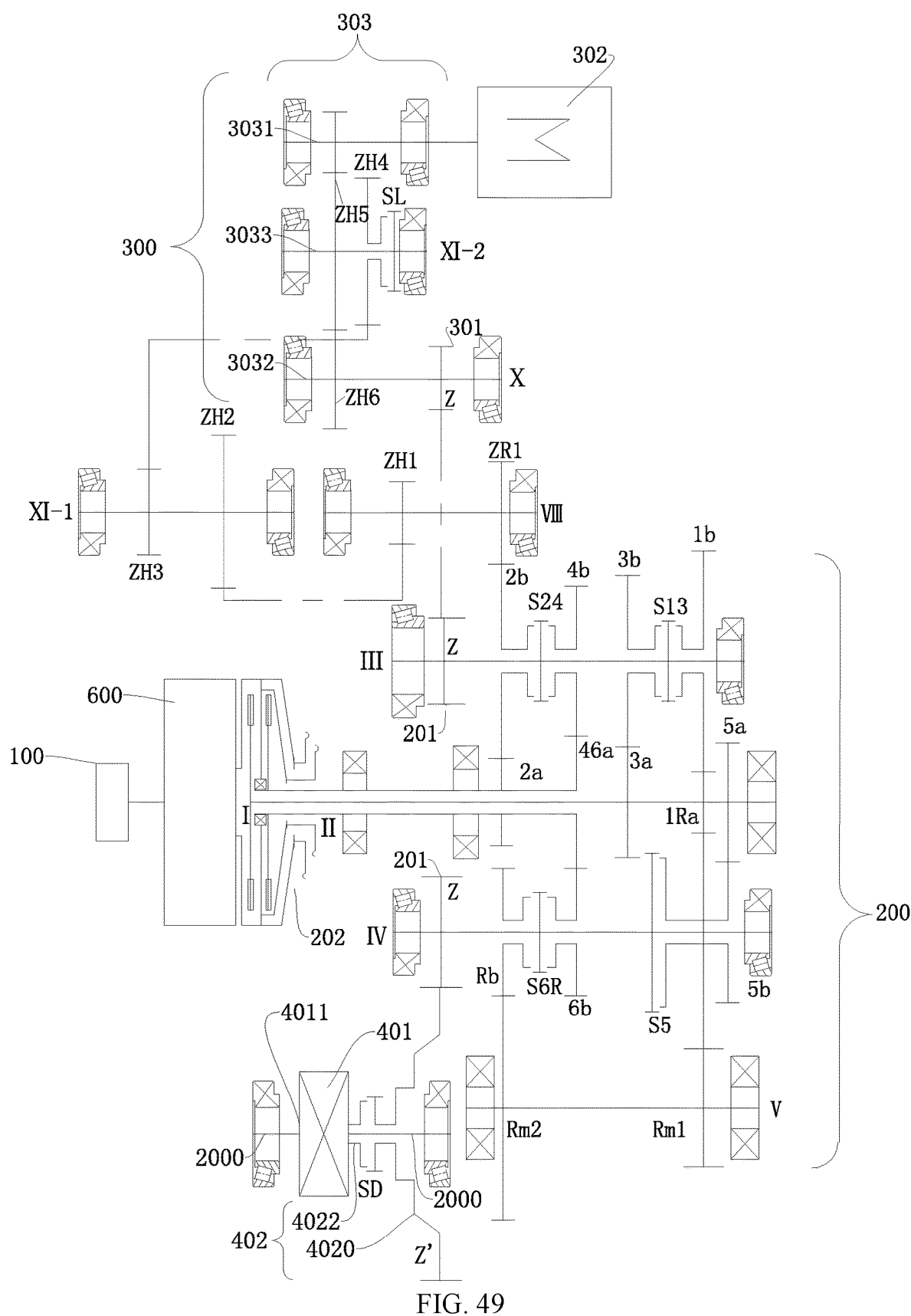
Figure 50:
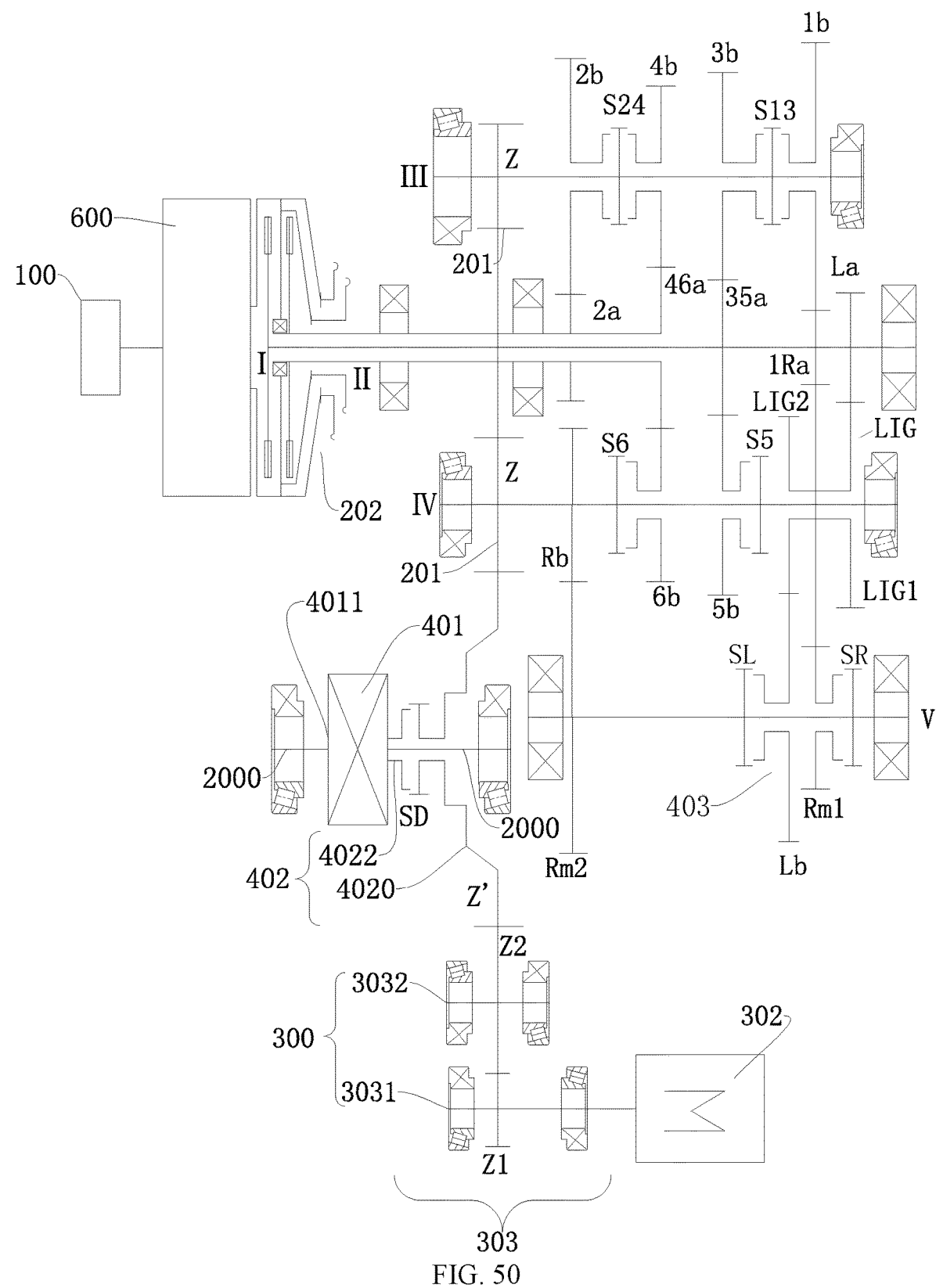
Figure 51:
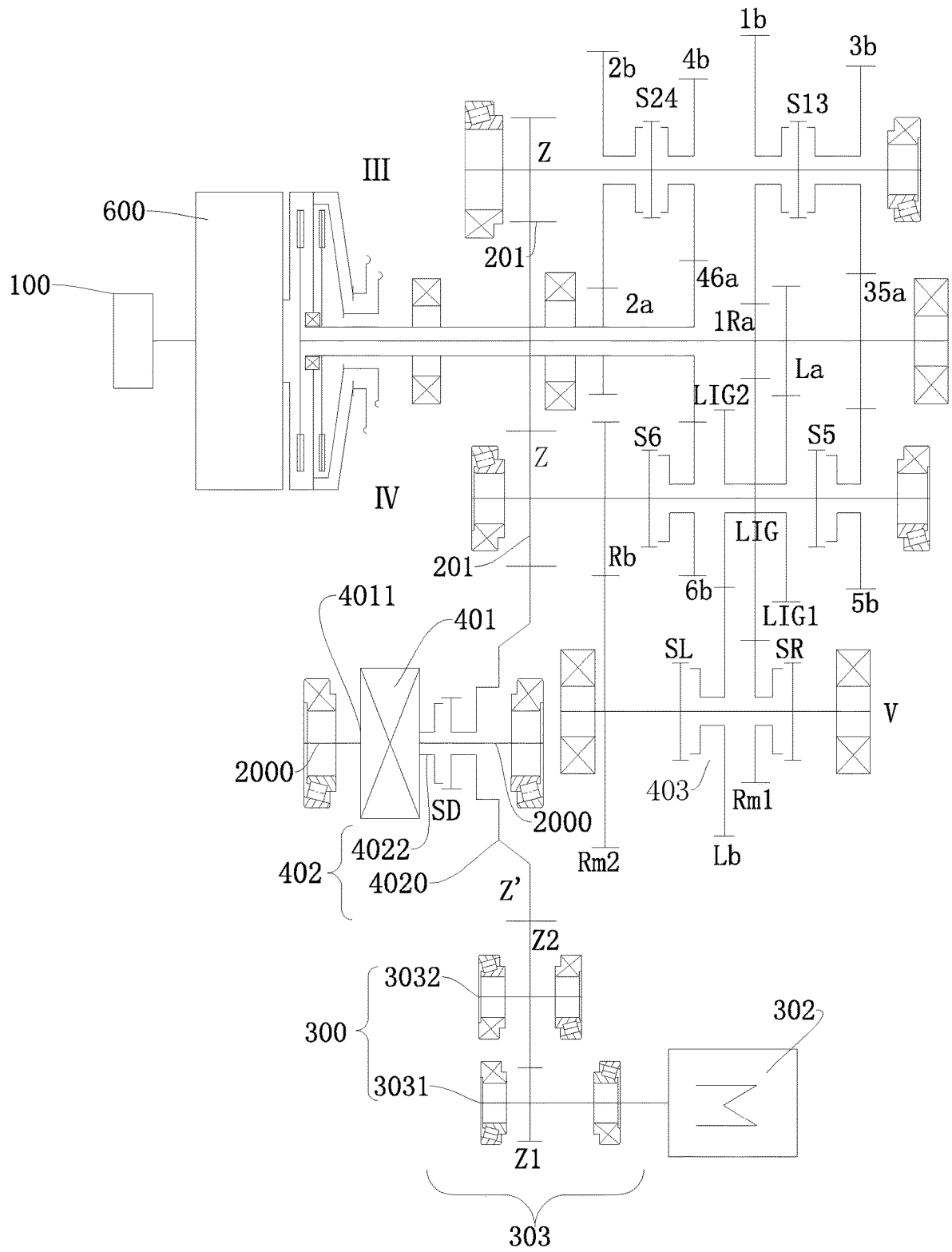
Figure 52:
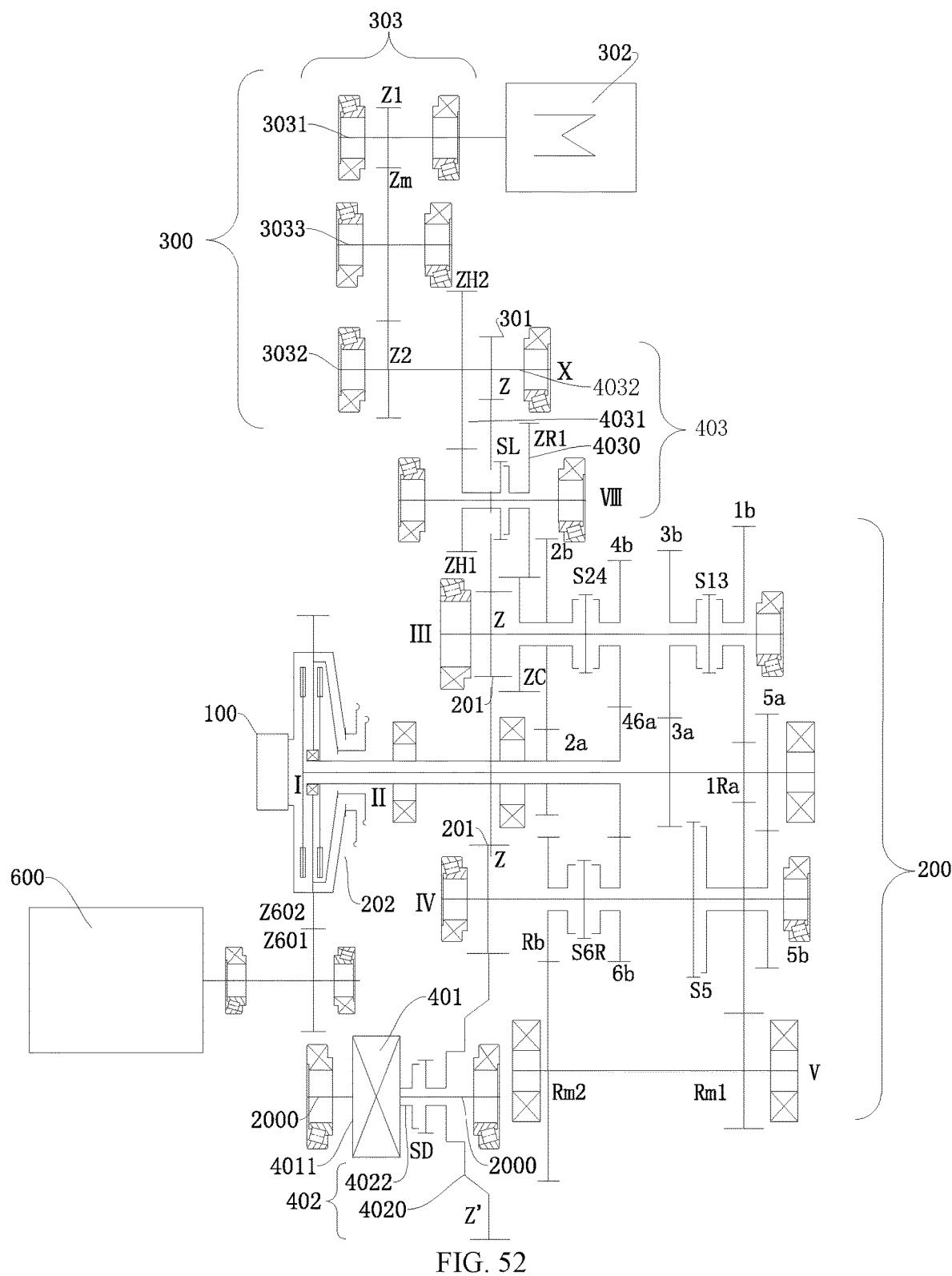
Figure 53:
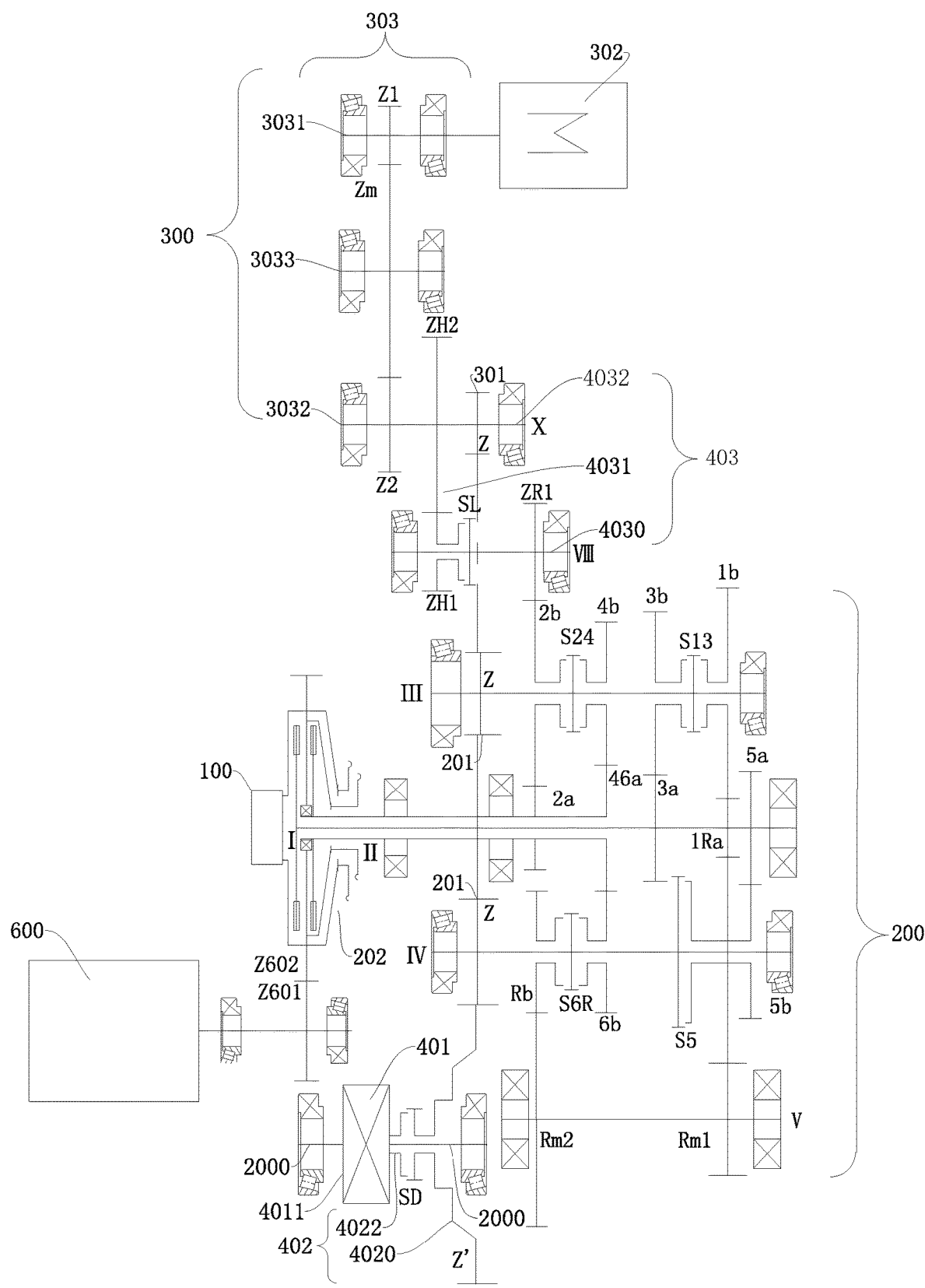
Figure 54:
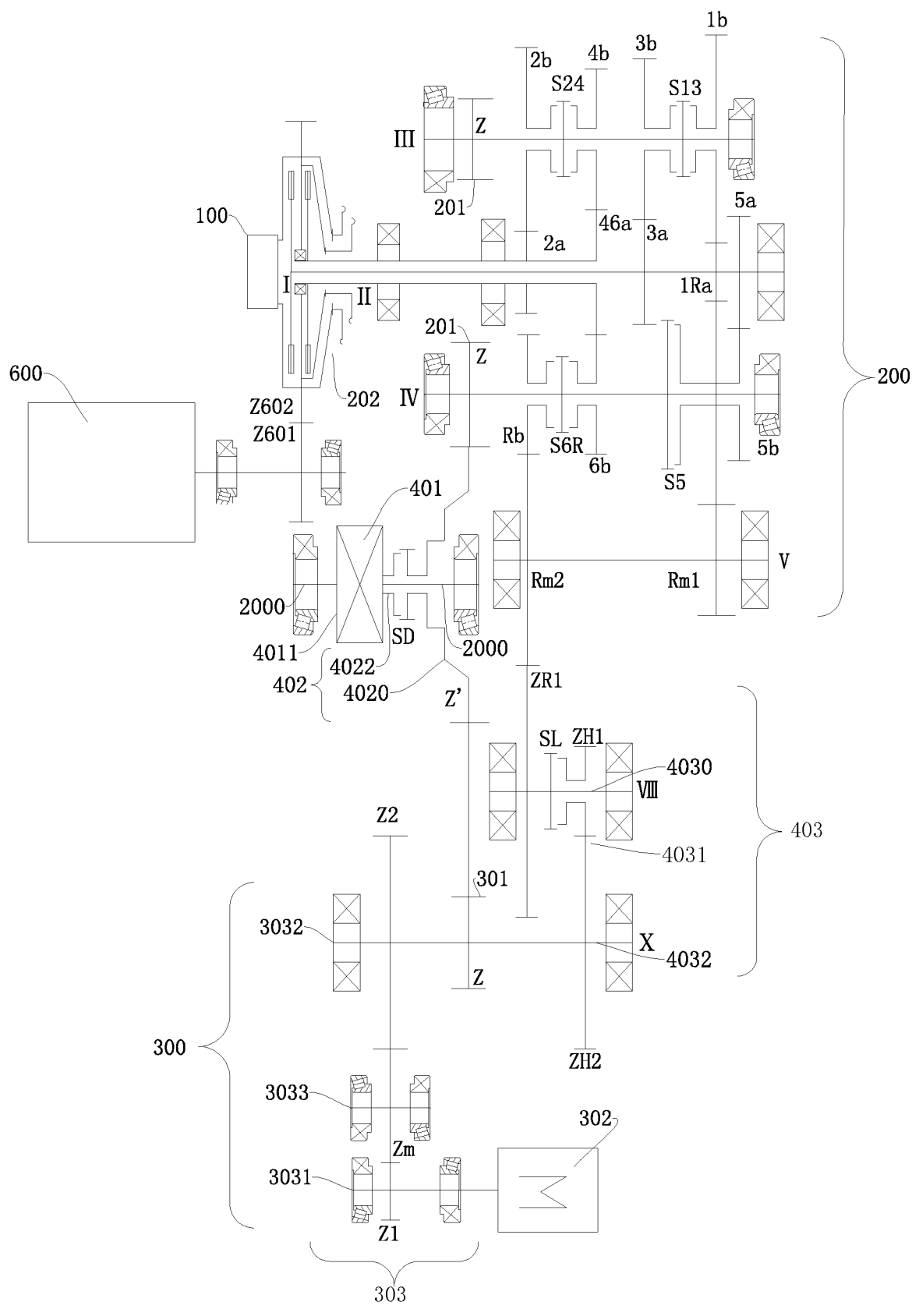
Figure 55:
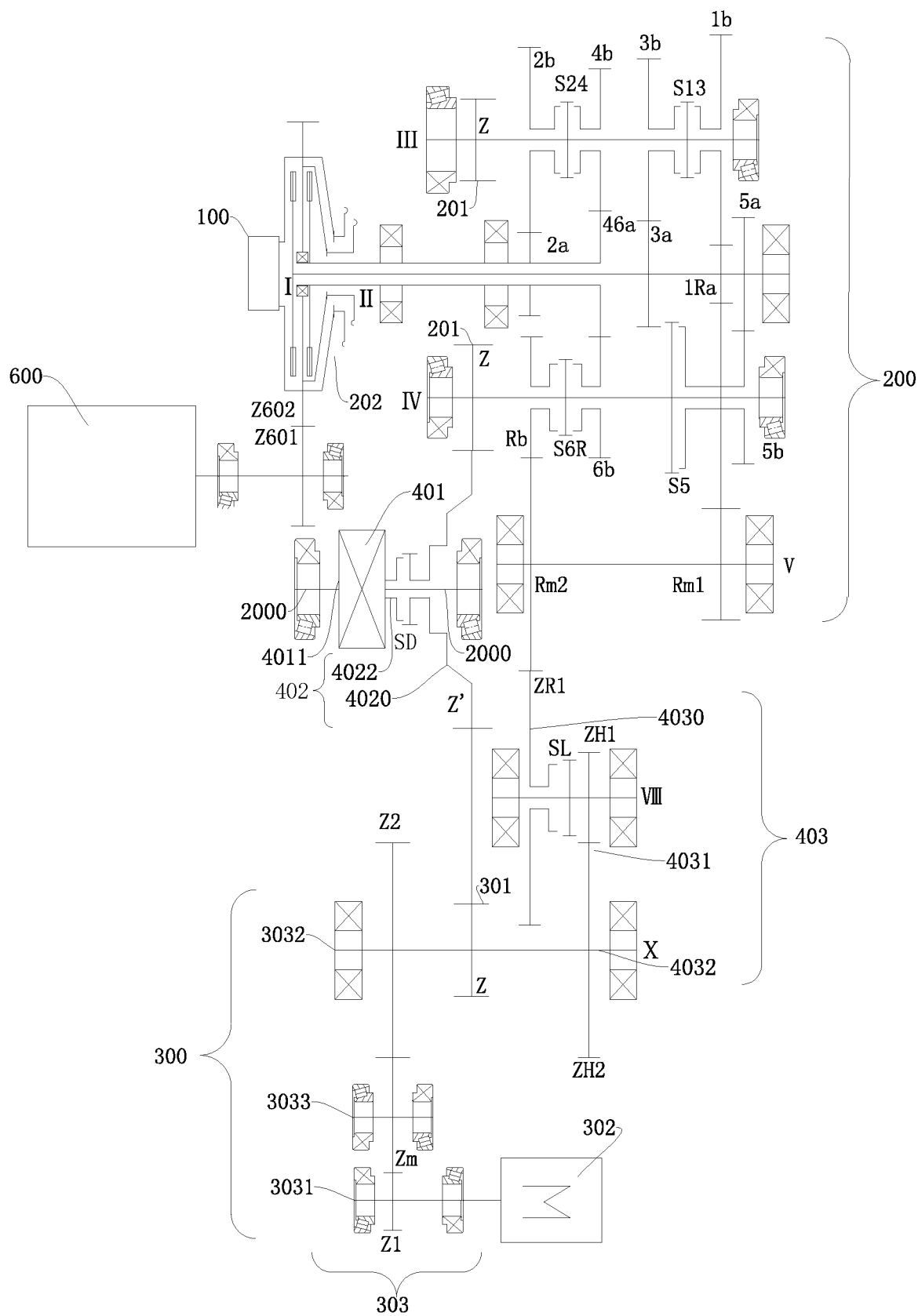
Figure 56:
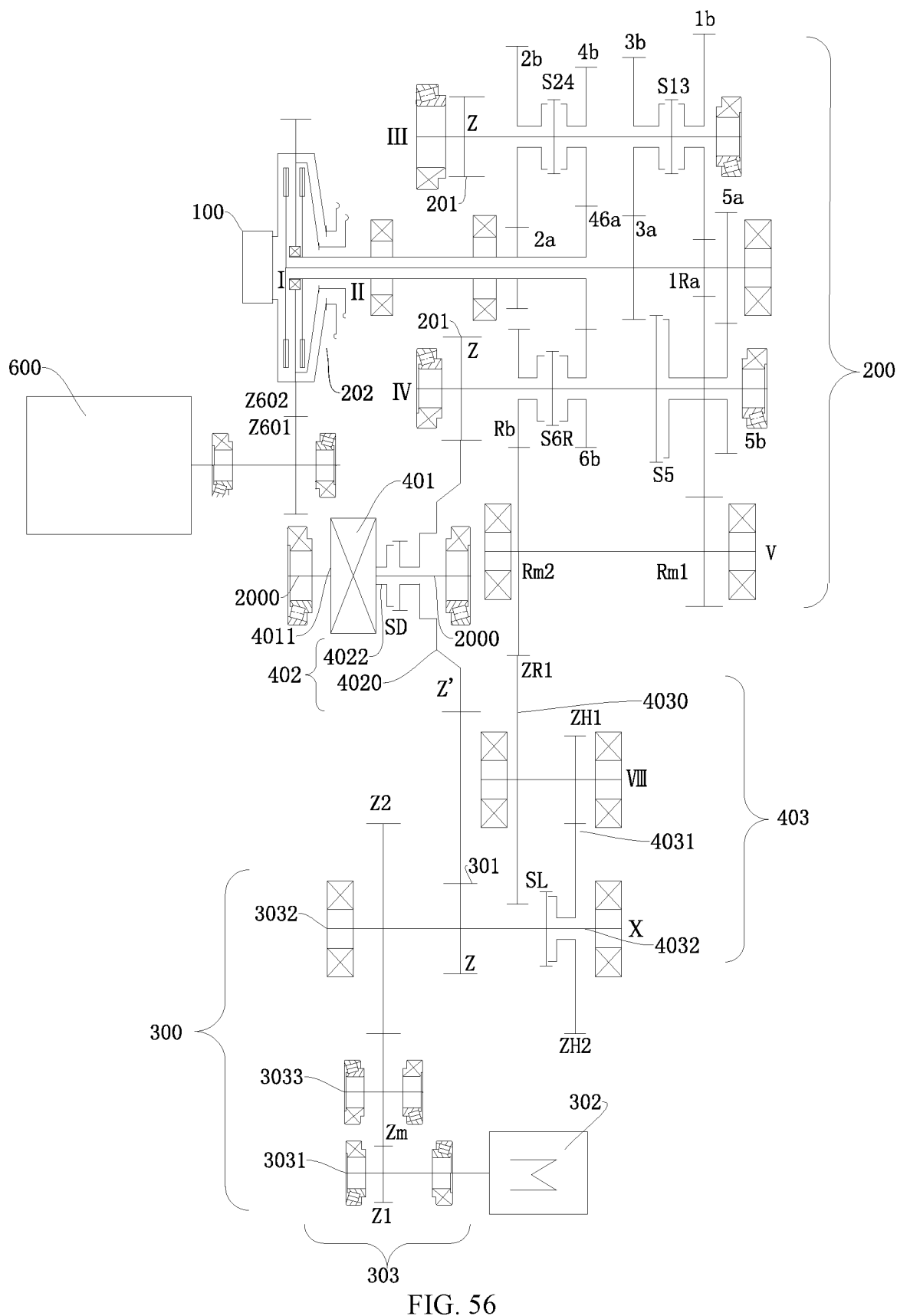
Figure 57:
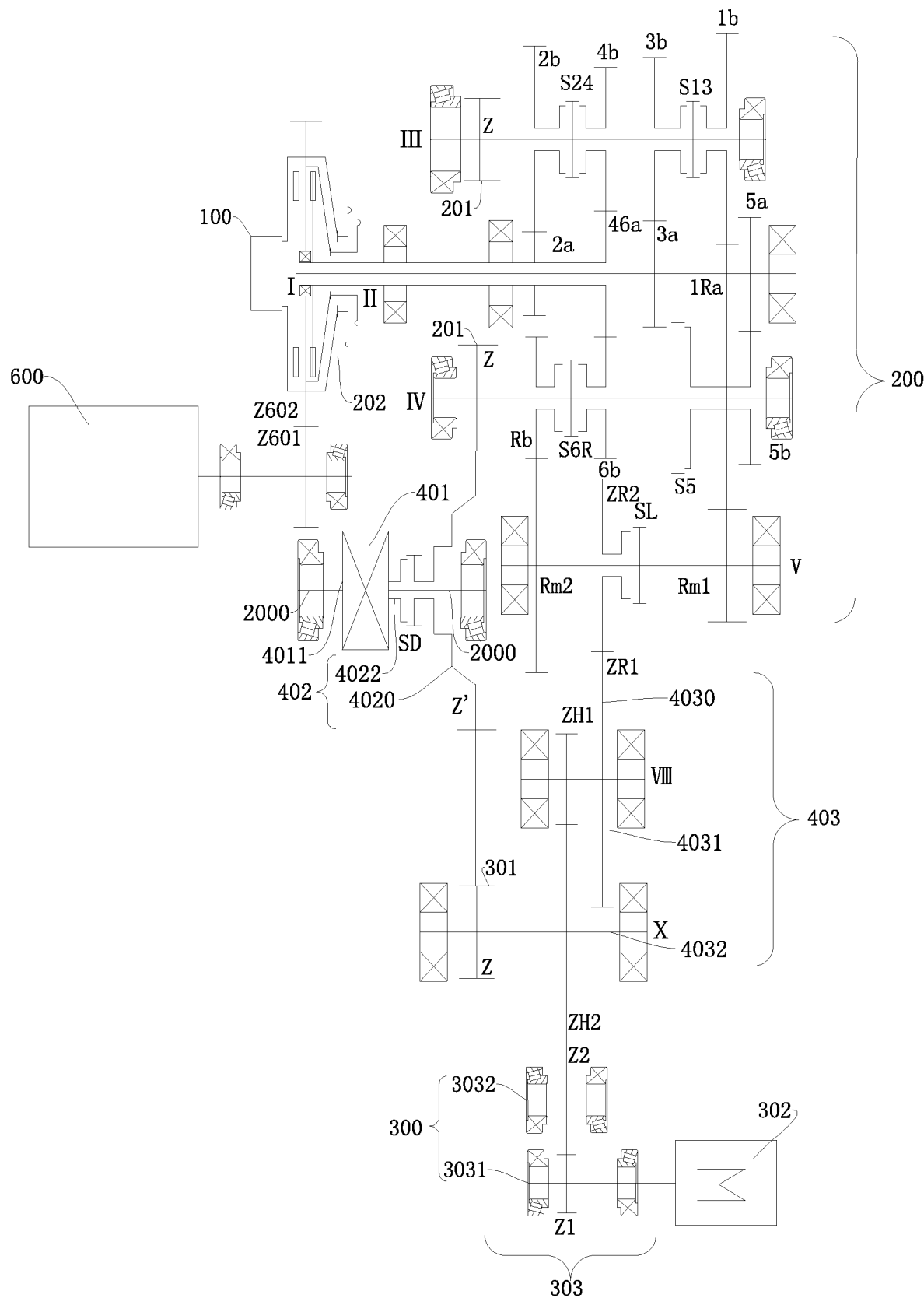
Figure 58:
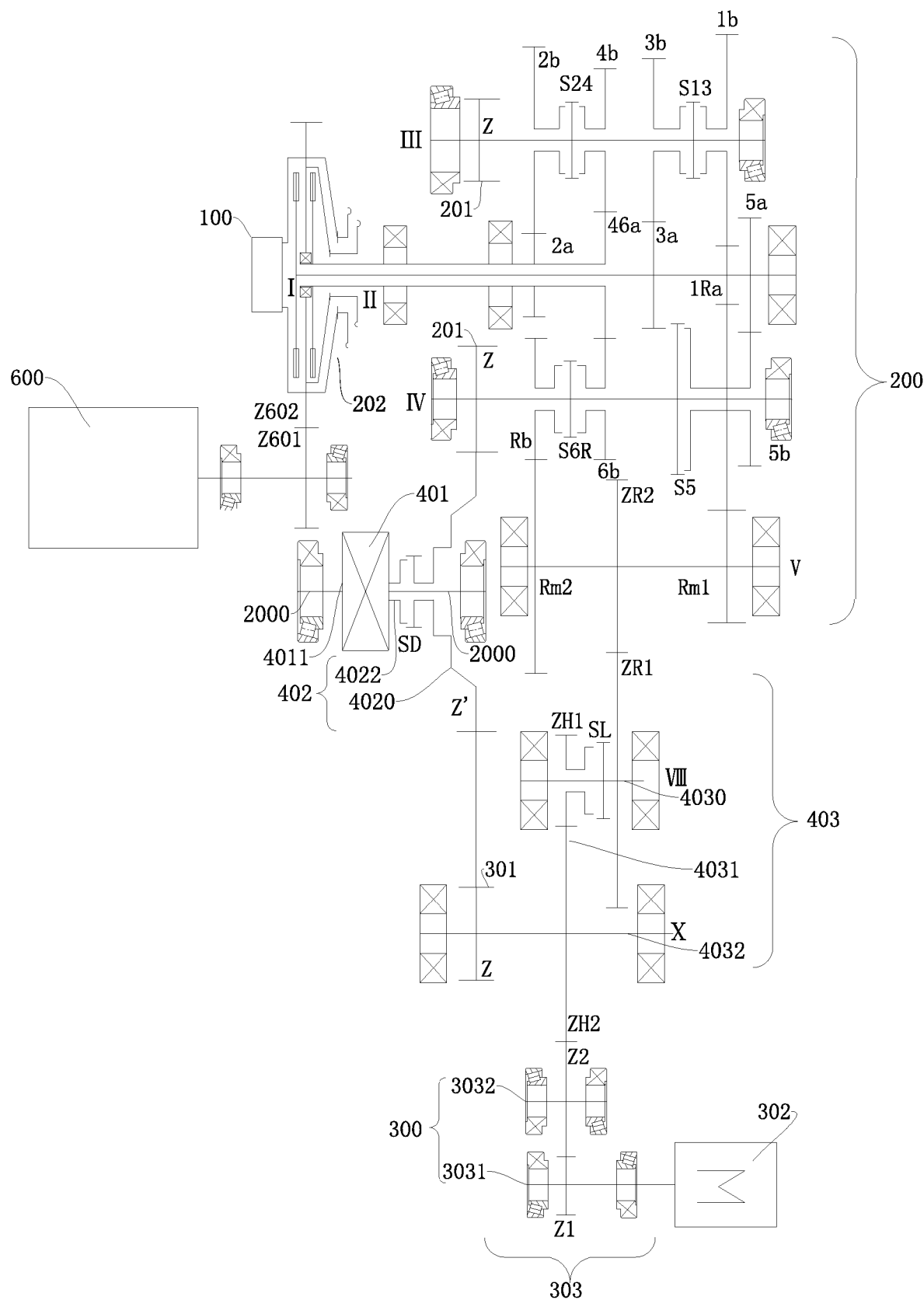
Figure 59:
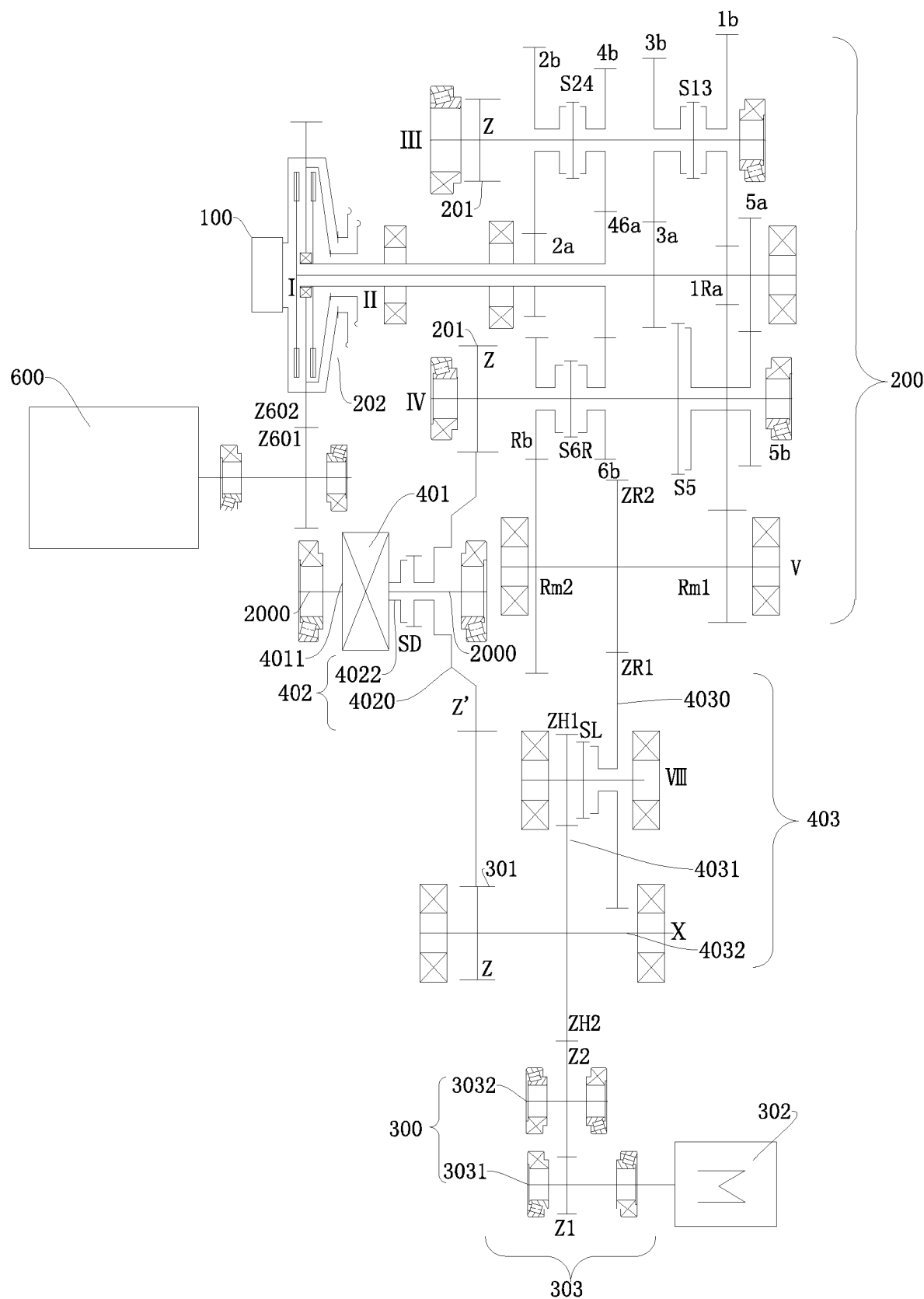
Figure 60:
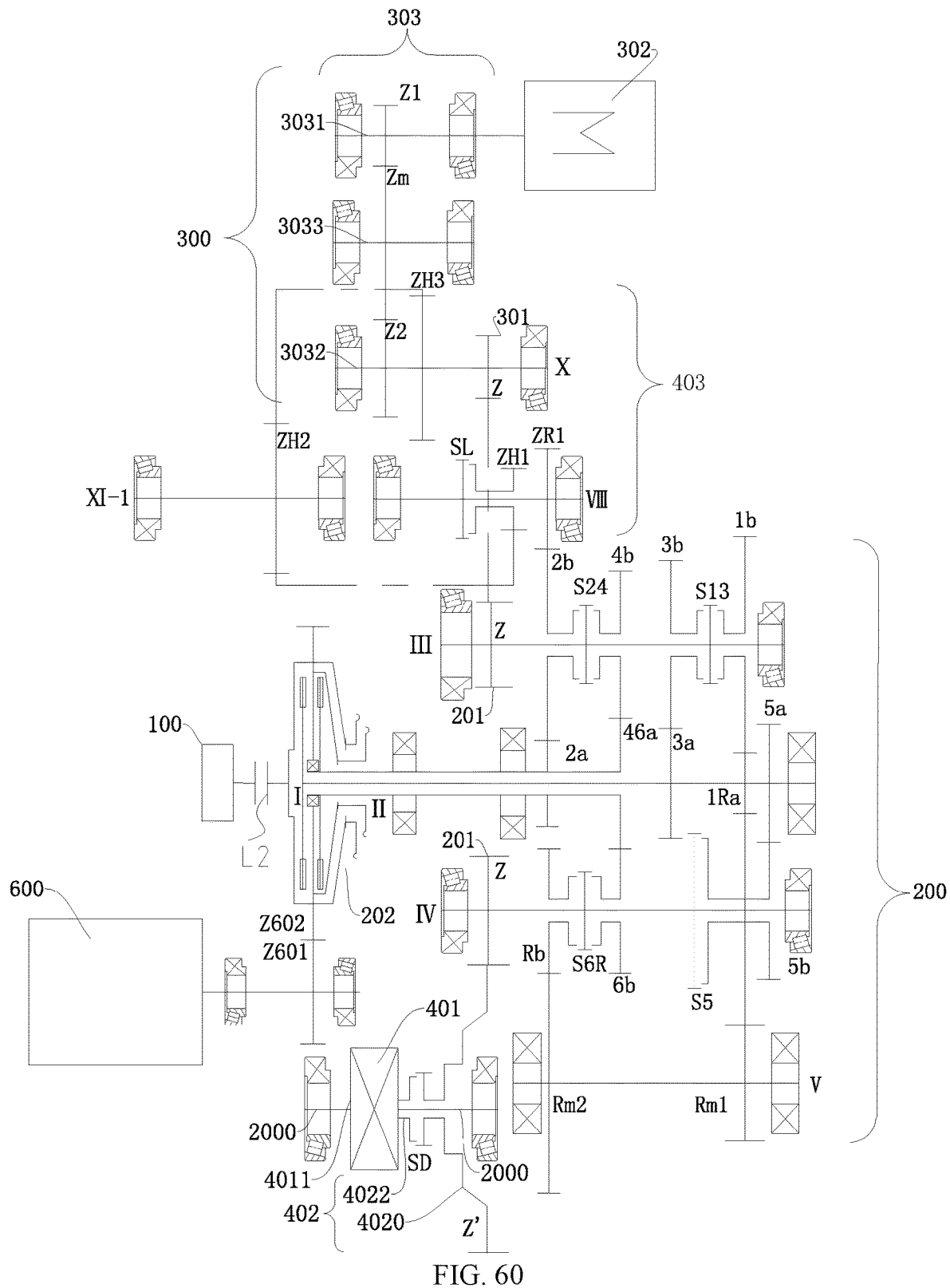
Figure 61:
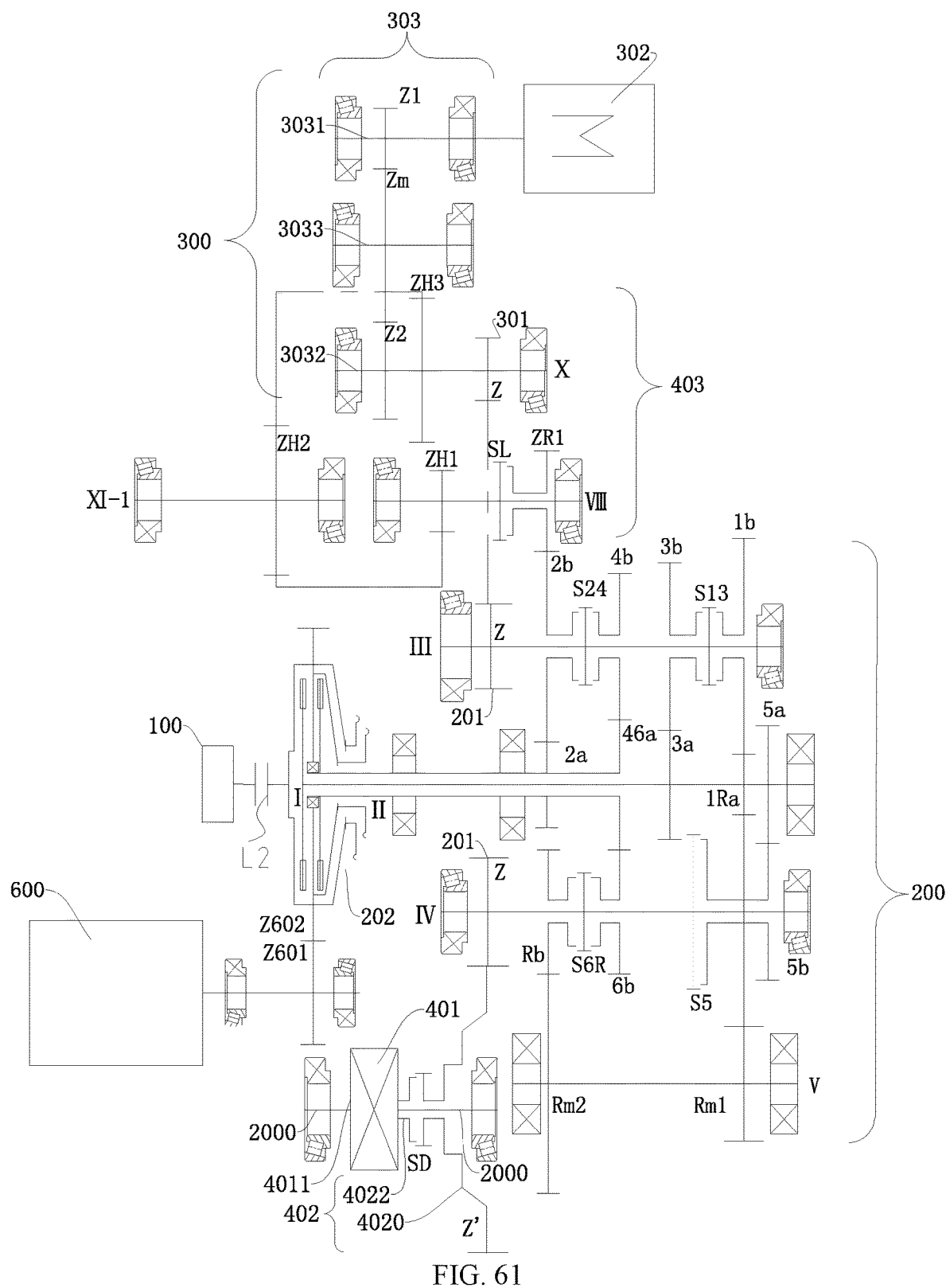
Figure 62:
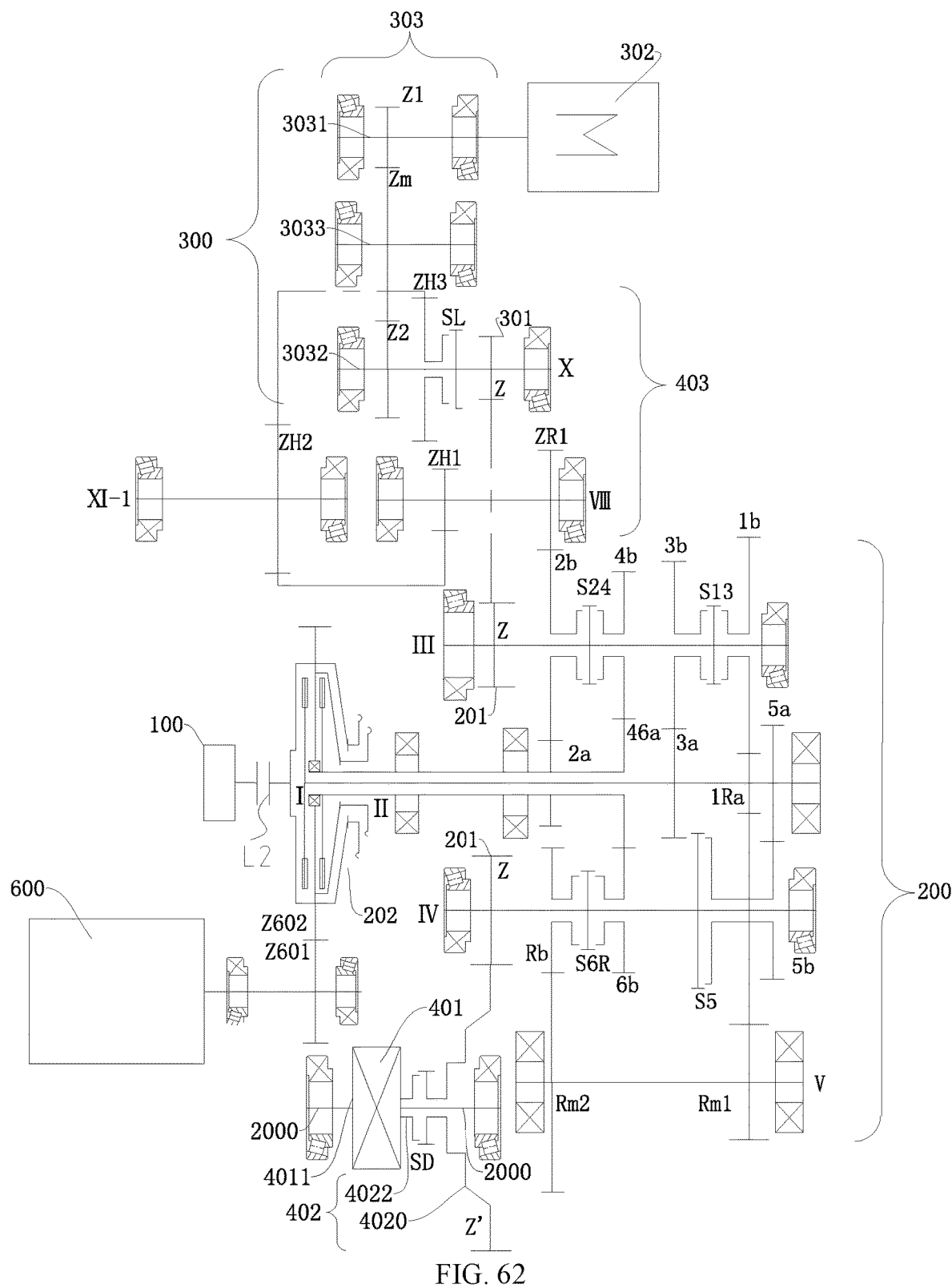
Figure 63:
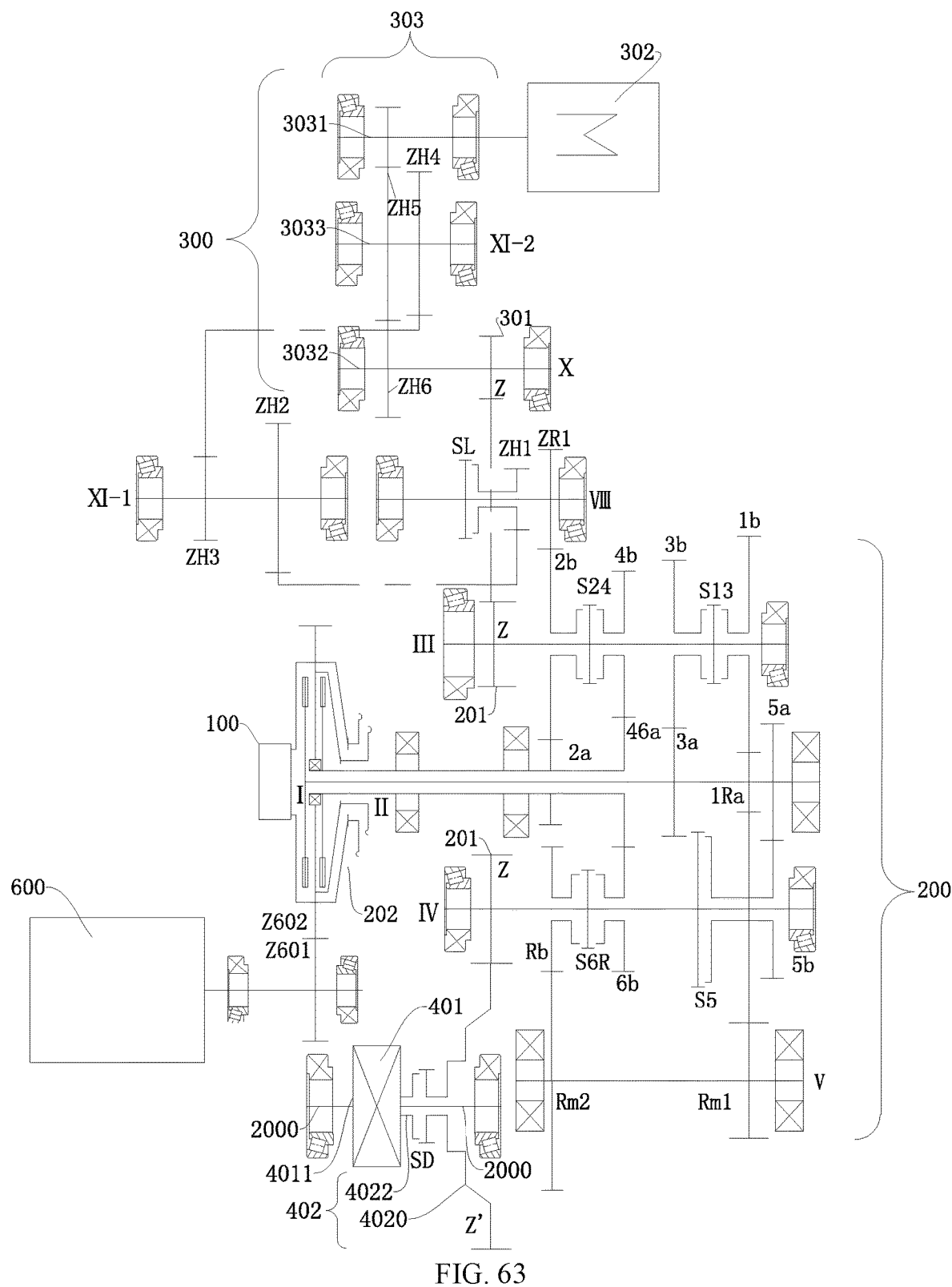
Figure 64:
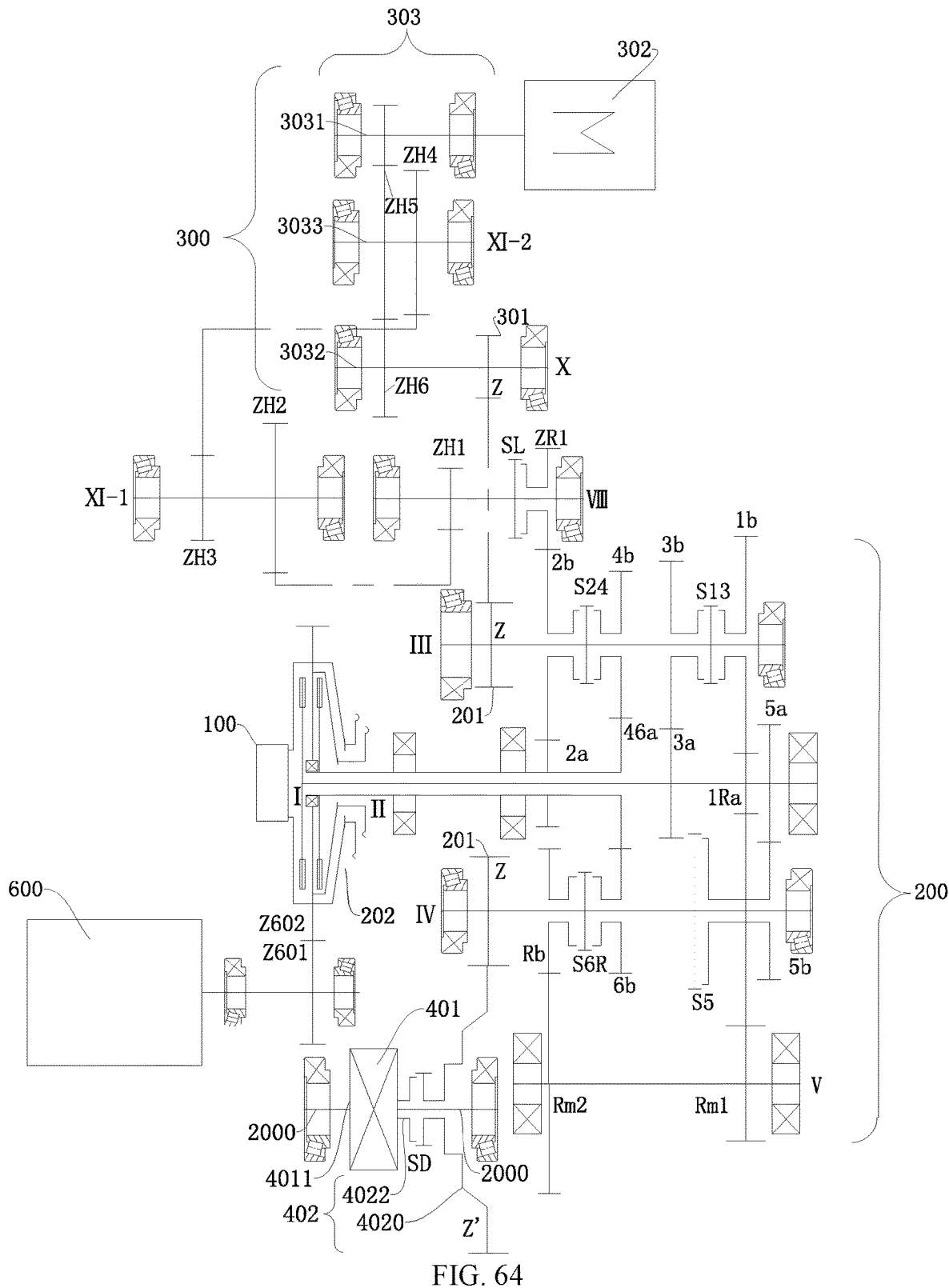
Figure 65:
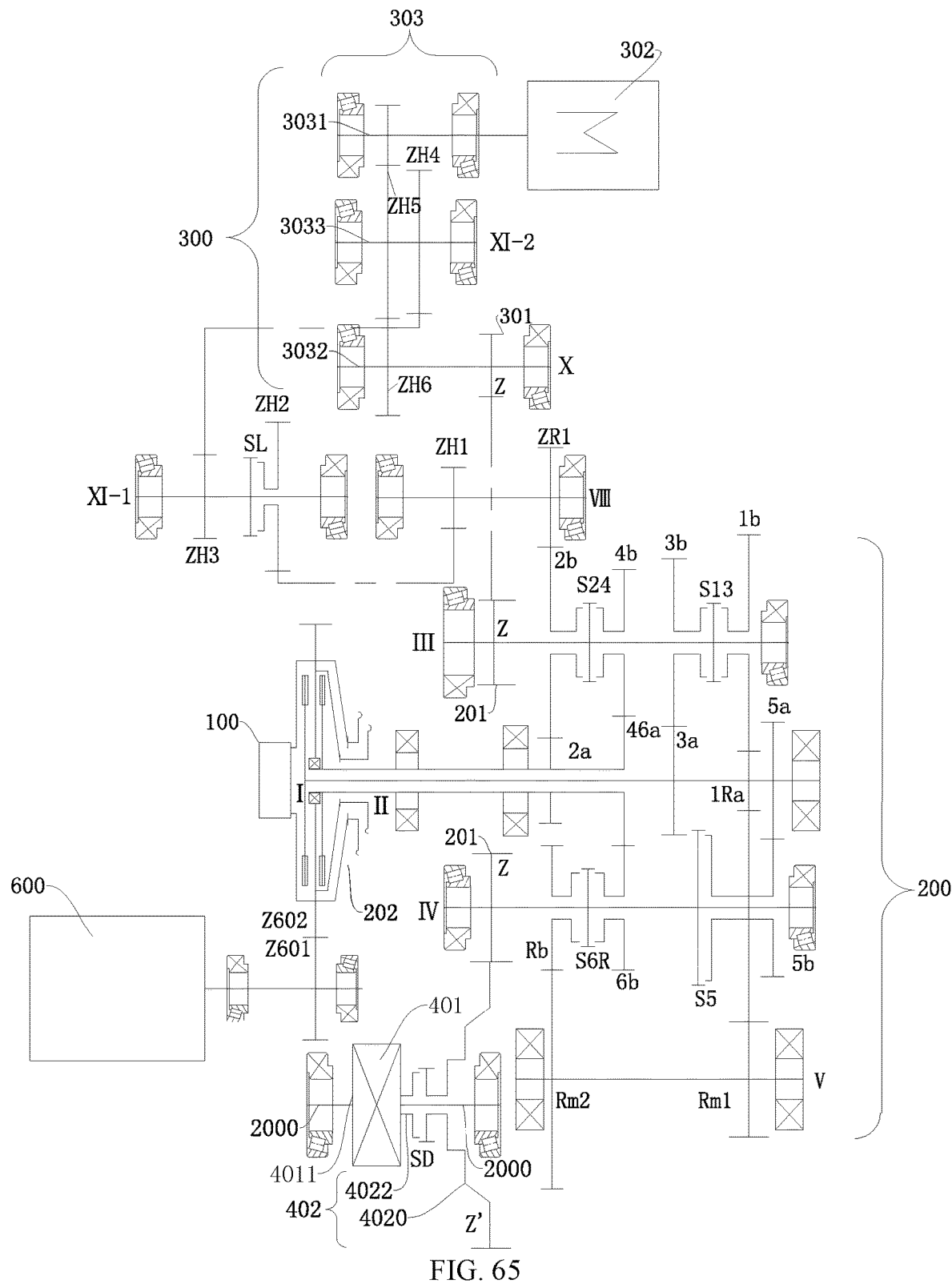
Figure 66:
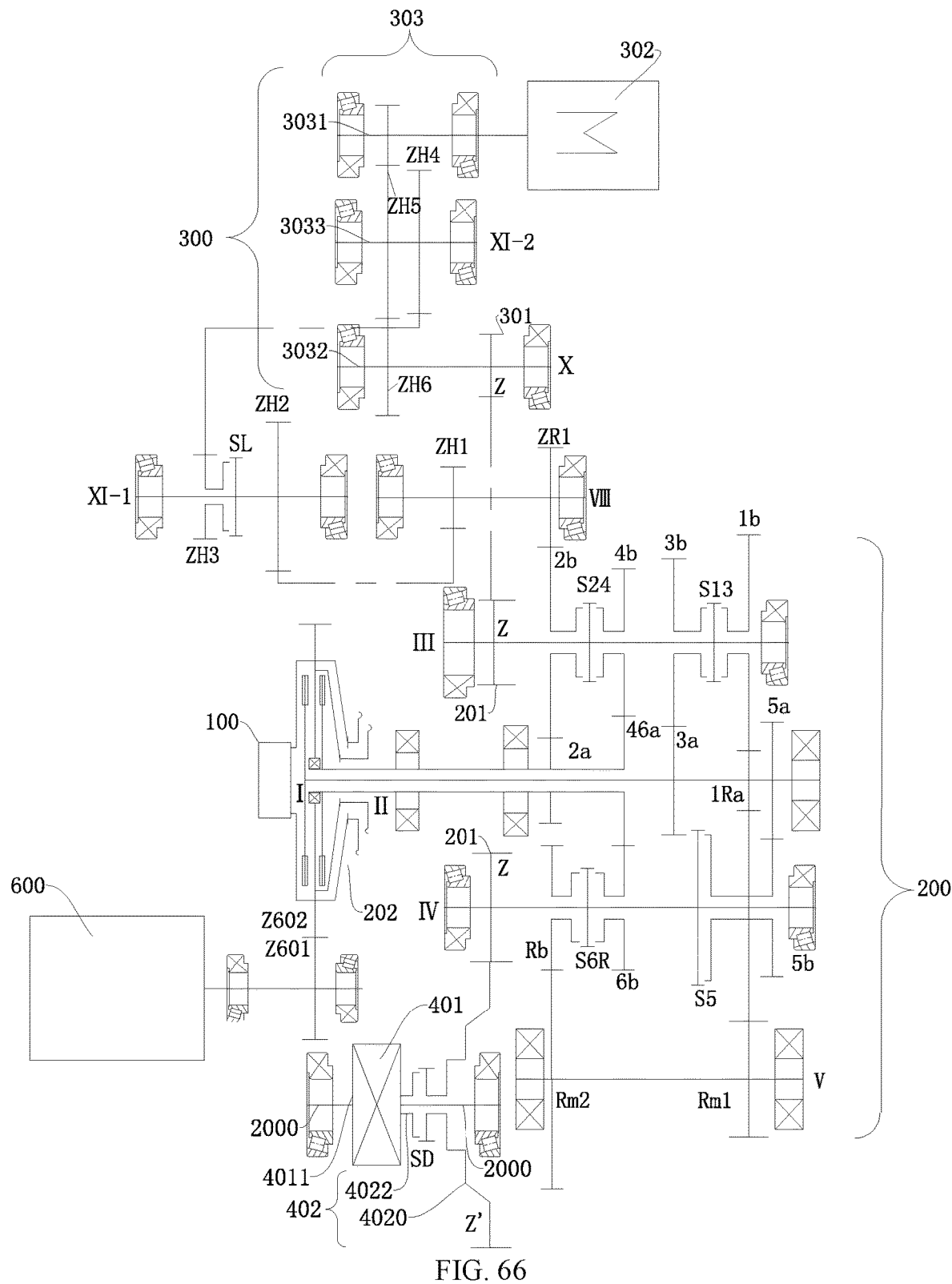
Figure 67:
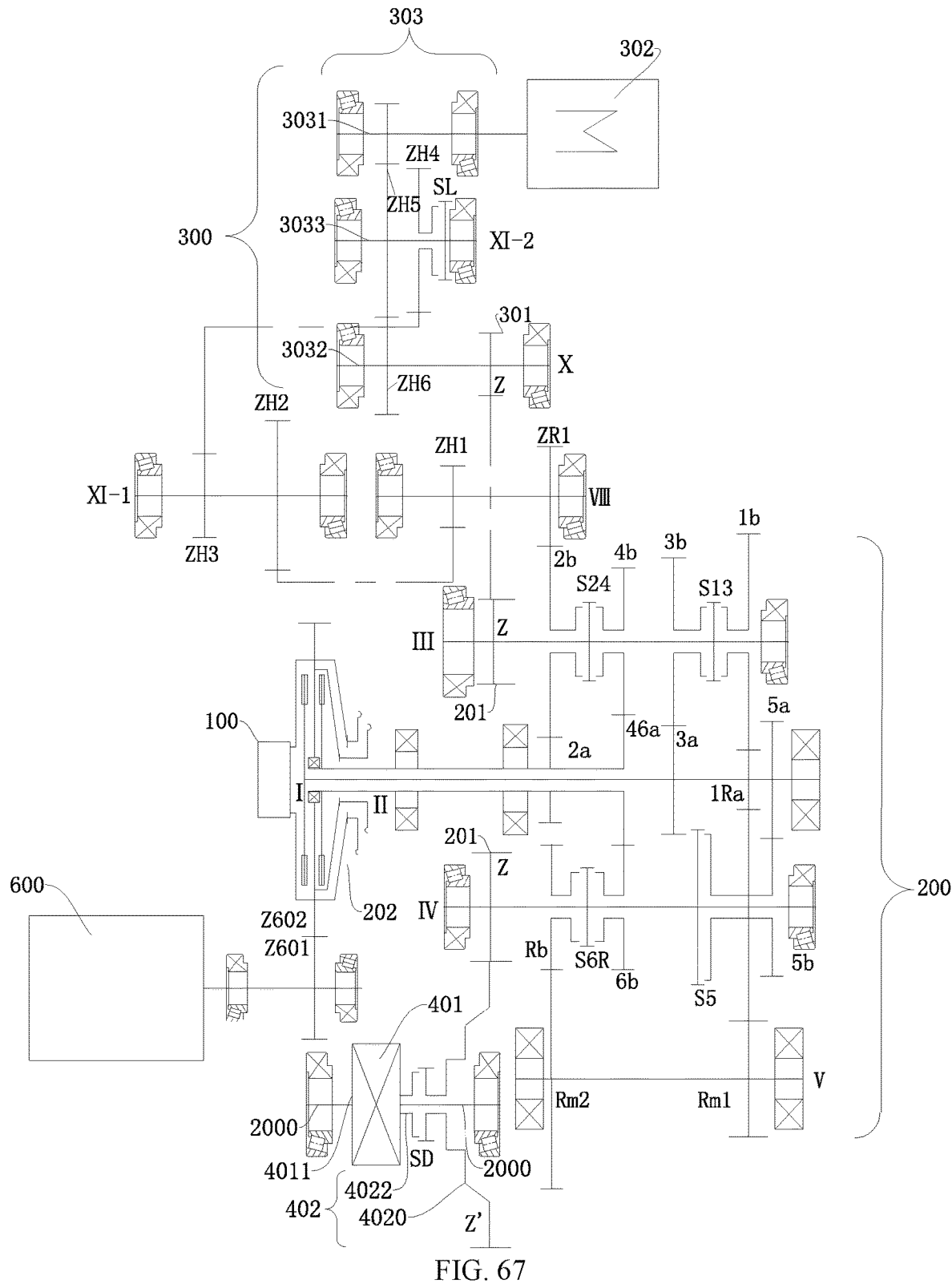
Figure 68:
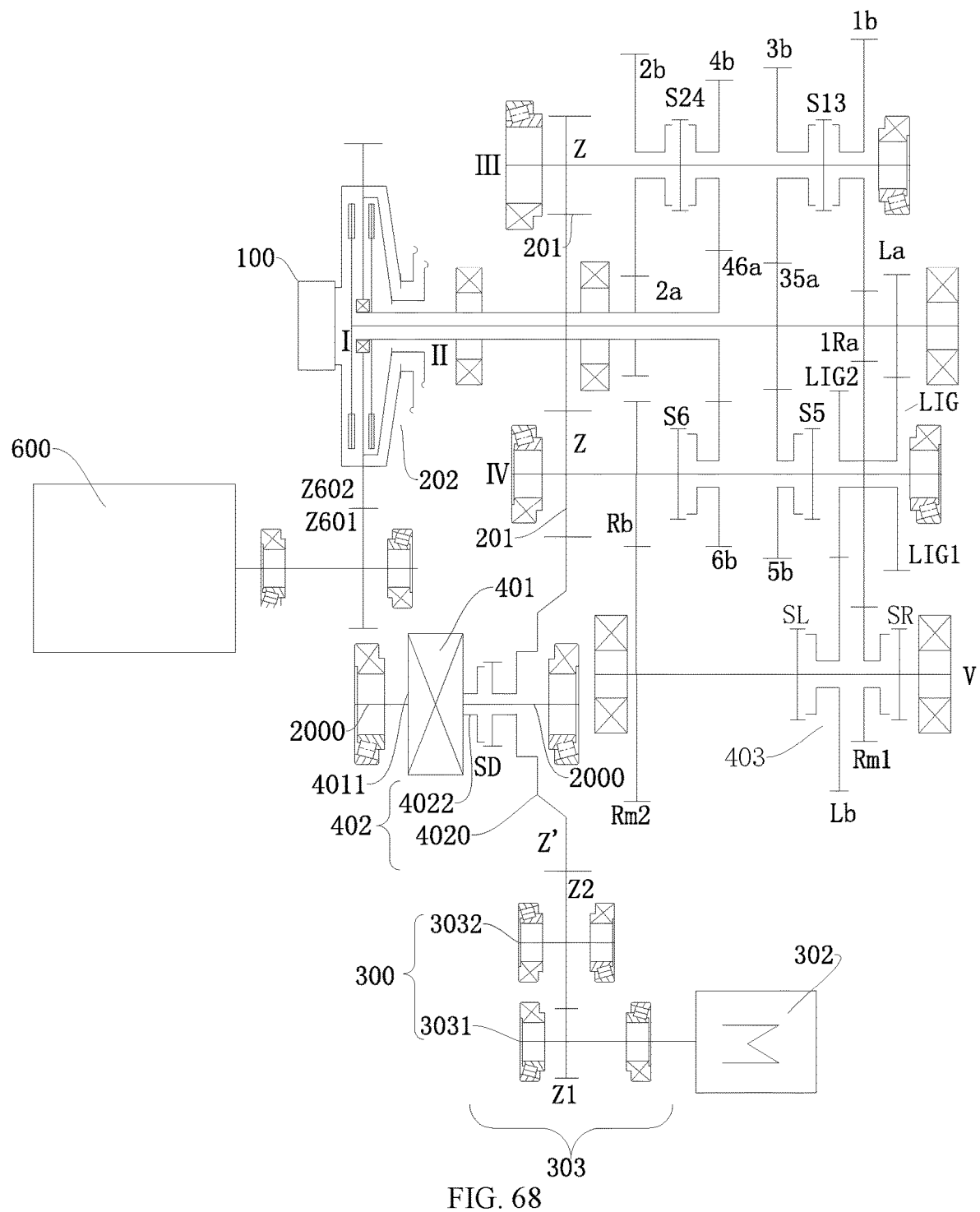
Figure 69:
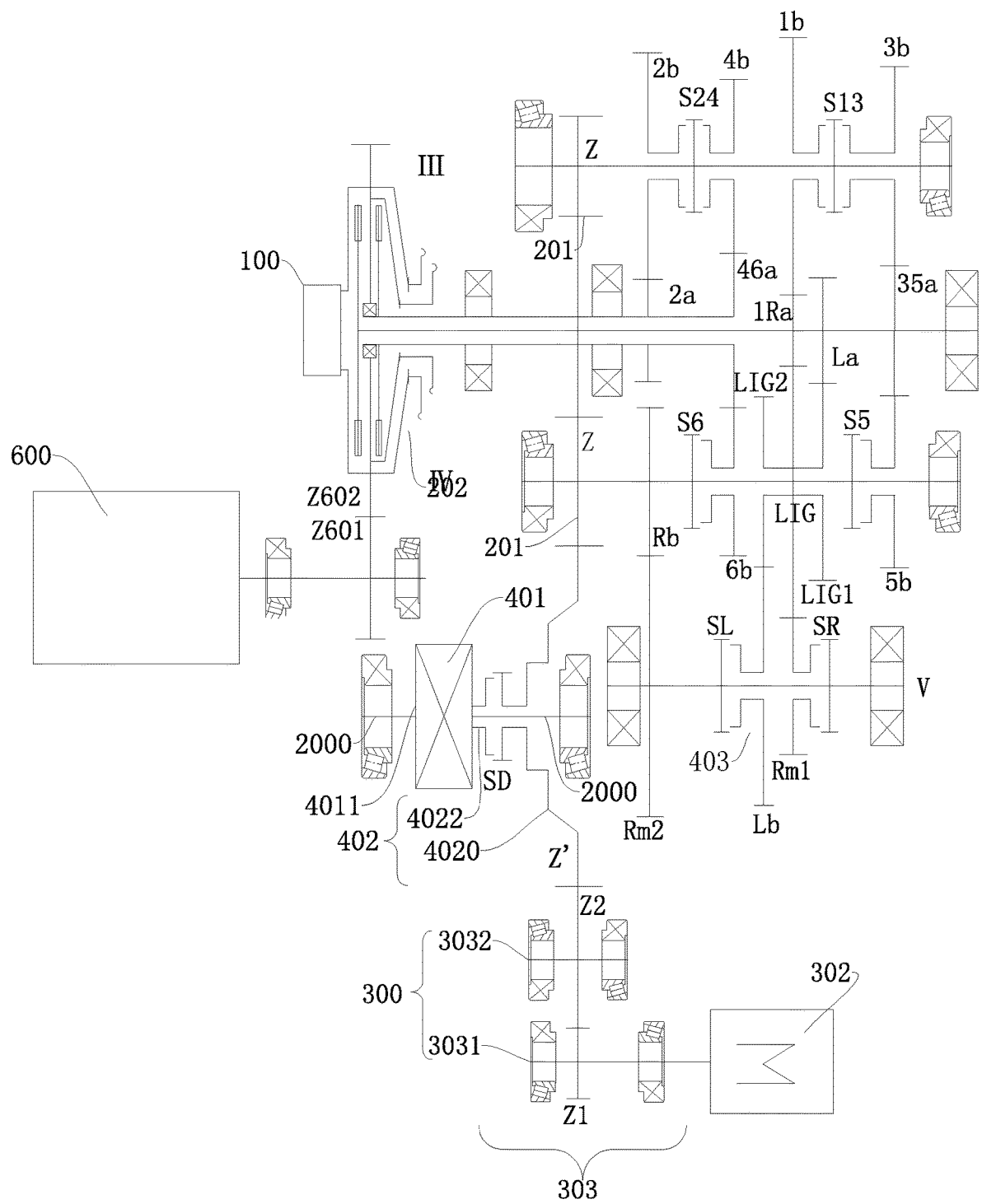

For still another example, as shown in FIG. 33, the electric driving system 700 includes two wheel motors, each wheel motor directly drives one corresponding wheel of two other wheels, and the two other wheels are selectively synchronized. A half shaft synchronizer may be disposed on one half shaft 2000 to be selectively connected to the other half shaft 2000. In this way, each wheel motor may drive a corresponding wheel to rotate, and by disconnecting the half shaft synchronizer, two wheels may move at different speeds, thereby ensuring travelling stability of the vehicle.

Driving modes of the power transmission system 1000 according to the present invention are described in detail below with reference to accompanying drawings.

The power transmission system 1000 for the vehicle has a first power source driving mode. When the power transmission system for the vehicle is in the first power source driving mode, the first motor generator unit 300 does not work, the speed change unit 200 is power-coupled to the power source 100, the speed change unit 200 is power-coupled to the system power output portion 401 through the first mode conversion device 402, and the power output by the power source 100 is output to the system power output portion 401 sequentially through the speed change unit 200 and the first mode conversion device 402. In this case, the power source 100 normally outputs power, and this is a normal driving mode of the vehicle.

The power transmission system 1000 for the vehicle has a second power source driving mode. When the power transmission system for the vehicle is in the second power source driving mode, the first motor generator unit 300 does not work, the speed change unit 200 is power-coupled to the power source 100, the speed change unit 200 is power-coupled to the system power output portion 401 through the first mode conversion device 402, the speed change unit 200 is power-coupled to the first mode conversion device 402 through the second mode conversion device 403, and the power output by the power source 100 is decelerated sequentially through the speed change unit 200 and the second mode conversion device 403 and then output to the first mode conversion device 402, and then output to the system power output portion 401 through the first mode conversion device 402. In this way, the power of the power source 100 is decelerated again when passing through the second mode conversion device 403, thereby playing a role of speed reduction and torque increase, and improving the passing-through capability of the vehicle.

The power transmission system 1000 for the vehicle has a pure electric driving mode, and when the power transmission system for the vehicle is in the pure electric driving mode, the power source 100 does not work, and power output by the first motor generator unit 300 is output to the system power output portion 401 through the first mode conversion device 402. In this way, the power transfer path between the first motor generator unit 300 and the first mode conversion device 402 is short, and the transmission efficiency is high.

The power transmission system 1000 for the vehicle has a first hybrid driving mode. When the power transmission system for the vehicle is in the first hybrid driving mode, both the power source 100 and the first motor generator unit 300 work, the speed change unit 200 is power-coupled to the power source 100, the speed change unit 200 is power-coupled to the system power output portion 401 through the first mode conversion device 402, the first motor generator unit 300 is power-coupled to the system power output portion 401 through the first mode conversion device 402, the power output by the power source 100 is output to the system power output portion 401 sequentially through the speed change unit 200 and the first mode conversion device 402, and the power output by the first motor generator unit 300 is output to the system power output portion 401 through the first mode conversion device 402. In this way, the power output efficiency of the power source 100 and of the first motor generator unit 300 is high, and the speed of the vehicle may be effectively improved.

The power transmission system 1000 for the vehicle has a second hybrid driving mode. When the power transmission system for the vehicle is in the second hybrid driving mode, both the power source 100 and the first motor generator unit 300 work, the speed change unit 200 is power-coupled to the power source 100, the speed change unit 200 is power-coupled to the system power output portion 401 through the first mode conversion device 402, the first motor generator unit 300 is power-coupled to the system power output portion 401 through the first mode conversion device 402, the speed change unit 200 is power-coupled to the first mode conversion device 402 through the second mode conversion device 403, the power output by the power source 100 is output to the system power output portion 401 sequentially through the speed change unit 200, the second mode conversion device 403, and the first mode conversion device 402, and the power output by the first motor generator unit 300 is output to the system power output portion 401 through the first mode conversion device 402. In this way, the power of the power source 100 is decelerated twice, and the power of the first motor generator unit 300 is directly output, so that the speed of the vehicle is suitable, and the power performance and the passing-through performance of the vehicle are relatively good.

The power transmission system 1000 for the vehicle has a first reverse-drive starting mode, and when the power transmission system for the vehicle is in the first reverse-drive starting mode, power output by the first motor generator unit 300 is output to the power source 100 sequentially through the first mode conversion device 402 and the speed change unit 200, to drive the power source 100 to start. In this way, the first motor generator unit 300 may be used as a starter.

The power transmission system 1000 for the vehicle has a second reverse-drive starting mode, and when the power transmission system for the vehicle is in the second reverse-drive starting mode, power output by the first motor generator unit 300 is output to the power source 100 sequentially through the second mode conversion device 403 and the speed change unit 200, to drive the power source 100 to start. In this way, the first motor generator unit 300 may be used as a starter.

The power transmission system 1000 for the vehicle has a first travelling power generation mode. When the power transmission system 1000 for the vehicle is in the first travelling power generation mode, the power source 100 works, the speed change unit 200 is power-coupled to the power source 100, the speed change unit 200 is power-coupled to the system power output portion 401 through the first mode conversion device 402, a part of the power output by the power source 100 is output to the system power output portion 401 sequentially through the speed change unit 200 and the first mode conversion device 402, and another part of the power output by the power source 100 is output to the first motor generator unit 300 sequentially through the speed change unit 200 and the first mode conversion device 402, to drive the first motor generator unit 300 to perform power generation. In this way, the vehicle is in a power generation while travelling driving mode that is applicable to a situation in which the power level of the vehicle is relatively small.

The power transmission system 1000 for the vehicle has a second travelling power generation mode. When the power transmission system 1000 for the vehicle is in the second travelling power generation mode, the power source 100 works, the speed change unit 200 is power-coupled to the power source 100, the speed change unit 200 is power-coupled to the system power output portion 401 through the first mode conversion device 402, the speed change unit 200 is power-coupled to the first motor generator unit 300 through the second mode conversion device 403, a part of the power output by the power source 100 is output to the system power output portion 401 sequentially through the speed change unit 200 and the first mode conversion device 402, and another part of the power output by the power source 100 is output to the first motor generator unit 300 sequentially through the speed change unit 200 and the second mode conversion device 403, to drive the first motor generator unit 300 to perform power generation. In this way, the vehicle is in a power generation while travelling driving mode that is applicable to a situation in which the power level of the vehicle is relatively small.

The power transmission system 1000 for the vehicle has a first braking energy recycling mode, and when the power transmission system 1000 for the vehicle is in the first braking energy recycling mode, the first motor generator unit 300 is power-coupled to the system power output portion 401 through the first mode conversion device 402, and power from wheels of the vehicle drives the first motor generator unit 300 sequentially through the system power output portion 401 and the first mode conversion device 402 to perform power generation. In this way, the first motor generator unit 300 may recycle the power from the wheels, thereby reducing energy waste, and prolonging travelling mileage of the vehicle.

The power transmission system 1000 for the vehicle has a second braking energy recycling mode. When the power transmission system 1000 for the vehicle is in the second braking energy recycling mode, the first motor generator unit 300 is power-coupled to the system power output portion 401 through the first mode conversion device 402, the speed change unit 200 is power-coupled to the first motor generator unit 300 through the second mode conversion device 403, and power from wheels of the vehicle drives the first motor generator unit 300 sequentially through the system power output portion 401, the first mode conversion device 402, the speed change unit 200, and the second mode conversion device 403 to perform power generation. In this way, the first motor generator unit 300 may recycle the power from the wheels, thereby reducing energy waste, and prolonging travelling mileage of the vehicle.

The power transmission system 1000 for the vehicle has a third travelling power generation mode. When the power transmission system 1000 for the vehicle is in the third travelling power generation mode, the power source 100 works, the speed change unit 200 is power-coupled to the power source 100, the second motor generator 600 is power-coupled to the power source 100, the speed change unit 200 is power-coupled to the system power output portion 401 through the first mode conversion device 402, a first part of the power output by the power source 100 is output to the system power output portion 401 through the speed change unit 200 and the first mode conversion device 402, a second part of the power output by the power source 100 is output to the first motor generator unit 300 sequentially through the speed change unit 200 and the first mode conversion device 402, to drive the first motor generator unit 300 to perform power generation, and a third part of the power output by the power source 100 directly drives the second motor generator 600 to perform power generation. In this way, in a power generation while travelling process, each of the first motor generator unit 300 and the second motor generator 600 may be configured to perform power generation, thereby improving the power generation efficiency of the vehicle.

The power transmission system 1000 for the vehicle has a fourth travelling power generation mode. When the power transmission system 1000 for the vehicle is in the fourth travelling power generation mode, the power source 100 works, the speed change unit 200 is power-coupled to the power source 100, the second motor generator 600 is power-coupled to the power source 100, the speed change unit 200 is power-coupled to the system power output portion 401 through the first mode conversion device 402, a first part of the power output by the power source 100 is output to the system power output portion 401 through the speed change unit 200 and the first mode conversion device 402, and a second part of the power output by the power source 100 directly drives the second motor generator 600 to perform power generation. In this way, in a power generation while travelling process, the second motor generator 600 may independently perform power generation, so that the power generation efficiency of the second motor generator 600 is high.

The power transmission system 1000 for the vehicle has a first stationary power generation mode. When the power transmission system 1000 for the vehicle is in the first stationary power generation mode, the power source 100 works, the speed change unit 200 is power-coupled to the power source 100, the second motor generator 600 is power-coupled to the power source 100, the speed change unit 200 is disconnected from the system power output portion 401 through the first mode conversion device 402, a first part of the power output by the power source 100 is output to the first motor generator unit 300 sequentially through the speed change unit 200 and the first mode conversion device 402, to drive the first motor generator unit 300 to perform power generation, and a second part of the power output by the power source 100 directly drives the second motor generator 600 to perform power generation. In this way, when the vehicle is under the parking working condition, the first motor generator unit 300 and the second motor generator 600 may jointly perform power generation, so that the power generation efficiency is high, and the power generation power is large.

The power transmission system 1000 for the vehicle has a second stationary power generation mode. When the power transmission system 1000 for the vehicle is in the second stationary power generation mode, the power source 100 works, the second motor generator 600 is power-coupled to the power source 100, the speed change unit 200 is disconnected from the system power output portion 401 through the first mode conversion device 402, and the power output by the power source 100 directly drives the second motor generator 600 to perform power generation. In this way, when the vehicle is under the parking working condition, the second motor generator 600 independently performs power generation, so that the transmission path is short, and energy waste may be reduced.

The power source 100 is an engine, and the power transmission system 1000 for the vehicle has a rapid starting mode. When the power transmission system 1000 for the vehicle is in the rapid starting mode, the second motor generator 600 is power-coupled to the engine, and the power output by the second motor generator 600 directly drives the engine to start. The second motor generator 600 is used as a starter, and the starting efficiency is high.

When the second motor generator 600 is selectively power-coupled to the power source 100, the power transmission system 1000 for the vehicle has a third braking energy recycling mode. When the power transmission system 1000 for the vehicle is in the third braking energy recycling mode, the speed change unit 200 is power-coupled to the system power output portion 401 through the first mode conversion device 402, the second motor generator 600 is disconnected from the engine 100, and power from wheels of the vehicle drives the second motor generator 600 sequentially through the system power output portion 401, the first mode conversion device 402, and the speed change unit 200 to perform power generation. In this way, when the vehicle is braked, the second motor generator 600 independently performs power generation, and the power generation efficiency is high.

Driving modes of the power transmission system 1000 according to the present invention are described in detail below with reference to FIG. 12.

The power transmission system 1000 for the vehicle has a first power source driving mode, and when the power transmission system for the vehicle is in the first power source driving mode, the first motor generator unit 300 does not work, the power source 100 is power-coupled to the system power output portion 401 through the first mode conversion device 402, and the power output by the power source 100 is output to the system power output portion 401 through the first mode conversion device 402.

The power transmission system 1000 for the vehicle has a second power source driving mode, and when the power transmission system for the vehicle is in the second power source driving mode, the first motor generator unit 300 does not work, the power source 100 is power-coupled to the conversion device input shaft VIII, the conversion device input shaft VIII is power-coupled to the first conversion device intermediate shaft XI-1, the first conversion device intermediate shaft XI-1 is power-coupled to the conversion device output shaft X, the power source 100 is power-coupled to the system power output portion 401 through the first mode conversion device 402, the conversion device output shaft X is power-coupled to the first mode conversion device 402, and the power output by the power source 100 is decelerated sequentially through the conversion device input shaft VIII, the first conversion device intermediate shaft XI-1 and the conversion device output shaft X and then output to the first mode conversion device 402, and then output to the system power output portion 401 through the first mode conversion device 402.

The power transmission system 1000 for the vehicle has a pure electric driving mode, and when the power transmission system for the vehicle is in the pure electric driving mode, the power source 100 does not work, and power output by the first motor generator unit 300 is output to the system power output portion 401 through the first mode conversion device 402.

The power transmission system 1000 for the vehicle has a first hybrid driving mode, when the power transmission system for the vehicle is in the first hybrid driving mode, both the power source 100 and the first motor generator unit 300 work, the power source 100 is power-coupled to the system power output portion 401 through the first mode conversion device 402, the first motor generator unit 300 is power-coupled to the system power output portion 401 through the first mode conversion device 402, the power output by the power source 100 is output to the system power output portion 401 through the first mode conversion device 402, and power output by the first motor generator unit 300 is output to the system power output portion 401 through the first mode conversion device 402.

The power transmission system 1000 for the vehicle has a second hybrid driving mode, and when the power transmission system for the vehicle is in the second hybrid driving mode, both the power source 100 and the first motor generator unit 300 work, the power source 100 is power-coupled to the system power output portion 401 through the first mode conversion device 402, the first motor generator unit 300 is power-coupled to the system power output portion 401 through the first mode conversion device 402, the power source 100 is power-coupled to the conversion device input shaft VIII, the conversion device input shaft VIII is power-coupled to the first conversion device intermediate shaft XI-1, the first conversion device intermediate shaft XI-1 is power-coupled to the conversion device output shaft X, the conversion device output shaft X is power-coupled to the first mode conversion device 402, the power output by the power source 100 is output to the system power output portion 401 sequentially through the conversion device input shaft VIII, the first conversion device intermediate shaft XI-1, the conversion device output shaft X, and the first mode conversion device 402, and power output by the first motor generator unit 300 is output to the system power output portion 401 through the first mode conversion device 402.

The power transmission system 1000 for the vehicle has a first reverse-drive starting mode, and when the power transmission system for the vehicle is in the first reverse-drive starting mode, power output by the first motor generator unit 300 is output to the power source 100 through the first mode conversion device 402, to drive the power source 100 to start.

The power transmission system 1000 for the vehicle has a second reverse-drive starting mode, and when the power transmission system for the vehicle is in the second reverse-drive starting mode, power output by the first motor generator unit 300 is output to the power source 100 through the second mode conversion device 403, to drive the power source 100 to start.

The power transmission system 1000 for the vehicle has a first travelling power generation mode, and when the power transmission system 1000 for the vehicle is in the first travelling power generation mode, the power source 100 works, the power source 100 is power-coupled to the system power output portion 401 through the first mode conversion device 402, the first motor generator unit 300 is power-coupled to the system power output portion 401 through the first mode conversion device 402, a part of the power output by the power source 100 is output to the system power output portion 401 through the first mode conversion device 402, and another part of the power output by the power source 100 is output to the first motor generator unit 300 through the first mode conversion device 402, to drive the first motor generator unit 300 to perform power generation.

The power transmission system 1000 for the vehicle has a second travelling power generation mode, and when the power transmission system 1000 for the vehicle is in the second travelling power generation mode, the power source 100 works, the power source 100 is power-coupled to the system power output portion 401 through the first mode conversion device 402, the power source 100 is power-coupled to the conversion device input shaft VIII, the conversion device input shaft VIII is power-coupled to the first conversion device intermediate shaft XI-1, the first conversion device intermediate shaft XI-1 is power-coupled to the conversion device output shaft X, the conversion device output shaft X is power-coupled to the first motor generator unit 300, a part of the power output by the power source 100 is output to the system power output portion 401 through the first mode conversion device 402, and another part of the power output by the power source 100 is output to the first motor generator unit 300 sequentially through the conversion device input shaft VIII, the first conversion device intermediate shaft XI-1, and the conversion device output shaft X, to drive the first motor generator unit 300 to perform power generation.

The power transmission system 1000 for the vehicle has a first braking energy recycling mode, and when the power transmission system 1000 for the vehicle is in the first braking energy recycling mode, the first motor generator unit 300 is power-coupled to the system power output portion 401 through the first mode conversion device 402, and power from wheels of the vehicle drives the first motor generator unit 300 sequentially through the system power output portion 401 and the first mode conversion device 402 to perform power generation.

The power transmission system 1000 for the vehicle has a second braking energy recycling mode, and when the power transmission system 1000 for the vehicle is in the second braking energy recycling mode, the first motor generator unit 300 is power-coupled to the system power output portion 401 through the first mode conversion device 402, the conversion device output shaft X is power-coupled to the first mode conversion device 402, the conversion device output shaft X is power-coupled to the first motor generator unit 300, and power from wheels of the vehicle drives the first motor generator unit 300 sequentially through the system power output portion 401, the first mode conversion device 402, and the conversion device output shaft X to perform power generation.

Two different power transmission systems 1000 are described below in detail.

According to a first specific embodiment of the present invention, a power transmission system 1000 may include a power source 100, a double clutch 202, a first input shaft I, a second input shaft II, a first output shaft III, a second output shaft IV, a transfer intermediate shaft V, a first motor generator 302, three main reducer driving gears Z, a main reducer driven gear Z', a system power output portion 401, a second mode conversion device 403, and a rear wheel motor generator.

The double clutch 202 has an input end, a first output end and a second output end, and an output end of the power source 100 is connected to the input end of the double clutch. The first input shaft I is connected to the first output end, the second input shaft II is connected to the second output end, the second input shaft II is coaxially sleeved on the first input shaft I, and at least one driving gear is fixedly disposed on each of the first input shaft I and the second input shaft II. At least one driven gear is freely sleeved on each of the first output shaft III and the second output shaft IV, a reverse-gear driven gear Rb is freely sleeved on one of the first output shaft III and the second output shaft IV, and the at least one driven gear is correspondingly meshed with the at least one driving gear, and each of the driven gear and the reverse-gear driven gear Rb is selectively connected to the corresponding output shaft. The first reverse-gear intermediate gear Rm1 and the second reverse-gear intermediate gear Rm2 are fixedly disposed on the transfer intermediate shaft V, the first reverse-gear intermediate gear Rm1 is meshed with one of at least one driving gear, and the second reverse-gear intermediate gear Rm2 is meshed with the reverse-gear driven gear Rb.

The three main reducer driving gears Z include a motor output gear, a first output gear fixedly disposed on the first output shaft III, and a second output gear fixedly disposed on the second output shaft IV, the motor output gear is power-coupled to the first motor generator 302, and the main reducer driven gear Z' is meshed with the main reducer driving gears Z. The main reducer driven gear Z' is selectively power-coupled to the system power output portion 401.

The second mode conversion device 403 is configured to selectively power-couple one driven gear to the motor output gear, so that the power from the power source 100 is decelerated sequentially through a driving gear meshed with the one driven gear, the driven gear, and the second mode conversion device 403 and then output to the motor output gear, and the main reducer driven gear Z' is suitable for outputting power from the main reducer driving gears Z to two front wheels.

The rear wheel motor generator drives two rear wheels through a speed reduction mechanism.

According to a second specific embodiment of the present invention, a power transmission system 1000 may include a power source 100, a double clutch 202, a first input shaft I, a second input shaft II, a first output shaft III, a second output shaft IV, a transfer intermediate shaft V, a first motor generator 302, three main reducer driving gears Z, a main reducer driven gear Z', a system power output portion 401, a second mode conversion device 403, and a rear wheel motor generator.

The double clutch 202 has an input end, a first output end and a second output end, and an output end of the power source 100 is connected to the input end of the double clutch. The first input shaft I is connected to the first output end, the second input shaft II is connected to the second output end, the second input shaft II is coaxially sleeved on the first input shaft I, and at least one driving gear is fixedly disposed on each of the first input shaft I and the second input shaft II. At least one driven gear is freely sleeved on each of the first output shaft III and the second output shaft IV, a reverse-gear driven gear Rb is freely sleeved on one of the first output shaft III and the second output shaft IV, and the at least one driven gear is correspondingly meshed with the at least one driving gear, and each of the driven gear and the reverse-gear driven gear Rb is selectively connected to the corresponding output shaft. The first reverse-gear intermediate gear Rm1 and the second reverse-gear intermediate gear Rm2 are fixedly disposed on the transfer intermediate shaft V, the first reverse-gear intermediate gear Rm1 is meshed with one of at least one driving gear, and the second reverse-gear intermediate gear Rm2 is meshed with the reverse-gear driven gear Rb.

The three main reducer driving gears Z include a motor output gear, a first output gear fixedly disposed on the first output shaft III, and a second output gear fixedly disposed on the second output shaft IV, the motor output gear is power-coupled to the first motor generator 302, and the main reducer driven gear Z' is meshed with the main reducer driving gears Z. The main reducer driven gear Z' is selectively power-coupled to the system power output portion 401.

The second mode conversion device 403 is configured to selectively power-couple the transfer intermediate shaft V to the main reducer driven gear Z', so that the power from the power source 100 is decelerated sequentially through the transfer intermediate shaft V and the second mode conversion device 403 and then output to the main reducer driven gear Z'. The main reducer driven gear Z' is suitable for outputting power from the main reducer driving gears Z to two front wheels.

The rear wheel motor generator drives two rear wheels through a speed reduction mechanism.

In the description of the present invention, it should be understood that, orientations or position relationships indicated by terms such as "center", "longitudinal", "transverse", "length", "width", "thickness", "up", "down", "front", "back", "left", "right", "vertical", "horizontal", "top", "bottom", "inner", "outer", "clockwise", "counterclockwise", "axial", "radial", and "circumferential" are orientations or position relationship shown based on the accompanying drawings, and are merely used for describing the present invention and simplifying the description, rather than indicating or implying that the apparatus or element should have a particular orientation or be constructed and operated in a particular orientation, and therefore, should not be construed as a limitation on the present invention.

In addition, terms "first" and "second" are used only for description objectives, and shall not be construed as indicating or implying relative importance or implying a quantity of indicated technical features. Therefore, a feature restricted by "first" or "second" may explicitly indicate or implicitly include at least one such feature. In the description of the present invention, unless otherwise specifically limited, "multiple" means at least two, for example, two or three.

In the present invention, unless explicitly specified or limited otherwise, the terms "mounted," "connected," "connection", and "fixed" should be understood broadly, for example, which may be fixed connections, detachable connections or integral connections; may be mechanical connections or electrical connections or communication with each other; may be direct connections, indirectly connected with each other through an intermediate medium, or communications inside two elements or an interaction relationship of two elements, unless otherwise specifically limited. Those of ordinary skill in the art can understand specific meanings of the terms in the present invention according to specific situations.

In the present invention, unless explicitly specified or limited otherwise, a first characteristic "on" or "under" a second characteristic may be the first characteristic in direct contact with the second characteristic, or the first characteristic in indirect contact with the second characteristic through an intermediate medium. Moreover, the first characteristic "on", "above" and "over" the second characteristic may be the first characteristic right above or obliquely above the second characteristic, or only indicates that a horizontal height of the first characteristic is greater than that of the second characteristic. The first characteristic "under", "below" and "beneath" the second characteristic may be the first characteristic right below or obliquely below the second characteristic, or only indicates that a horizontal height of the first characteristic is less than that of the second characteristic.

In the descriptions of this specification, a description of a reference term such as "an embodiment", "some embodiments", "an example", "a specific example", or "some examples" means that a specific feature, structure, material, or characteristic that is described with reference to the embodiment or the example is included in at least one embodiment or example of the present invention. In this specification, exemplary descriptions of the foregoing terms do not necessarily refer to a same embodiment or example. In addition, the described specific feature, structure, material, or characteristic may be combined in a proper manner in any one or more embodiments or examples. In addition, with no conflict, a person skilled in the art can integrate and combine different embodiments or examples and features of the different embodiments and examples described in this specification.

Although the embodiments of the present invention are shown and described above, it can be understood that the foregoing embodiments are exemplary, and should not be construed as limitations to the present invention. A person of ordinary skill in the art can make changes, modifications, replacements, and variations to the foregoing embodiments within the scope of the present invention.

What is claimed is:

1. A power transmission system for a vehicle, comprising:
a power source;
a first motor generator unit;
a system power output portion;
a first mode conversion device, wherein at least one of the power source and the first motor generator unit is power-coupled to or power-decoupled from the system power output portion through the first mode conversion device; and
a second mode conversion device, wherein the power source is configured to be power-coupled to or power-decoupled from the first mode conversion device through the second mode conversion device, the second mode conversion device comprises a conversion device input shaft, a first conversion device intermediate shaft, and a conversion device output shaft, and the conversion device output shaft is power-coupled to the first motor generator unit; and
power from the power source is configured to be output to the first mode conversion device after sequentially decelerated through the conversion device input shaft, the first conversion device intermediate shaft, and the conversion device output shaft.

2. The power transmission system for a vehicle according to claim 1, wherein when the at least one of the power source and the first motor generator unit is disconnected from the system power output portion through the first mode conversion device, the power output by the power source is suitable for driving the first motor generator unit through the first mode conversion device to perform power generation.

3. The power transmission system for a vehicle according to claim 1, wherein the first mode conversion device comprises a first conversion device input portion and a first conversion device output portion, the first conversion device input portion is selectively connected to the first conversion device output portion, the first conversion device input portion is power-coupled to a speed change unit, the first conversion device input portion is power-coupled to the first motor generator unit, and the first conversion device output portion is fixedly disposed on the system power output portion;
the first conversion device input portion is freely sleeved on a half shaft of the vehicle, and the first conversion device output portion is sleeved on the half shaft of the vehicle.

4. The power transmission system for a vehicle according to claim 3, wherein the first motor generator unit comprises a first motor generator unit coupling portion, and the first motor generator unit coupling portion is power-coupled to the first conversion device input portion;
wherein the first motor generator unit coupling portion is a main reducer driving gear, the first conversion device input portion is a main reducer driven gear, and the main reducer driven gear is meshed with the main reducer driving gear.

5. The power transmission system for a vehicle according to claim 3, wherein the first mode conversion device further comprises a first conversion device connector, and the first conversion device connector selectively synchronizes the first conversion device input portion with the first conversion device output portion;
the first conversion device connector is disposed on the first conversion device input portion or the first conversion device output portion.

6. The power transmission system for a vehicle according to claim 3, wherein the power source is configured to be power-coupled to or power-decoupled from the first conversion device input portion through the second mode conversion device.

7. The power transmission system for a vehicle according to claim 1, wherein the power source is configured to be power-coupled to or power-decoupled from the first motor generator unit through the second mode conversion device, and the first motor generator unit is power-coupled to the first mode conversion device; and the first motor generator unit comprises a first motor generator and a first motor generator unit coupling portion, the first motor generator unit coupling portion is power-coupled to the first mode conversion device, the first motor generator is power-coupled to the first motor generator unit coupling portion, the first motor generator unit coupling portion is configured to be power-coupled to or power-decoupled from the power source through the second mode conversion device, and the first motor generator unit coupling portion is configured to be power-coupled to the power source through the second mode conversion device, so that the power from the power source is configured to be output to the first mode conversion device after sequentially decelerated through the second mode conversion device and the first motor generator unit coupling portion;

the second mode conversion device is selectively power-coupled to the power source and the first motor generator, so that the power from the power source is configured to drive the first motor generator through the second mode conversion device to perform power generation.

8. The power transmission system for a vehicle according to claim 7, wherein the conversion device output shaft is power-coupled to the first motor generator unit coupling portion; and the power from the power source is configured to be output to the first motor generator unit coupling portion after sequentially decelerated through the conversion device input shaft, the first conversion device intermediate shaft, and the conversion device output shaft;

wherein the power from the power source is configured to drive the first motor generator sequentially through the conversion device input shaft, the first conversion device intermediate shaft, and the conversion device output shaft to perform power generation.

9. The power transmission system for a vehicle according to claim 8, wherein the conversion device input shaft is selectively power-coupled to the power source, the conversion device input shaft is selectively power-coupled to the first conversion device intermediate shaft, and the first conversion device intermediate shaft is power-coupled to the conversion device output shaft;

wherein a first conversion input gear is fixedly disposed on and a first conversion gear is freely sleeved on the conversion device input shaft, a second conversion gear is fixedly disposed on the first conversion device intermediate shaft, a third conversion gear is fixedly disposed on the conversion device output shaft, the first conversion gear is meshed with the second conversion gear, and the third conversion gear is meshed with the second conversion gear;

wherein the second mode conversion device further comprises a second conversion device connector, the second conversion device connector is disposed on one of the conversion device input shaft and the first conversion gear, and the conversion device input shaft is selectively power-coupled to the first conversion gear through the second conversion device connector.

10. The power transmission system for a vehicle according to claim 8, wherein the conversion device input shaft is selectively power-coupled to the power source, the conversion device input shaft is power-coupled to the first conversion device intermediate shaft, and the first conversion device intermediate shaft is power-coupled to the conversion device output shaft;

wherein a first conversion input gear is freely sleeved on and a first conversion gear is fixedly disposed on the conversion device input shaft, a second conversion gear is fixedly disposed on the first conversion device intermediate shaft, a third conversion gear is fixedly disposed on the conversion device output shaft, the first conversion gear is meshed with the second conversion gear, and the third conversion gear is meshed with the second conversion gear.

11. The power transmission system for a vehicle according to claim 10, wherein the second mode conversion device further comprises a second conversion device connector, the second conversion device connector is disposed on one of the conversion device input shaft and the first input conversion gear, and the conversion device input shaft is selectively power-coupled to the first input conversion gear through the second conversion device connector.

12. The power transmission system for a vehicle according to claim 8, wherein the conversion device input shaft is selectively power-coupled to the power source, the conversion device input shaft is power-coupled to the first conversion device intermediate shaft, and the first conversion device intermediate shaft is selectively power-coupled to the conversion device output shaft;

wherein a first conversion input gear and a first conversion gear are fixedly disposed on the conversion device input shaft, a second conversion gear is fixedly disposed on the first conversion device intermediate shaft, a third conversion gear is freely sleeved on the conversion device output shaft, the first conversion gear is meshed with the second conversion gear, and the third conversion gear is meshed with the second conversion gear;

wherein the second mode conversion device further comprises a second conversion device connector, the second conversion device connector is disposed on one of the conversion device output shaft and the third conversion gear, and the conversion device output shaft is selectively power-coupled to the third conversion gear through the second conversion device connector.

13. The power transmission system for a vehicle according to claim 7, wherein the second mode conversion device further comprises a second conversion device intermediate shaft, and the conversion device output shaft is power-coupled to the first motor generator unit coupling portion; and the power from the power source is configured to be output to the first motor generator unit coupling portion after sequentially decelerated through the conversion device input shaft, the first conversion device intermediate shaft, the second conversion device intermediate shaft and the conversion device output shaft;

wherein the power from the power source is configured to drive the first motor generator sequentially through the conversion device input shaft, the first conversion device intermediate shaft, the second conversion device intermediate shaft, and the conversion device output shaft to perform power generation.

14. The power transmission system for a vehicle according to claim 13, wherein the conversion device input shaft is selectively power-coupled to the power source, the conversion device input shaft is power-coupled to the first conversion device intermediate shaft, the first conversion device intermediate shaft is power-coupled to the second conversion device intermediate shaft, and the second conversion device intermediate shaft is power-coupled to the conversion device output shaft;

wherein a first conversion input gear is freely sleeved on and a first conversion gear is fixedly disposed on the conversion device input shaft, a second conversion gear and a third conversion gear are fixedly disposed on the first conversion device intermediate shaft, a fourth conversion gear and a fifth conversion gear are fixedly disposed on the second conversion device intermediate shaft, a sixth conversion gear is fixedly disposed on the conversion device output shaft, the first conversion gear is meshed with the second conversion gear, the third conversion gear is meshed with the fourth conversion gear, and the fifth conversion gear is meshed with the sixth conversion gear;

wherein the second mode conversion device further comprises a second conversion device connector, the second conversion device connector is disposed on one of the conversion device input shaft and the first input conversion gear, and the conversion device input shaft is selectively power-coupled to the first input conversion gear through the second conversion device connector.

15. The power transmission system for a vehicle according to claim 13, wherein the conversion device input shaft is selectively power-coupled to the power source, the conversion device input shaft is selectively power-coupled to the first conversion device intermediate shaft, the first conversion device intermediate shaft is power-coupled to the second conversion device intermediate shaft, and the second conversion device intermediate shaft is power-coupled to the conversion device output shaft;

wherein a first conversion input gear is fixedly disposed on and a first conversion gear is freely sleeved on the conversion device input shaft, a second conversion gear and a third conversion gear are fixedly disposed on the first conversion device intermediate shaft, a fourth conversion gear and a fifth conversion gear are fixedly disposed on the second conversion device intermediate shaft, a sixth conversion gear is fixedly disposed on the conversion device output shaft, the first conversion gear is meshed with the second conversion gear, the third conversion gear is meshed with the fourth conversion gear, and the fifth conversion gear is meshed with the sixth conversion gear, wherein the second mode conversion device further comprises a second conversion device connector, the second conversion device connector is disposed on one of the conversion device input shaft and the first conversion gear, and the conversion device input shaft is selectively power-coupled to the first conversion gear through the second conversion device connector.

16. The power transmission system for a vehicle according to claim 15, wherein a first conversion input gear and a first conversion gear are fixedly disposed on the conversion device input shaft, a second conversion gear is freely sleeved on and a third conversion gear is fixedly disposed on the first conversion device intermediate shaft, a fourth conversion gear and a fifth conversion gear are fixedly disposed on the second conversion device intermediate shaft, a sixth conversion gear is fixedly disposed on the conversion device output shaft, the first conversion gear is meshed with the second conversion gear, the third conversion gear is meshed with the fourth conversion gear, and the fifth conversion gear is meshed with the sixth conversion gear;

wherein the second mode conversion device further comprises a second conversion device connector, the second conversion device connector is disposed on one of the first conversion device intermediate shaft and the second conversion gear, and the first conversion device intermediate shaft is selectively power-coupled to the second conversion gear through the second conversion device connector.

17. The power transmission system for a vehicle according to claim 13, wherein the conversion device input shaft is selectively power-coupled to the power source, the conversion device input shaft is power-coupled to the first conversion device intermediate shaft, the first conversion device intermediate shaft is selectively power-coupled to the second conversion device intermediate shaft, and the second conversion device intermediate shaft is power-coupled to the conversion device output shaft;

wherein a first conversion input gear and a first conversion gear are fixedly disposed on the conversion device input shaft, a second conversion gear is fixedly disposed on and a third conversion gear is freely sleeved on the first conversion device intermediate shaft, a fourth conversion gear and a fifth conversion gear are fixedly disposed on the second conversion device intermediate shaft, a sixth conversion gear is fixedly disposed on the conversion device output shaft, the first conversion gear is meshed with the second conversion gear, the third conversion gear is meshed with the fourth conversion gear, and the fifth conversion gear is meshed with the sixth conversion gear;

wherein the second mode conversion device further comprises a second conversion device connector, the second conversion device connector is disposed on one of the first conversion device intermediate shaft and the third conversion gear, and the first conversion device intermediate shaft is selectively power-coupled to the third conversion gear through the second conversion device connector.

18. The power transmission system for a vehicle according to claim 17, wherein a first conversion input gear and a first conversion gear are fixedly disposed on the conversion device input shaft, a second conversion gear and a third conversion gear are fixedly disposed on the first conversion device intermediate shaft, a fourth conversion gear is freely sleeved on and a fifth conversion gear is fixedly disposed on the second conversion device intermediate shaft, a sixth conversion gear is fixedly disposed on the conversion device output shaft, the first conversion gear is meshed with the second conversion gear, the third conversion gear is meshed with the fourth conversion gear, and the fifth conversion gear is meshed with the sixth conversion gear;

wherein the second mode conversion device further comprises a second conversion device connector, the second conversion device connector is disposed on one of the second conversion device intermediate shaft and the fourth conversion gear, and the second conversion device intermediate shaft is selectively power-coupled to the fourth conversion gear through the second conversion device connector.

19. The power transmission system for a vehicle according to claim 1, further comprising:
at least one input shaft, wherein each input shaft is selectively connected to the power source;
at least one output shaft, wherein each output shaft is selectively power-coupled to a corresponding input shaft to output the power from the power source through the corresponding input shaft; and
at least one of the output shaft and the first motor generator unit is power-coupled to or power-decoupled from the system power output portion through the first mode conversion device; and
a second mode conversion device, wherein the output shaft is configured to be power-coupled to or power-decoupled from the first mode conversion device through the second mode conversion device, and the output shaft is configured to be power-coupled to the first mode conversion device through the second mode conversion device, so that the power from the power source is output to the first mode conversion device after sequentially decelerated through the input shaft, the output shaft, and the second mode conversion device;
wherein at least one driving gear is disposed on each input shaft and at least one driven gear is disposed on each output shaft, the driven gear is meshed with the corresponding driving gear, and one driven gear and the conversion device input shaft perform cooperative transmission, so that the power from the power source is configured to be output to the first mode conversion device after sequentially decelerated through the input shaft, the driving gear, the driven gear, the conversion device input shaft, the first conversion device intermediate shaft, and the conversion device output shaft.

20. A vehicle, comprising the power transmission system for a vehicle according to claim 1.

* * * * *